United States Patent
Piehler

(10) Patent No.: US 12,176,956 B2
(45) Date of Patent: *Dec. 24, 2024

(54) IC-TROSA OPTICAL NETWORK SYSTEM

(71) Applicant: Dell Products L.P., Round Rock, TX (US)

(72) Inventor: David Piehler, Mountain View, CA (US)

(73) Assignee: Dell Products L.P., Round Rock, TX (US)

( * ) Notice: Subject to any disclaimer, the term of this patent is extended or adjusted under 35 U.S.C. 154(b) by 197 days.

This patent is subject to a terminal disclaimer.

(21) Appl. No.: 17/968,875

(22) Filed: Oct. 19, 2022

(65) Prior Publication Data

US 2023/0353246 A1 Nov. 2, 2023

Related U.S. Application Data

(63) Continuation-in-part of application No. 17/731,521, filed on Apr. 28, 2022, now Pat. No. 11,997,436, and (Continued)

(51) Int. Cl.
*H04J 14/00* (2006.01)
*H04B 10/40* (2013.01)
*H04B 10/516* (2013.01)

(52) U.S. Cl.
CPC .......... *H04B 10/40* (2013.01); *H04B 10/516* (2013.01)

(58) Field of Classification Search
CPC ...... H04B 10/27; H04B 10/40; H04B 10/516; H04B 10/548; H04B 10/61; H04B 10/616;
(Continued)

(56) References Cited

U.S. PATENT DOCUMENTS

| 5,031,235 A | 7/1991 | Raskin et al. |
| 5,119,447 A | 6/1992 | Trisno |

(Continued)

FOREIGN PATENT DOCUMENTS

| EP | 0287378 A1 | 10/1988 |
| EP | 1037096 A2 | 9/2000 |
| EP | 1039670 A2 | 9/2000 |

OTHER PUBLICATIONS

OSFP MSA, "Specification for OSFP Octal Small Form Factor Pluggable Module," Rev 4.1, Aug. 2, 2021, 109 pages, available at http://osfpmsa.org.

(Continued)

*Primary Examiner* — Hanh Phan
(74) *Attorney, Agent, or Firm* — Joseph Mencher

(57) ABSTRACT

An IC-TROSA optical network system includes at least one optical network coupled to subscriber device(s) and a hub device. The hub device includes a hub coherent optical transceiver device with a hub IC-TROSA device that couples the hub device to the subscriber device(s) via the optical network(s). The hub IC-TROSA device includes an optical hybrid mixer subsystem, a first receive connection that receives first optical signals from the subscriber device(s) via the optical network(s) and provides them to the optical hybrid mixer subsystem, and a second receive connection that receives second optical signals from the subscriber device(s) via the optical network(s) and provides them to the optical hybrid mixer subsystem. The optical hybrid mixer subsystem mixes the first and second optical signals and provides mixing results for conversion to first and second electrical signals that are then transmitted to a hub signal processing subsystem.

20 Claims, 40 Drawing Sheets

Related U.S. Application Data a continuation-in-part of application No. 17/731,333, filed on Apr. 28, 2022.

(58) Field of Classification Search
CPC ............ H04B 10/6164; H04B 10/6165; H04B 10/2507; H04J 14/0245; H04J 14/2047; H04J 14/2049
USPC ...... 398/66, 67, 68, 69, 70, 71, 72, 79, 135, 398/136, 137, 138, 139, 158, 159, 202, 398/204, 208, 209, 183, 188, 33, 38
See application file for complete search history.

(56) References Cited

U.S. PATENT DOCUMENTS

| | | | |
|---|---|---|---|
| 5,253,309 | A | 10/1993 | Nazarathy et al. |
| 6,304,369 | B1 | 10/2001 | Piehler |
| 8,055,141 | B2 | 11/2011 | Chen et al. |
| 9,515,736 | B2 | 12/2016 | Hemenway, Jr. et al. |
| 9,544,668 | B2 | 1/2017 | Piehler et al. |
| 11,646,793 | B2 | 5/2023 | Nazarathy et al. |
| 2010/0215368 | A1* | 8/2010 | Qian ................ H04J 14/0247 398/67 |
| 2019/0089475 | A1 | 3/2019 | Kish, Jr. et al. |
| 2019/0372673 | A1* | 12/2019 | Fan .................... H04B 10/40 |
| 2020/0280372 | A1 | 9/2020 | Li et al. |
| 2021/0273725 | A1 | 9/2021 | Mutalik et al. |
| 2022/0116116 | A1 | 4/2022 | Yamanaka et al. |
| 2023/0353244 | A1* | 11/2023 | Piehler ............... H04B 10/40 |

OTHER PUBLICATIONS

QSFP-DD MSA, "QSFP-DD Hardware Specification for QSFP Double Density 8X Pluggable Transceiver," Revision 5.1, Aug. 7, 2020, 84 pages, available at http://www.qsfp-dd.com/.

OIF, "Implementation Agreement for Integrated Coherent Transmit-Receive Optical Sub Assembly," OIF-IC-TROSA-01.0, Optical Internetworking Forum, Aug. 20, 2019, 170 pages, available at https://www.oiforum.com/wp-content/uploads/OIF-IC-TROSA-01.0.pdf.

Kazuro Kikuchi, "Fundamentals of Coherent Optical Fiber Communications," Journal of Lightwave Technology, vol. 34, No. 1, Jan. 1, 2016, pp. 157-179.

Björn Skubic et al., "Introduction to Optical Access Networks," Springer Handbook of Optical Networks, pp. 831-848, Springer Nature Switzerland AG 2020.

Ali Shahpari et al., "Coherent Access: A Review," Journal of Lightwave Technology, vol. 35, No. 4, Feb. 15, 2017, pp. 1050-1058.

Md Saifuddin Faruk et al., "Coherent Access: Status and Opportunities," 2020 IEEE Photonics Society Summer Topicals Meeting Series (SUM), 2 pages, 2020 IEEE.

C. Ruprecht et al., "Timing Advance Tracking for Coherent OFDMA-PON Upstream System," Asia Communications and Photonics Conference, Paper AF1G-4, 3 pages, Optical Society of America, 2013.

Dave Welch et al., "Point-to-Multipoint Optical Networks Using Coherent Digital Subcarriers," Journal of Lightwave Technology, vol. 39, No. 16, Aug. 15, 2021, pp. 5232-5247.

David F. Welch, "Disruption Cycles for Optical Networks: How Point to Multi-Point Coherent Optics can Transform the Cost and Complexity of the Optical Network," 2020 European Conference on Optical Communications (ECOC), 3 pages, 2020 IEEE.

A. Rashidinejad et al., "Real-Time Demonstration of 2.4Tbps (200Gbps/λ) Bidirectional Coherent DWDM-PON Enabled by Coherent Nyquist Subcarriers," 2020 Optical Fiber Communication Conference, W2A.30.pdf, 3 pages, Optical Society of America, 2020.

David Krause et al., "Design Considerations for a Digital Subcarrier Coherent Optical Modem," Optical Fiber Communication Conference, 3 pages, Optical Society of America, 2017.

Infinera, "Technology Brief—Delivering a Transformative Network Architecture with XR Optics," Infinera Corporation, 2020, 3 pages, available at https://www.infinera.com/wp-content/uploads/Delivering-a-Transformative-Network-Architecture-with-XR-Optics-0261-TB-RevB-0820-1.pdf.

Infinera, "Solution Brief—XR Optics Innovative Point-to-Multipoint Coherent that Slashes Aggregation Network TCO," 2022 Infinera Corporation, 7 pages, available at https://www.infinera.com/wp-content/uploads/XR-Optics-SB-0217-RevF-0222.pdf.

Screen captures from YouTube Video "XR Optics: Redefining How Optical Networks Are Built," Infinera Corporation, Mar. 20, 2020, 31 pages, Retrieved from Internet: https://www.youtube.com/watch?v=KLZdkxtYFt4&t=77s.

Lukas Chrostowski et al., Silicon Photonics Design, Chapter 4: "Fundamental Building Blocks," 70 pages, Cambridge University Press, 2015.

R.C. Alferness, "4. Titanium-Diffused Lithium Niobate Waveguide Devices," Guided-Wave Optoelectronics, 1988, pp. 145-210, Springer-Verlag, Berlin, Heidelberg.

Dmitry N. Makarov, "Theory of a frequency-dependent beam splitter in the form of coupled waveguides," Scientific Reports 11, 2021, 7 pages, www.nature.com/scientificreports.

Moshe Nazarathy et al., "Progress in Externally Modulated AM CATV Transmission Systems," Journal of Lightwave Technology, vol. 11, No. 1, Jan. 1993, pp. 82-105.

Derek Nesset et al., "GPON SFP Transceiver with PIC based Mode-Coupled Receiver," European Conference and Exhibition on Optical Communication, Paper Tu.3.B.4., 3 pages, ECOC Technical Digest, Optical Society of America, 2012.

David Piehler et al., "An Alternative Architecture for a PON OLT Splitter-combiner Integrated into an SFP Transceiver Module," 2014 European Conference on Optical Communication (ECOC), Paper P.2.17, 3 pages, Cannes, France.

Matthias Seimetz et al., "Options, Feasibility, and Availability of 2×4 90° Hybrids for Coherent Optical Systems," Journal of Lightwave Technology 24, vol. 24, No. 3, Mar. 2006, pp. 1317-1322.

Mohammad R. Paiam et al., "Design of phased-array wavelength division multiplexers using multimode interference couplers," Applied Optics, vol. 36, No. 21, Jul. 20, 1997, pp. 5097-5108.

M. R. Chitgarha et al., "2×800 Gbps/wave Coherent Optical Module Using a Monolithic InP Transceiver PIC," 2020 European Conference on Optical Communications (ECOC), Paper We2C-1, 3 pages, 2020 IEEE.

Po Dong et al., "Silicon Microring Modulators for Advanced Modulation Formats," Presented at Optical Fiber Communication Conference (OFC), Paper OW4J.2, 3 pages, OFC/NFOEC Technical Digest, 2013 OSA, Anaheim, USA.

Inuk Kang, "Phase-shift-keying and on-off-keying with improved performances using electroabsorption modulators with interferometric effects," Optics Express, vol. 15, No. 4, 2007, pp. 1467-1473.

Po Dong et al., "In-phase/quadrature modulation using directly reflectivity-modulated laser," Optica, vol. 7, No. 8, Aug. 2020, pp. 929-933.

Han Sun et al., "800G DSP ASIC Design Using Probabilistic Shaping and Digital Sub-Carrier Multiplexing," Journal of Lightwave Technology, vol. 38, No. 17, Sep. 1, 2020, pp. 4744-4756.

Michael Reck et al., "Experimental Realization of Any Discrete Unitary Operator," Physical Review Letters, vol. 73, No. 1, Jul. 4, 1994, 6 pages.

International Search Report and Written Opinion mailed in International Application No. PCT/US2023/060882 on May 4, 2023, 14 pages.

Munetaka Kurokawa et al., "High Optical Output Power and High-responsivity IC-TROSA for 800 Gbps applications," 2021 European Conference on Optical Communication (ECOC), IEEE, 3 pages, DOI: 10.1109/ECOC52684.2021.9606101.

Michael C. Larson et al., "InP vs Si Photonic Integrated Circuit Platforms for Coherent Data Center Interconnects," 2018 European Conference on Optical Communication (ECOC), IEEE, 3 pages, DOI: 10.1109/ECOC.2018.8535167.

Hiroshi Yamazaki et al., "Optical Modulator With a Near-Linear Field Response," Journal of Lightwave Technology, IEEE, USA,

(56) References Cited

OTHER PUBLICATIONS vol. 34, No. 16, Aug. 15, 2016, pp. 3796-3802, ISSN: 0733-8724, DOI: 10.1109/JLT.2016.2586113.
International Search Report and Written Opinion mailed in International Application No. PCT/US2023/076423 on Feb. 8, 2024, 12 pages.

* cited by examiner (PRIOR ART) FIG. 8

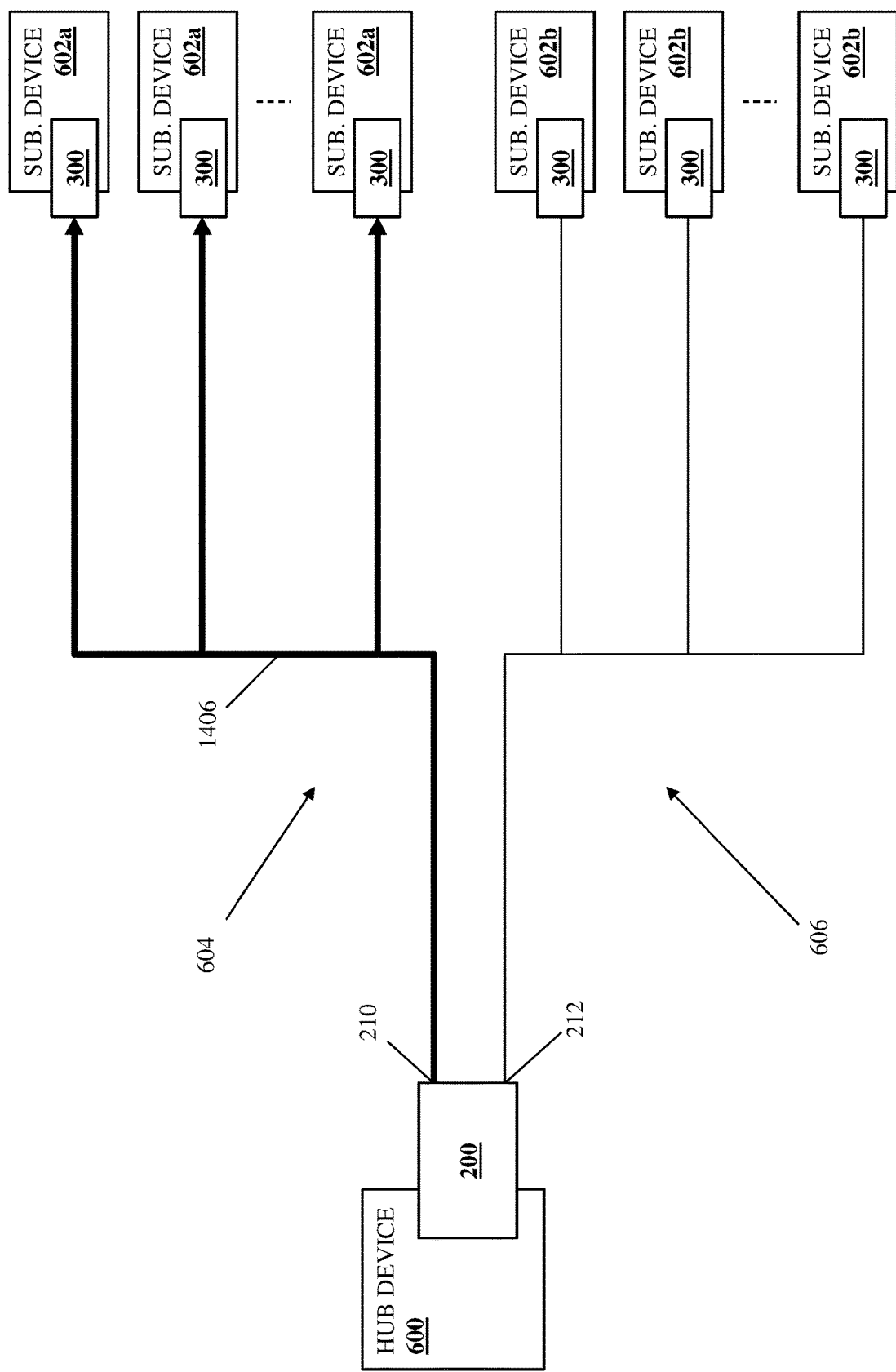

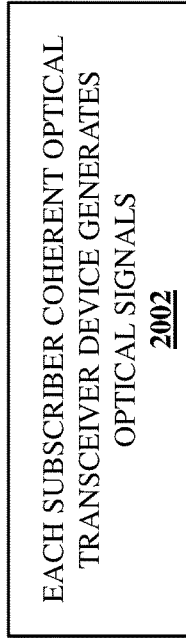
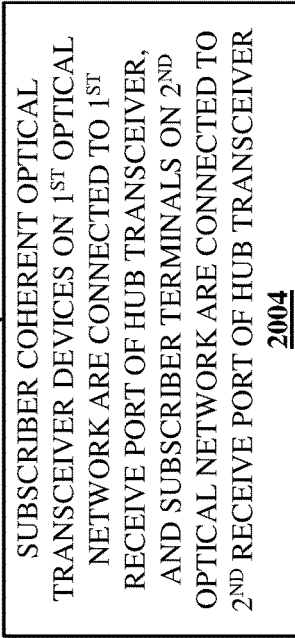
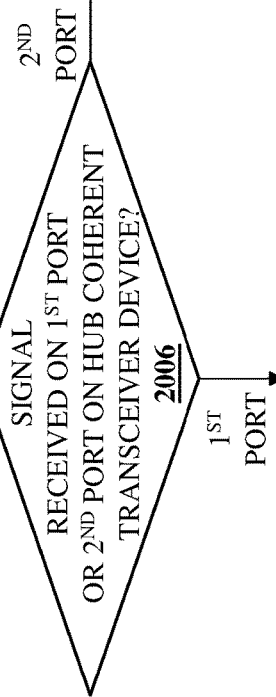
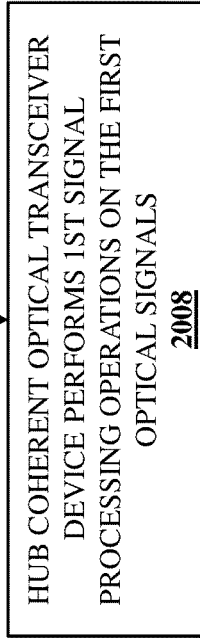
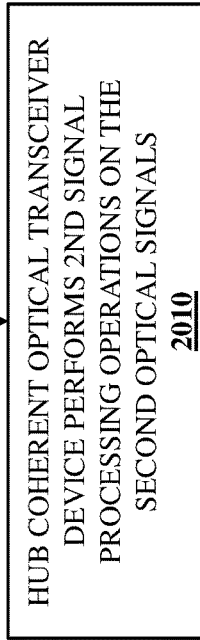
FIG. 20

IC-TROSA OPTICAL NETWORK SYSTEM

CROSS-REFERENCE TO RELATED APPLICATIONS

The present disclosure is a continuation-in-part of U.S. patent application Ser. No. 17/731,333, filed on Apr. 28, 2022; and U.S. patent application Ser. No. 17/731,521, filed on Apr. 28, 2022, the disclosures of which are incorporated by reference in their entirety.

BACKGROUND

The present disclosure relates generally to information handling systems, and more particularly to an Integrated Coherent Transmit-Receive Optical Sub-Assembly (IC-TROSA) device for transmitting data between information handling systems connected via an optical network.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as server devices, storage systems, and/or other computing devices known in the art, are sometimes coupled together using optical networks. In many situations, a point-to-multipoint optical network may be provided to allow, for example, a hub device (e.g., provided by a networking device (e.g., a switch device or router device) and/or other computing devices that would be apparent to one of skill in the art in possession of the present disclosure) to transmit and receive data via optical signals with subscriber devices (e.g., provided by server devices, networking devices (e.g., switch devices or router devices), subscriber gateway devices, storage systems, and/or other computing devices that would be apparent to one of skill in the art in possession of the present disclosure). Conventionally, Passive Optical Networks (PONs) have been provided for such point-to-multipoint optical networks (e.g., PONs have been relatively widely deployed to provide optical-fiber-to-home services), and operate based on Intensity Modulation and Direct Detection (IM/DD) optical communication technologies that distinguish optical signals from different subscriber devices at the hub device based on a Time-Division Multiple Access (TDMA) scheme. However, as the desire to transmit optical signals at higher speeds and longer distances increases, point-to-multipoint optical networks will shift to the utilization of coherent optical communication technologies, which have conventionally been utilized in point-to-point optical communications between discrete devices at each end of the optical link.

As will be appreciated by one of skill in the art in possession of the present disclosure, coherent optical communication technologies operate to modulate the amplitude and phase of light transmitted via optical fibers across multiple polarizations, which enables the transmission of more data relative to IM/DD optical communication technologies, and when combined with Digital Signal Processing (DSP) techniques at the transmitter and receiver, achieves higher bit-rates, greater link budgets, greater degrees of flexibility, simpler photonic line systems, and increased optical performance relative to IM/DD optical communication technologies. However, coherent optical communication technologies have not been widely deployed in point-to-multipoint optical networks as of yet.

The conventional implementation of coherent optical communication technologies for point-to-multipoint optical networks provides a hub coherent optical transceiver device coupled to the hub device, a respective subscriber coherent optical transceiver device coupled to each subscriber device, and a point-to-multipoint optical network connecting the hub coherent optical transceiver device to each of the subscriber coherent optical transceiver devices. Furthermore, each of the hub coherent optical transceiver device and the subscriber coherent optical transceiver devices may include a DSP device, an Integrated Coherent Transmit-Receive Optical Sub-Assembly (IC-TROSA) device, and an Integrated Tunable Laser Assembly (ITLA) device or devices. However, the inventor of the present disclosure has discovered that the conventional configuration of the IC-TROSA devices in hub coherent optical transceiver devices suffer from issues that limit the efficiency of optical signal transmission.

For example, conventional IC-TROSA devices utilize 2×1 single-mode Y-junction optical waveguides within their quadrature optical modulator devices, and in some cases with their 90-degree optical hybrid mixer devices as well. As will be appreciated by one of skill in the art in possession of the present disclosure, when light traverses a 2×1 single-mode Y-junction optical waveguide from the two-input side to the single-output side, only half of the light power input is transmitted at the output, with the other half of the light power input radiated from the 2×1 single-mode Y-junction optical waveguide as "waste light". As will be appreciated by one of skill in the art in possession of the present disclosure, the reduction in light power via the 2×1 single-mode Y-junction optical waveguides utilized in conventional IC-TROSA devices limits the distance that optical signals may be transmitted by the hub device to any particular number of subscriber devices, or reduces the number of subscriber devices to which a hub device may transmit optical signals for any particular distance.

Accordingly, it would be desirable to provide an IC-TROSA optical network system that addresses the issues discussed above.

SUMMARY

According to one embodiment, a hub coherent optical transceiver device includes an optical hybrid mixer subsystem; a first receive connection that is coupled to the optical hybrid mixer subsystem and that is configured to receive first optical signals from at least one subscriber device via at least one optical network; and a second receive connection that is coupled to the optical hybrid mixer subsystem and that is configured to receive second optical signals from the at least one subscriber device via the at least one optical network, wherein the optical hybrid mixer subsystem is configured to perform mixing operations on the first optical signals and second optical signals and provide mixing results for conversion to first electrical signals and second electrical signals that are then transmitted to a hub signal processing subsystem.

BRIEF DESCRIPTION OF THE DRAWINGS

FIG. 17A is a schematic view illustrating an embodiment of the hub coherent optical transceiver device of FIG. 6 transmitting optical signals to a subscriber coherent optical transceiver device via one of the plurality of networks during the method of FIG. 13.

FIG. 20 is a flow chart illustrating an embodiment of a method for transmitting data via a point-to-multipoint optical network.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
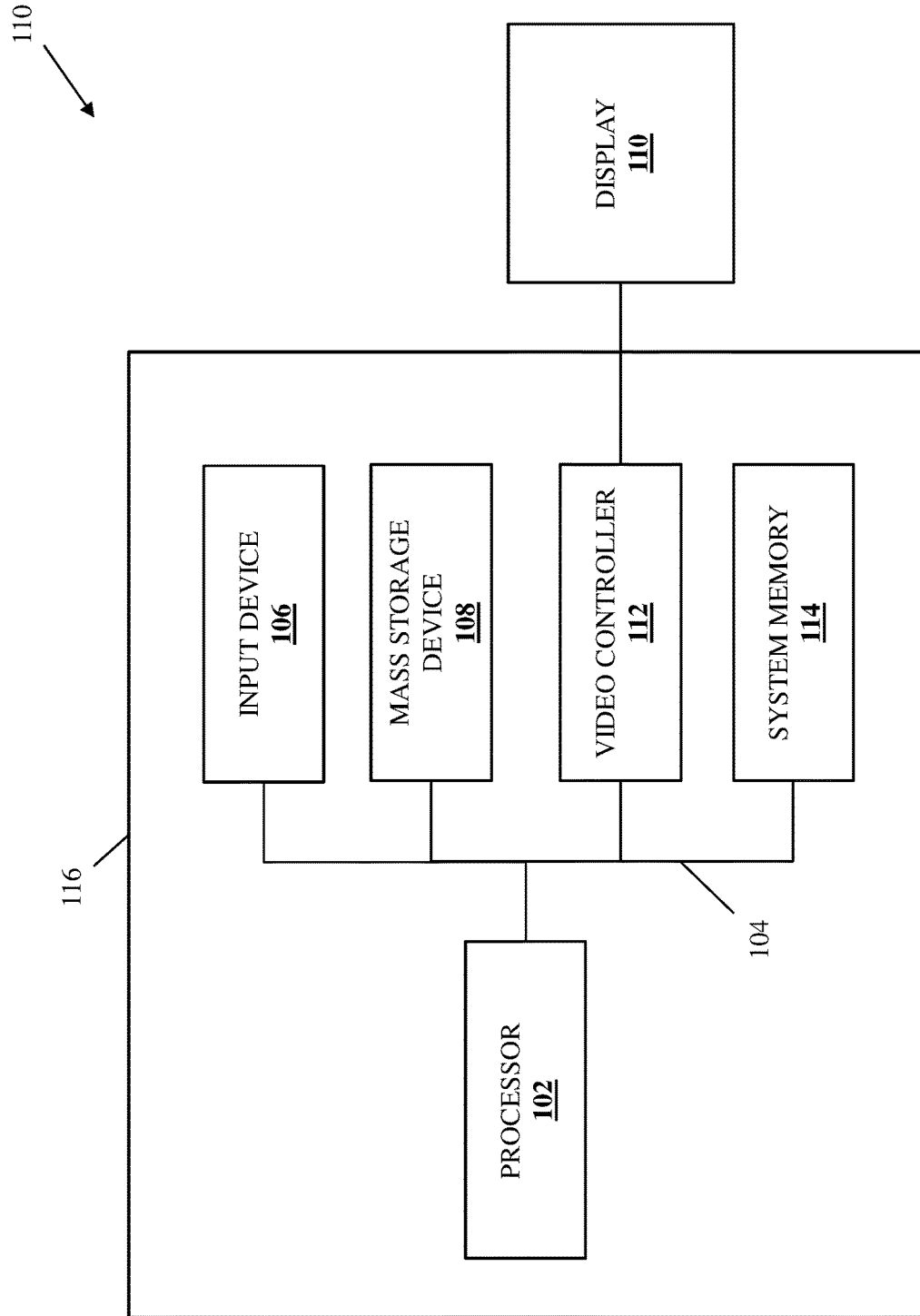
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
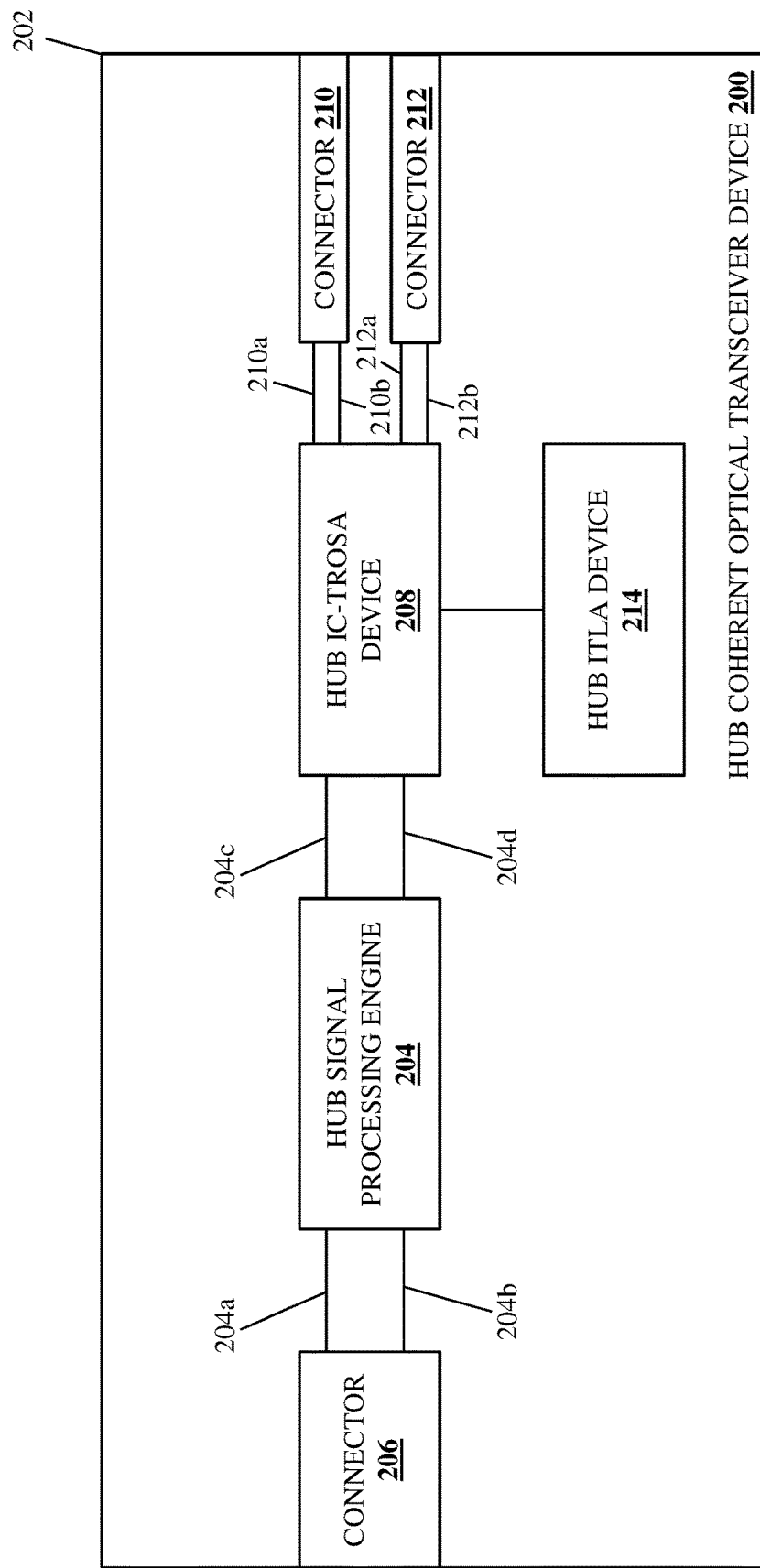
FIG. 2 is a schematic view illustrating an embodiment of a hub coherent optical transceiver device provided according to the teachings of the present disclosure.

Referring now to FIG. 2, an embodiment of a hub coherent optical transceiver device 200 is illustrated. In the embodiments illustrated and described below, the hub coherent optical transceiver device 200 is illustrated and described as being provided by a pluggable module such as those described in the Quad Small Form-factor Pluggable Double-Density (QSFP-DD) or Octal Small Form-factor Pluggable (OSFP) Multi-Source Agreements (MSAs), although other pluggable module form-factors will fall within the scope of the present disclosure as well. Furthermore, while illustrated and described as being provided by a pluggable module, one of skill in the art in possession of the present disclosure will appreciate that the hub coherent optical transceiver device 200 may be integrated into the hub devices discussed below while remaining within the scope of the present disclosure as well. In the illustrated embodiment, the hub coherent optical transceiver device 200 includes a chassis 202 that houses the components of the hub coherent optical transceiver device 200, only some of which are illustrated and discussed below.

For example, the chassis 202 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a hub signal processing engine 204 that is configured to perform the functionality of the hub signal processing engines, hub signal processing subsystems, and/or hub coherent optical transceiver devices discussed below. In a specific example, the hub signal processing engine 204 may perform a variety of Digital Signal Processing (DSP) operations including encoding data streams into time-domain waveforms to drive coherent transmitters, decoding time-domain electrical waveforms measured at different coherent receivers into data streams, optical phase recovery and locking, polarization tracking and demultiplexing, chromatic dispersion compensation, polarization mode dispersion compensation, spectral shaping, forward error correction encoding and decoding, as well as a variety of other operations that would be apparent to one of skill in the art in possession of the present disclosure.

The chassis 202 also includes a hub device connector 206 (e.g., a multi-pin electrical connector), and the hub signal processing engine 204 (e.g., the processing system that provides the hub signal processing engine 204) is coupled to the hub device connector 206 via a data input connection 204a and a data output connection 204b. In a specific example, the hub device connector 206 may be provided by a QSFP-DD or OSFP connector, and/or other hub device connectors that would be apparent to one of skill in the art in possession of the present disclosure. The chassis 202 may also include a hub Integrated Coherent Transmit-Receive Optical Sub-Assembly (IC-TROSA) device 208 that is configured according to the teachings of the present disclosure, discussed in further detail below, and the hub signal processing engine 204 (e.g., the processing system that provides the hub signal processing engine 204) is coupled to the hub IC-TROSA device 208 via a data output connection 204c and a data input connection 204d.

The chassis 202 also includes a first hub optical network connector 210 (e.g., a duplex optical connector) that is configured to couple to an optical connector on an optical cable, and the hub IC-TROSA device 208 is coupled to the first hub optical network connector 210 via a first optical transmit connection 210a and first optical receive connection 210b. The chassis 202 also includes a second hub optical network connector 212 (e.g., a duplex optical connector) that is configured to couple to an optical connector on an optical cable, and the hub IC-TROSA device 208 is coupled to the second hub optical network connector 212 via a second optical transmit connection 212a and second optical receive connection 212b. The chassis 202 also includes a hub Integrated Tunable Laser Assembly (ITLA) device 214 that is coupled to the hub IC-TROSA device 208. As discussed below, the hub ITLA device 214 may be configured to provide light (e.g., highly-coherent, narrow-linewidth laser light waves) that is discussed below as being described by complex electrical fields referred to as a receiver local oscillator electrical field $E_L$ and a transmitter laser source electrical field $E_{St}$, and one of skill in the art in possession of the present disclosure will recognize that the receiver local oscillator electrical field $E_L$ and the transmitter laser source electrical field $E_{St}$ may be provided at the same wavelength (e.g., from a single ITLA device) or different wavelengths (e.g., from multiple ITLA devices).

Furthermore, one of skill in the art in possession of the present disclosure will appreciate that a single hub ITLA device may provide both the receiver local oscillator electrical field $E_L$ and the transmitter laser source electrical field $E_{St}$, or separate hub ITLA devices may provide the receiver local oscillator electrical field $E_L$ and the transmitter laser source electrical field $E_{St}$, while remaining within the scope of the present disclosure. Further still, while illustrated as a separate device, one of skill in the art in possession of the present disclosure will recognize that the hub ITLA device 214 may be integrated into the hub IC-TROSA device 208 while remaining within the scope of the present disclosure as well. However, while a specific hub coherent optical transceiver device 200 has been illustrated and described, one of skill in the art in possession of the present disclosure will recognize that hub coherent optical transceiver device devices (or other devices operating according to the teachings of the present disclosure in a manner similar to that described below for the hub coherent optical transceiver device 200) may include a variety of components and/or component configurations for providing conventional hub coherent optical transceiver device functionality, as well as the functionality discussed below, while remaining within the scope of the present disclosure as well.

Figure 3:
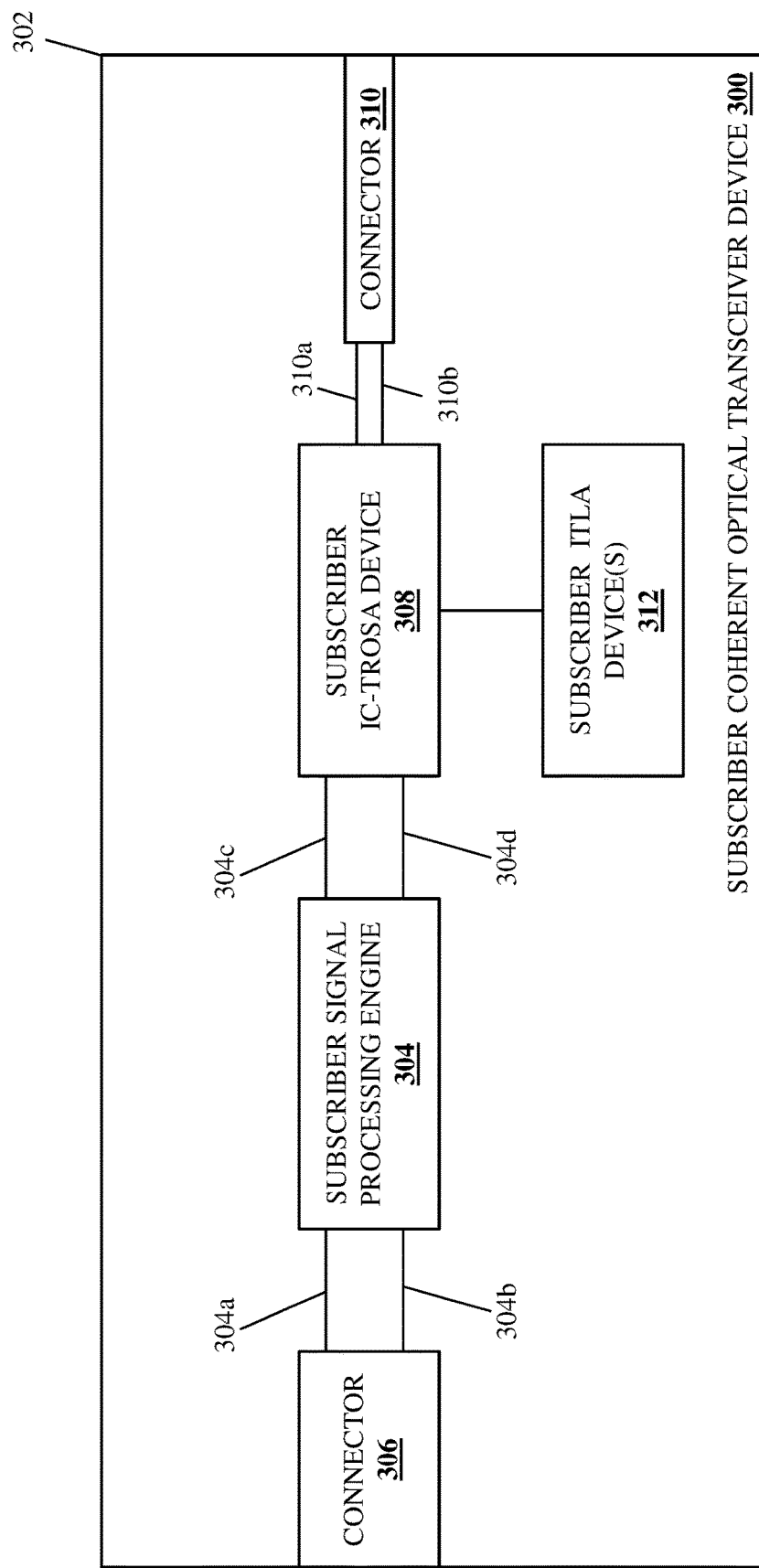
FIG. 3 is a schematic view illustrating an embodiment of a subscriber coherent optical transceiver device provided according to the teachings of the present disclosure.

Referring now to FIG. 3, an embodiment of a subscriber coherent optical transceiver device 300 is illustrated. In the embodiments illustrated and described below, the subscriber coherent optical transceiver device 300 is illustrated and described as being provided by a pluggable module such as those described in the QSFP or OSFP MSAs, although other pluggable module form-factors will fall within the scope of the present disclosure as well. Furthermore, while illustrated and described as being provided by a pluggable module, one of skill in the art in possession of the present disclosure will appreciate that the subscriber coherent optical transceiver device 300 may be integrated into the subscriber devices discussed below while remaining within the scope of the present disclosure as well. In the illustrated embodiment, the subscriber coherent optical transceiver device 300 includes a chassis 302 that houses the components of the subscriber coherent optical transceiver device 300, only some of which are illustrated and discussed below.

For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a subscriber signal processing engine 304 that is configured to perform the functionality of the subscriber signal processing engines, subscriber signal processing subsystems, and/or subscriber coherent optical transceiver devices discussed below. In a specific example, the subscriber signal processing engine 304 may perform a variety of DSP operations including encoding data streams into time-domain waveforms to drive coherent transmitters, decoding time-domain electrical waveforms measured at different coherent receivers into data streams, optical phase locking, polarization tracking and demultiplexing, chromatic dispersion compensation, polarization mode dispersion compensation, spectral shaping, forward error correction encoding and decoding, as well as a variety of other operations that would be apparent to one of skill in the art in possession of the present disclosure.

As discussed below, the subscriber signal processing engine 304 may be configured to perform signal processing operations that enable it to decode signals received from the hub coherent optical transceiver device 200. In an embodiment, the subscriber coherent optical transceiver device 300 may be a conventional subscriber coherent optical transceiver device with the exception of the subscriber signal processing engine 304 that may be configured to perform first signal processing operations on first optical signals received from the hub coherent optical transceiver device 200, and second signal processing operations on second optical signals received from the hub coherent optical transceiver device 200. For example, the first signal processing operations discussed above may be conventional signal processing operations that are configured to decode conventional optical signals from the hub coherent optical transceiver device 200, while the second signal processing operations may be configured to decode optical signals from the hub coherent optical transceiver device 200 that are generated according to the teachings of the present disclosure.

In a specific example in which the subscriber coherent optical transceiver device 300 is a conventional subscriber coherent optical transceiver device, the subscriber signal processing engine 304 may be upgraded, updated, and/or otherwise configured by the subscriber coherent optical transceiver device 300 receiving (e.g., via the point-to-multipoint optical network, via an out-of-band channel, etc.), a subscriber signal processing engine update, and processing that subscriber signal processing engine update (e.g., performing a software/firmware update) in order to configure the subscriber coherent optical transceiver device to perform the second signal processing operations when appropriate. However, while the subscriber coherent optical transceiver device 300 is described as a conventional subscriber coherent optical transceiver device that has its software/firmware upgraded/updated/configured to enable the functionality of the present disclosure, one of skill in the art in possession of the present disclosure will appreciate how embodiments in which the subscriber coherent optical transceiver device 300 is configured similarly to the hub coherent optical transceiver device 200 (e.g., with the subscriber IC-TROSA device discussed below configured similarly to the hub IC-TROSA device 208 discussed above, but operating using only one of the optical transmit connections and one of the optical receive connections, discussed below) will fall within the scope of the present disclosure as well.

The chassis 302 also includes a subscriber device connector 306 (e.g., an electrical connector), and the subscriber signal processing engine 304 (e.g., the processing system that provides the subscriber signal processing engine 304) is coupled to the subscriber device connector 306 via a data input connection 304a and a data output connection 304b (e.g., a plurality of parallel data connections that provide the data input connection 304a and the data output connection 304b and that each carry a distinct data stream). In a specific example, the subscriber device connector 306 may be provided by a QSFP or OSFP connector, and/or other subscriber device connectors that would be apparent to one of skill in the art in possession of the present disclosure. The chassis 302 may also include a subscriber IC-TROSA device 308, and the subscriber signal processing engine 304 (e.g., the processing system that provides the subscriber signal processing engine 304) is coupled to the subscriber IC-TROSA device 308 via a data output connection 304c and a data input connection 304d (e.g., a plurality of parallel data connections that provide the data output connection 304c and the data input connection 304d and that each carry a distinct data stream), with the electrical data output connection 304c including one or more optical modulator driver circuits, and the electrical data input connection 304d including one or more electrical amplifier circuits. As discussed above, the subscriber IC-TROSA device 308 may be provided by a conventional subscriber IC-TROSA device, with the subscriber signal processing engine 304 configured to enable the functionality of the present disclosure via signal processing operations performed on signals received from the hub coherent optical transceiver device 200. However, one of skill in the art in possession of the present disclosure will appreciate how embodiments in which the subscriber IC-TROSA device 308 is configured similarly to the hub IC-TROSA device 208 discussed above will within the scope of the present disclosure as well.

The chassis 302 also includes a subscriber optical network connector 310 (e.g., a duplex optical connector) that is configured to couple to an optical connector on an optical cable, and the subscriber IC-TROSA device 308 is coupled to the subscriber optical network connector 310 via an optical transmit connection 310a and an optical receive connection 310b. The chassis 302 also includes one or more subscriber ITLA device(s) 312 that are coupled to the subscriber IC-TROSA device 308. Similarly as described above for the hub ITLA device 214, the subscriber ITLA device(s) 312 may be configured to provide highly-coherent, narrow-linewidth laser light waves described by complex electrical fields referred to as a receiver local oscillator electrical field $E_L$ and a transmitter laser source electrical field $E_{St}$, and one of skill in the art in possession of the present disclosure will recognize that the receiver local oscillator electrical field $E_L$ and the transmitter laser source electrical field $E_{St}$ may be provided at the same wavelength or different wavelengths.

Furthermore, one of skill in the art in possession of the present disclosure will appreciate that a single subscriber ITLA device may provide both the receiver local oscillator electrical field $E_L$ and the transmitter laser source electrical field $E_{St}$, or separate subscriber ITLA devices may provide the receiver local oscillator electrical field $E_L$ and the transmitter laser source electrical field $E_{St}$, while remaining within the scope of the present disclosure. Further still, while illustrated as a separate device, one of skill in the art in possession of the present disclosure will recognize that the subscriber ITLA device(s) 312 may be integrated into the subscriber IC-TROSA device 308 while remaining within the scope of the present disclosure as well. However, while a specific subscriber coherent optical transceiver device 300 has been illustrated and described, one of skill in the art in possession of the present disclosure will recognize that subscriber coherent optical transceiver device devices (or other devices operating according to the teachings of the present disclosure in a manner similar to that described below for the subscriber coherent optical transceiver device 300) may include a variety of components and/or component configurations for providing conventional subscriber coherent optical transceiver device functionality, as well as the functionality discussed below, while remaining within the scope of the present disclosure as well.

Figure 4:
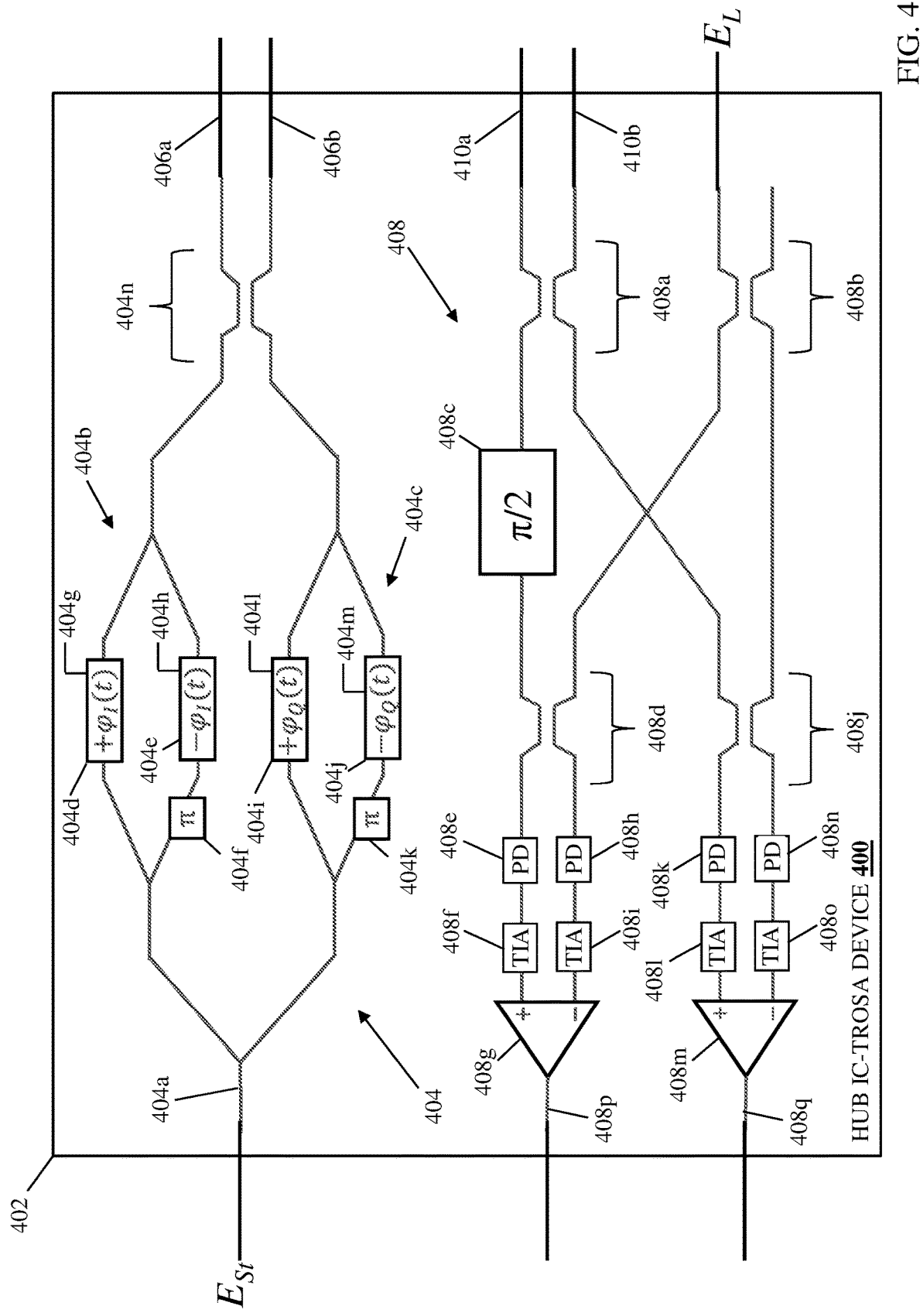
FIG. 4 is a schematic view illustrating an embodiment of the hub coherent optical transceiver device of FIG. 2.

Referring now to FIG. 4, an embodiment of a hub IC-TROSA device 400 is illustrated that may provide the hub IC-TROSA device 208 discussed above with reference to FIG. 2. As will be appreciated by one of skill in the art in possession of the present disclosure, the hub IC-TROSA device 400 may be based on photonic integrated circuits (PICs) that include optical waveguides at or near the surface of a planar substrate that utilizes substrate materials such as silicon (Si—also known as silicon photonics), indium phosphide (InP), silica ($SiO_2$) and lithium niobate ($LiNbO_3$), and/or other substrate materials known in the art. While it is often advantageous for both transmit subsystems and receive subsystems (discussed below) in an IC-TROSA device to be fabricated on the same substrate, both conventional IC-TROSA devices and the hub IC-TROSA device of the present disclosure may utilize transmit subsystems and receive subsystems fabricated on distinct substrates that may be based on different materials, and alternate embodiments of the hub IC-TROSA device 400 discussed below may utilize discrete optical components or a hybrid-mix of discrete and integrated optical components.

In the illustrated embodiment, the hub IC-TROSA device 400 includes a chassis 402 that houses the components of the hub IC-TROSA device 400, only some of which are illustrated and described below. As will be appreciated by one of skill in the art in possession of the present disclosure, the illustrated embodiment of the hub IC-TROSA device 400 provides schematic details of a hub IC-TROSA transmit subsystem and a hub IC-TROSA receive subsystem that are provided according to the teachings of the present disclosure, and omits many components that one of skill in the art will recognize would be included in an IC-TROSA device for clarity of discussion. For example, while not illustrated, the hub IC-TROSA device of the present disclosure may include adjustable (thermal and/or electro-optic) phase controllers, optical phase delays, adjustable modulator bias control, optical taps, photo-detectors, monitor photodiodes, beam splitters, traces for electrical signals, local heaters, temperature sensors, optical amplifiers, variable optical attenuators, polarization rotators/controllers and polarization beam combiners/splitters, as well as other IC-TROSA components that would be apparent to one of skill in the art in possession of the present disclosure. As will be appreciated by one of skill in the art in possession of the present disclosure, optimized implementations of the hub IC-TROSA device of the present disclosure may include the appropriate use of one or more of components discussed above (e.g., bias voltage control of the optical directional couplers discussed in further detail below, as well as monitor photodiodes, may be useful in such optimization).

The hub IC-TROSA transmit subsystem in the embodiment illustrated in FIG. 4 may be provided by a quadrature optical modulator subsystem 404 that includes an optical input 404a that may be coupled to the hub ITLA device 214, and that may be configured to receive light that includes the transmitter laser source electrical field $E_{St}$ provided by the hub ITLA device 214.

As will be appreciated by one of skill in the art in possession of the present disclosure, the quadrature optical modulator subsystem in the hub IC-TROSA device 400 may (and typically will) include a pair of quadrature optical modulator devices (e.g., a I quadrature optical modulator device and an Q quadrature optical modulator device) that operate to double the data capacity of the hub IC-TROSA transmit subsystem, and each quadrature optical modulator device may be configured similarly to the quadrature optical modulator subsystem 404 described herein. Furthermore, while the discussion herein is related to coherent optical signal transmission via a single polarization, one of skill in the art in possession of the present disclosure will appreciate how the use of dual polarization within the hub IC-TROSA transmit subsystem via two quadrature optical modulator devices (e.g., with the quadrature optical modulator devices modulating data into orthogonal polarizations of a light wave, and with the distinct polarizations combined with polarization beam combiners) will provide substantial benefits as well.

As will be appreciated by one of skill in the art in possession of the present disclosure, the quadrature optical modulator subsystem 404 also includes a pair of Mach Zehnder (MZ) interferometer devices 404b and 404c. In the illustrated embodiment, the MZ interferometer device 404b is coupled to the optical input 404a and includes a $+\varphi_I(t)$ phase modulator 404d directly coupled to the optical input 404a, and a $-\varphi_I(t)$ phase modulator 404e coupled to the optical input 404a by a $\pi$ phase shifter 404f, with the $+\varphi_I(t)$ phase modulator 404d including a connection 404g to the hub signal processing engine 204 (e.g., via a modulator driver, not illustrated in FIGS. 2 and 4), and the $-\varphi_I(t)$ phase modulator 404e including a connection 404h to the hub signal processing engine 204 (e.g., via a modulator driver, not illustrated in FIGS. 2 and 4). The MZ interferometer device 404c is coupled to the optical input 404a and includes a $+\varphi_Q(t)$ phase modulator 404i directly coupled to the optical input 404a, and a $-\varphi_Q(t)$ phase modulator 404j coupled to the optical input 404a by a $\pi$ phase shifter 404k, with the $+\varphi_Q(t)$ phase modulator 404i including a connection 404l to the hub signal processing engine 204 (e.g., via a driver, not illustrated in FIGS. 2 and 4), and the $-\varphi_Q(t)$ phase modulator 404j including a connection 404m to the hub signal processing engine 204 (e.g., via a modulator driver, not illustrated in FIGS. 2 and 4).

As will be appreciated by one of skill in the art in possession of the present disclosure, each path to the MZ interferometer devices 404b and 404c may be driven in a "push/pull" fashion by voltages to generate a differential optical phase shift of $\pm\varphi_{I,Q}(t)$ (i.e., via the electro-optic effect). Furthermore, one of skill in the art in possession of the present disclosure will appreciate that each of the MZ interferometer devices 404b and 404c may be driven by a four-level Pulse Amplitude Modulation (4-PAM) signal, and the output of the interferometer devices 404b and 404c may be provided via the 16-Quadrature Amplitude Modulation (16-QAM) optical signal modulation format that describes a 4-bit/16 element symbol or constellation.

While the present disclosure describes the quadrature optical modulator subsystem 404 utilizing MZ interferometer devices 404b and 404c, one of skill in the art will appreciate how the quadrature optical modulator subsystem may instead utilize optical ring resonators [e.g., see P. Dong. C. Xie, L. L. Buhl and Y. Chen, "Silicon Microring Modulators for Advanced Modulation Formats," presented at *Optical Fiber Communication Conference* (*OFC*), Anaheim, USA, 2013, paper OW4J.2], electro-absorption modulators [e.g., see I. Kang, "Phase-shift-keying and on-off-keying with improved performances using electroabsorption modulators with interferometric effects," *Optics Express*, vol. 15, no. 4, pp. 1467-1473, 2007], directly modulated lasers [e.g., see P. Dong, A. Melikyan, K. Kim, N. Kaneda, B. Stern and Y. Bacyens, "In-phase/quadrature modulation using directly reflectivity-modulated laser," *Optica*, vol. 7, no. 8 pp. 929-933, 2020], and/or other techniques for providing the functionality described below.

The quadrature optical modulator subsystem 404 also includes an optical directional coupler device 404n that receives a respective output from each of the MZ interferometer devices 404b and 404c as inputs, and provides respective outputs via a first optical transmit connection 406a (which may provide the first optical transmit connection 210a discussed above with reference to FIG. 2), and a second optical transmit connection 406b (which may provide the second optical transmit connection 212a). One of skill in the art in possession of the present disclosure will appreciate how the optical directional coupler devices discussed below and/or its functionality may be provided by any device or combination of devices having a pair of single-mode inputs and a pair of single-mode outputs along with the optical directional coupler functionality described below, and thus may include "conventional" optical directional couplers, 2×2 Multi-Mode Interferometers (MMIs), optical phase shifters, 2×2 directional couplers, 2×2 Mach Zhender interferometers, and/or other optical devices that would be apparent to one of skill in the art in possession of the present disclosure. In fact, it can be shown that any 2×2 single-mode unitary optical transfer function can be constructed from a finite set of directional couplers, phase shifters, and 2×2 Mach Zehnder interferometers. [Michael Reck, Anton Zeilinger, Herbert J. Bernstein, and Philip Bertani, "Experimental realization of any discrete unitary operator". *Physical Review Letters*, vol. 73, page 58 (1994)] (The transfer matrix for the particular directional coupler used for calculations in that paper, as well as an arbitrary directional coupler, is provided below).

One of skill in the art in possession of the present disclosure will recognize that the optical directional coupler device 404n may be relatively sensitive to optical wavelength, and thus may be adjusted for different wavelengths of light provided by ITLA device(s) (e.g., via optical sensors coupled to the first optical transmit connection 406a and/or the second optical transmit connection 406b in order to accommodate optimization of the optical directional coupler device 404n via a closed-loop feedback system). As will be appreciated by one of skill in the art in possession of the present disclosure, the first optical transmit connection 406a may be configured to transmit optical signals having an I quadrature and a Q quadrature that differ in optical phase by $+\pi/2$ radians, while the second optical transmit connection 406b may be configured to transmit optical signals having the I quadrature and the Q quadrature that differ in optical phase by $-\pi/2$ radians, with the light waves providing the optical signals to both the first optical transmit connection 406a and the second optical transmit connection 406b having identical average power and carrying identical information with information components (i.e., quadratures) in a different optical phase relationship.

In another embodiment, the optical directional coupler device 404n discussed above may be replaced by optical amplifier devices (e.g., integrated into the hub IC-TROSA device 400 or the hub coherent optical transceiver device 200, coupled to the hub coherent optical transceiver device 200, etc.) that support the dual transmit connections 406a and 406*b* (i.e., at the expense of higher power consumption, increased heat dissipation requirements, and additional space requirements) and that are located between a single-output 2×1 Y-junction and a dual-output 1×2 Y junction. For example, such optical amplifier devices may operate to amplify the output power of optical signals produced by the quadrature optical modulator subsystem 404 to produce amplified output signals (e.g., with double the output power of the optical signals produced by the quadrature optical modulator subsystem 404), and provide those amplified optical signals to a 1×2 Y-junction optical waveguide that provides the dual transmit connections 406*a* and 406*b* that each output optical signals with output power equivalent to the output power of the optical signals produced by the quadrature optical modulator subsystem 404. As will be appreciated by one of skill in the art in possession of the present disclosure, the use of such optical amplifiers as discussed above adds costs and requires additional power for the optical amplification, and the resulting optical signals may be degraded (e.g., by the finite noise figure of the optical amplifiers).

As illustrated, the hub IC-TROSA receive subsystem in the embodiment illustrated in FIG. 4 may also include an optical hybrid mixer subsystem 408, which one of skill in the art in possession of the present disclosure will recognize may be provided by a 90-degree hybrid optical mixer device and/or other optical hybrid mixer subsystems known in the art. As will be appreciated by one of skill in the art in possession of the present disclosure, the hub IC-TROSA device 400 may (and typically will) include a pair of optical hybrid mixer devices (e.g., a X-polarization 90-degree hybrid mixer device and a Y-polarization 90-degree hybrid mixer device) that operate to double the data capacity of the hub IC-TROSA receive subsystem, and that each optical hybrid mixer device may be configured similarly to the optical hybrid mixer subsystem 408 described herein. Furthermore, while the discussion herein is related to coherent optical signal reception via a single polarization, one of skill in the art in possession of the present disclosure will appreciate how the use of dual polarization with the hub IC-TROSA receive subsystem via two optical hybrid mixer devices (e.g., with the optical hybrid mixer devices receiving data that was modulated into orthogonal polarizations of a light wave, and using a polarization beam splitter to separate the received light wave into orthogonal polarization states, and with signal processing operations utilized to recover the data from those orthogonal polarization states) will provide substantial benefits as well. In the illustrated embodiment, the optical hybrid mixer subsystem 408 includes an optical directional coupler device 408*a* having a first optical receive connection 410*a* (which may be provided by the first optical receive connection 210*b* discussed above with reference to FIG. 2), and a second optical receive connection 410*b* (which may be provided by the second optical receive connection 212*b*).

In the illustrated embodiment, the optical hybrid mixer subsystem 408 includes an optical directional coupler device 408*b* that is configured to receive light having the receiver local oscillator electrical field $E_L$ provided by the hub ITLA device 214 at one of its inputs, with the other input of the optical directional coupler device 408*b* unused, and one of skill in the art in possession of the present disclosure will recognize how the optical directional coupler device 408*b* may be replaced by a 1×2 Y-junction optical waveguide that is configured to receive light having the receiver local oscillator electrical field $E_L$ from the hub ITLA device 214 while remaining within the scope of the present disclosure as well.

As can be seen in FIG. 4, the optical directional coupler device 408*a* is configured to mix the optical signals received via the first optical receive connection 410*a* and the second optical receive connection 410*b* to generate a "first mixed signal" and a "second mixed signal", and provide the first mixed signal through a π/2 phase shifter 408*c* in the optical hybrid mixer subsystem 408. Furthermore, an optical directional coupler device 408*d* is coupled to the π/2 phase shifter 408*c* and the optical directional coupler device 408*b* in the optical hybrid mixer subsystem 408, and is configured to mix the first mixed signal received via the π/2 phase shifter 408*c* and the light with the receiver local oscillator electrical field $E_L$ to generate a "third mixed signal" and a "fourth mixed signal", and provide the third mixed signal through a photo diode (PD) 408*c*, a transimpedance amplifier (TIA) 408*f*, and to a first input on a differential amplifier 408*g*, while providing the fourth mixed signal through a PD 408*h*, a TIA 408*i*, and to a second input on the differential amplifier 408*g*.

Further still, an optical directional coupler device 408*j* is coupled to the optical directional coupler devices 408*a* and 408*b* in the optical hybrid mixer subsystem 408, and is configured to mix the second mixed signal and light having the receiver local oscillator electrical field $E_L$ to generate a "fifth mixed signal" and a "sixth mixed signal", and provide the fifth mixed signal through a PD 408*k*, a TIA 408*l*, and to a first input on a differential amplifier 408*m*, while providing the sixth mixed signal through a PD 408*n*, a TIA 408*o*, and to a second input on the differential amplifier 408*m*. As will be appreciated by one of skill in the art in possession of the present disclosure, the hub IC-TROSA receive subsystem illustrated in FIG. 4 is configured to convert the optical signals received at the first optical receive connection 410*a* and the second optical receive connection 410*b* to electrical signals (i.e., voltages) at outputs 408*p* and 408*q* of the differential amplifiers 408*g* and 408*m*, respectively, discussed in further detail below. As will be appreciated by one of skill in the art in possession of the present disclosure, while illustrated and described as internal to the hub IC-TROSA device 400, the PDs, TIAs, and/or differential amplifiers may be external to the hub IC-TROSA device 400, may be integrated in the hub signal processing engine 204, and/or may be provided in other manners while remaining within the scope of the present disclosure as well.

As such, while a specific hub IC-TROSA device 400 has been illustrated and described, one of skill in the art in possession of the present disclosure will appreciate how hub IC-TROSA devices provided according to the teachings of the present disclosure may include other components and/or component configurations for providing the functionality discussed below while remaining within the scope of the present disclosure as well. For example, while the embodiments of the hub IC-TROSA device 400 illustrated and described herein include both the hub IC-TROSA transmit subsystem with dual transmit connections 406*a* and 406*b*, along with the hub IC-TROSA transmit subsystem with dual receive connections 410*a* and 410*b*, other embodiments may provide either the hub IC-TROSA transmit subsystem with dual transmit connections 406*a* and 406*b*, or the hub IC-TROSA transmit subsystem with dual receive connections 410*a* and 410*b*, while remaining within the scope of the present disclosure as well.

Figure 5:
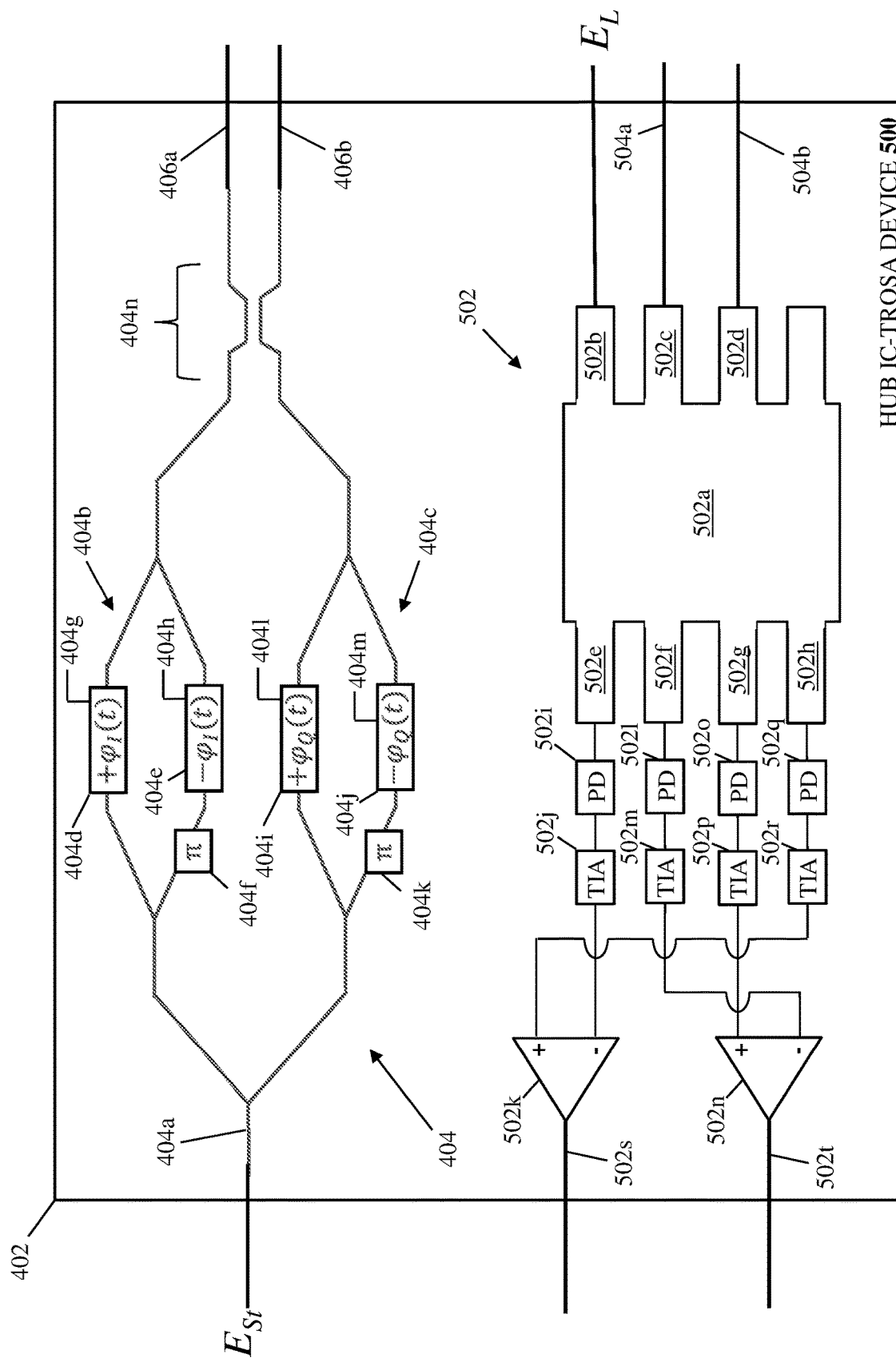
FIG. 5 is a schematic view illustrating an embodiment of the hub coherent optical transceiver device of FIG. 2.

For example, FIG. 5 illustrates another embodiment of a hub IC-TROSA device 500 that may provide the hub IC- TROSA device 208 discussed above with reference to FIG. 2, and that includes some components that are the same as the IC-TROSA device 400 discussed above with reference to FIG. 4, with common components provided with the same element numbers. As such, the hub IC-TROSA device 500 includes the chassis 402 that houses the hub IC-TROSA transmit subsystem provided by the quadrature optical modulator subsystem 404 described above. However, the hub IC-TROSA receive subsystem in the embodiment illustrated in FIG. 5 may include an optical hybrid mixer subsystem 502, which one of skill in the art in possession of the present disclosure will recognize may be provided by a multimode interference (MMI) device that includes a multimode waveguide 502a coupled to a plurality of single-mode waveguides 502b, 502c, 502d, 502e, 502f, 502g, and 502h. As will be appreciated by one of skill in the art in possession of the present disclosure, the optical hybrid mixer subsystem in the hub IC-TROSA device 500 may (and typically will) include a pair of MMI devices (e.g., one for each polarization), and that each MMI device may be configured similarly to the optical hybrid mixer subsystem 502 described herein. In the examples discussed below, the optical hybrid mixer subsystem 502 may include optical phase relationships between its input ports and output ports that are described by the table below:

|  |  | OUTPUT | | | |
| --- | --- | --- | --- | --- | --- |
|  |  | 1 | 2 | 3 | 4 |
| INPUT | 1 | 0 | $3\pi/4$ | $-\pi/4$ | 0 |
|  | 2 | $3\pi/4$ | 0 | 0 | $-\pi/4$ |
|  | 3 | $-\pi/4$ | 0 | 0 | $3\pi/4$ |
|  | 4 | 0 | $-\pi/4$ | $3\pi/4$ | 0 |

In the illustrated embodiment, the single-mode waveguide 502b on the optical hybrid mixer subsystem 502 is configured to receive light having the receiver local oscillator electrical field $E_L$ from the hub ITLA device 214, the single-mode waveguide 502c on the optical hybrid mixer subsystem 502 is coupled to a first optical receive connection 504a (which may be provided by the first optical receive connection 210b discussed above with reference to FIG. 2), and the single-mode waveguide 502d is coupled to a second optical receive connection 502d (which may be provided by the second optical receive connection 212b). Furthermore, the single-mode waveguide 502e on the optical hybrid mixer subsystem 502 is coupled to a PD 502i, a TIA 502j, and to a first input on a differential amplifier 502k; the single-mode waveguide 502f on the optical hybrid mixer subsystem 502 is coupled to a PD 502l, a TIA 502m, and to a first input on a differential amplifier 502n; the single-mode waveguide 502g on the optical hybrid mixer subsystem 502 is coupled to a PD 502o, a TIA 502p, and to a second input on the differential amplifier 502n; and the single-mode waveguide 502h on the optical hybrid mixer subsystem 502 is coupled to a PD 502q, a TIA 502r, and to a second input on the differential amplifier 502k. As will be appreciated by one of skill in the art in possession of the present disclosure, the hub IC-TROSA receive subsystem illustrated in FIG. 5 is configured to convert the optical signals received at the first optical receive connection 504a and the second optical receive connection 504b to electrical signals (i.e., voltages) at outputs 502s and 502t of the differential amplifiers 502k and 502n, respectively, discussed in further detail below.

Figure 6:
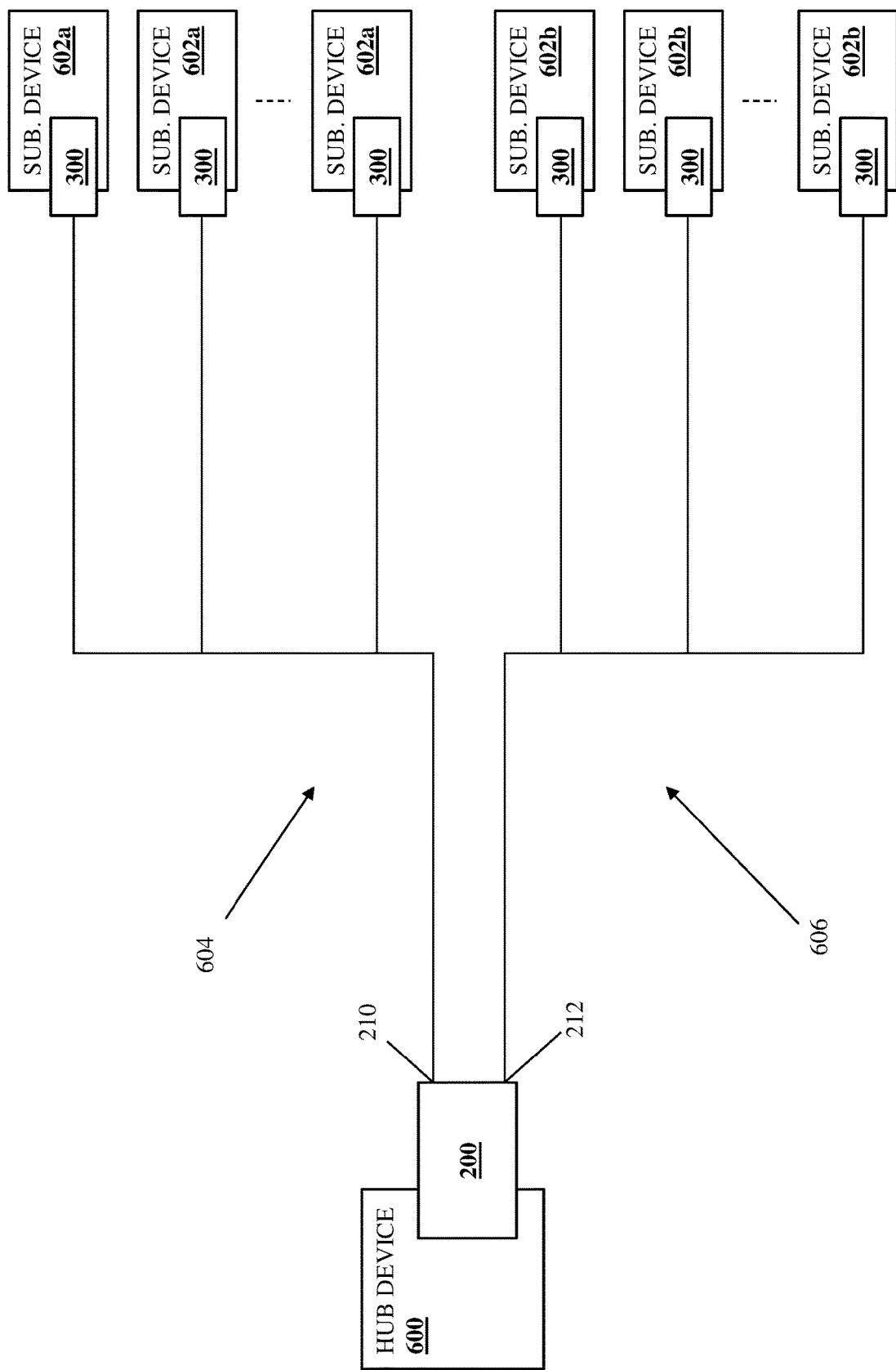
FIG. 6 is a schematic view illustrating an embodiment of the hub coherent optical transceiver device of FIG. 2 coupled to a hub device, as well as to a plurality of the subscriber coherent optical transceiver devices of FIG. 3 (which are each coupled to subscriber devices) via a plurality of networks.
Figure 7:
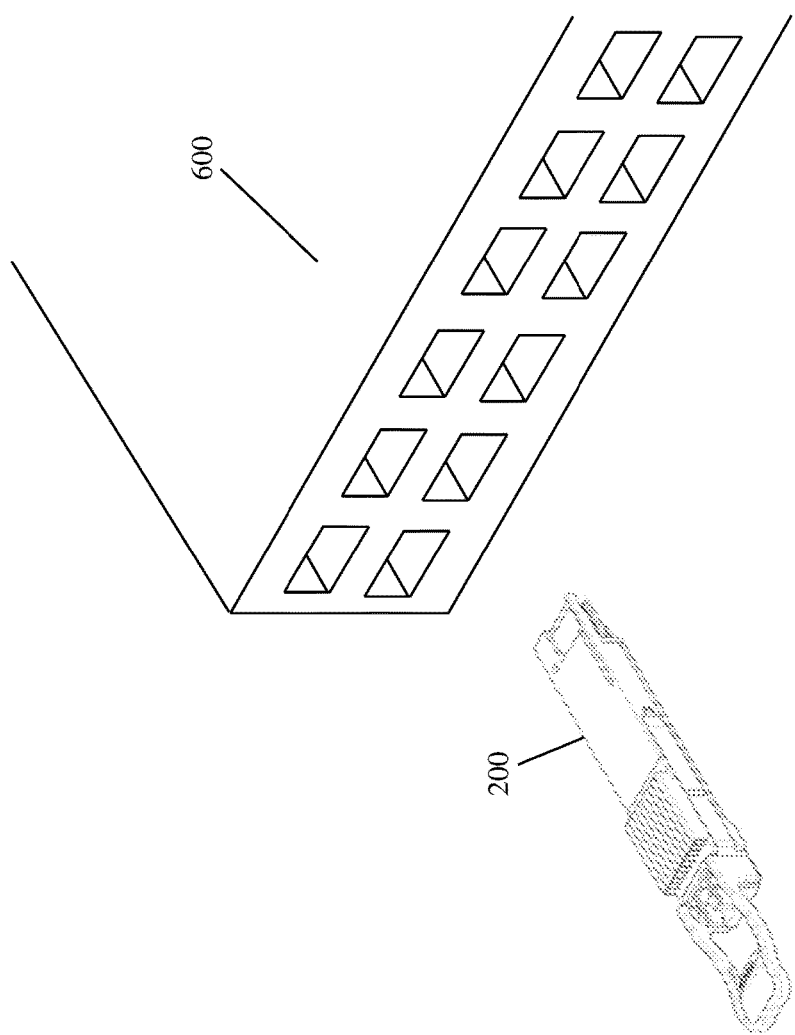
FIG. 7 is a perspective view illustrating an embodiment of the hub coherent optical transceiver device of FIG. 2 being coupled to a hub device.

With reference to FIGS. 6 and 7, the hub coherent optical transceiver device 200 may be provided on a hub device 600. In an embodiment, the hub device 600 may be provided by the IHS 100 discussed above with reference to FIG. 1 and/or may include some or all of the components of the IHS 100, and in specific examples may be provided by a networking device (e.g., a switch device, a router device, a subscriber gateway device, a radio unit device, etc.) and/or other computing devices that would be apparent to one of skill in the art in possession of the present disclosure. As discussed above, in many embodiments the hub coherent optical transceiver device 200 may be provided as a pluggable module that may be connected to a port on the hub device 600 (e.g., a host provided by the hub device 600), as illustrated in FIG. 7, although embodiments in which the hub coherent optical transceiver device 200 is integrated in the hub device 600 will fall within the scope of the present disclosure as well. FIG. 6 also illustrates how a respective one of the subscriber coherent optical transceiver devices 300 may be provided on each of a plurality of subscriber devices 602a and 602b. In an embodiment, any or all of the subscriber devices 602a and 602b may be provided by the IHS 100 discussed above with reference to FIG. 1 and/or may include some or all of the components of the IHS 100, and in specific examples may be provided by server devices, networking devices (e.g., switch devices or router devices), subscriber gateway devices, storage systems, and/or other computing devices that would be apparent to one of skill in the art in possession of the present disclosure. As discussed above, in many embodiments the subscriber coherent optical transceiver devices 300 may be provided as pluggable modules that may be connected to a port on the subscriber devices 602a and 602b, although embodiments in which the subscriber coherent optical transceiver devices 300 are integrated in the subscriber devices 602a and 602b will fall within the scope of the present disclosure as well.

FIG. 6 illustrates how the connector 210 on the hub coherent optical transceiver device 200 that is coupled to the first optical transmit connection 210a and first optical receive connection 210b is connected to the respective subscriber coherent optical transceiver devices 300 provided with each the subscriber devices 602a by a Passive Optical Network (PON) 604 that, as described in further detail below, provides a first point-to-multipoint optical network. FIG. 6 also illustrates how the connector 212 on the hub coherent optical transceiver device 200 that is coupled to the second optical transmit connection 212a and second optical receive connection 212b is connected to the respective subscriber coherent optical transceiver devices 300 provided with each the subscriber devices 602b by a PON 606 that, as described in further detail below, provides a second point-to-multipoint optical network. However, while point-to-multipoint optical networks are illustrated and described herein, one of skill in the art in possession of the present disclosure will appreciate how the PONs 604 and/or 606 (and/or other PONs discussed below) may provide point-to-point networks (e.g., like those illustrated in FIGS. 33 and 34 and discussed below) while remaining within the scope of the present disclosure as well. One of skill in the art will recognize that the coupling of the hub device 600 and subscriber devices 602a in FIG. 6 has been greatly simplified, and in actual implementation may include asymmetric Y-couplers of different asymmetries, and/or other components that would be apparent to one of skill in the art. Furthermore, as will be appreciated by one of skill in the art in possession of the present disclosure, the PONs 604 and 606 may be provided as a connection to a 1×N optical splitter, although other PON provisioning techniques are envisioned as falling within the scope of the present disclosure as well.

As will be appreciated by one of skill in the art in possession of the present disclosure, the PONs 604 and 606 are illustrated and described below as provided by bi-directional optical networks and, as such, the PONs 604 and 606, the hub coherent optical transceiver device 200, and/or the subscriber coherent optical transceiver devices 300 may include optical circulators that are configured to, for example, combine light waves traveling in opposite directions into a single optical fiber in order to decrease the overall fiber count in that optical network. However, one of skill in the art in possession of the present disclosure will appreciate that each of the bi-direction optical networks illustrated herein may be replaced with a respective pair of parallel point-to-multipoint optical networks that include a first/upstream optical network and a second/downstream optical network while remaining within the scope of the present disclosure as well.

Figure 8:
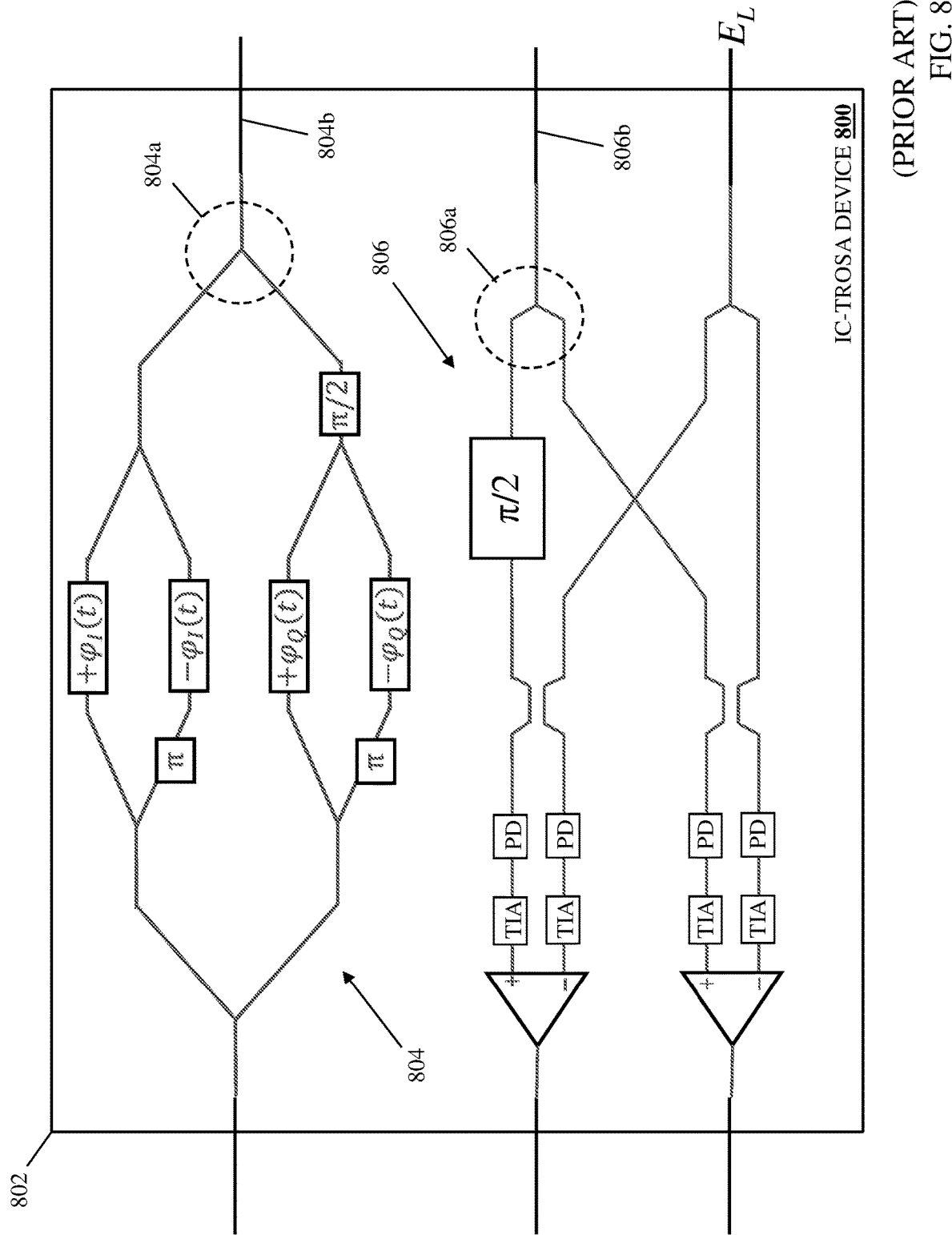
FIG. 8 is a schematic view illustrating an embodiment of a conventional IC-TROSA device.

Referring now to FIG. 8, an embodiment of a conventional IC-TROSA device 800 is illustrated and described briefly for purposes of identifying issues with its operation, as well as to contrast the benefits of the teachings of the present disclosure. As illustrated, the conventional IC-TROSA device 800 includes a chassis 802 that houses an IC-TROSA transmit subsystem 804 and an IC-TROSA receive subsystem 806. As will be appreciated by one of skill in the art in possession of the present disclosure, the IC-TROSA transmit subsystem 804 in the conventional IC-TROSA device 800 includes a quadrature optical modulator device having a single 2×1 single-mode Y-junction 804a that provides a single optical transmit connection 804b, while the IC-TROSA receive subsystem 806 in the conventional IC-TROSA device 800 includes a 90-degree optical hybrid mixer device having a 1×2 single-mode Y-junction 806a that provides a single optical receive connection 806b. As will be appreciated by one of skill in the art in possession of the present disclosure, the conventional IC-TROSA device 800 may be provided in conventional coherent optical transceiver devices, and thus the discussions of the use and/or operation of the conventional IC-TROSA device 800 below may assume the presence of the conventional coherent optical transceiver device while omitting its illustration and discussion for clarity.

Figure 9:
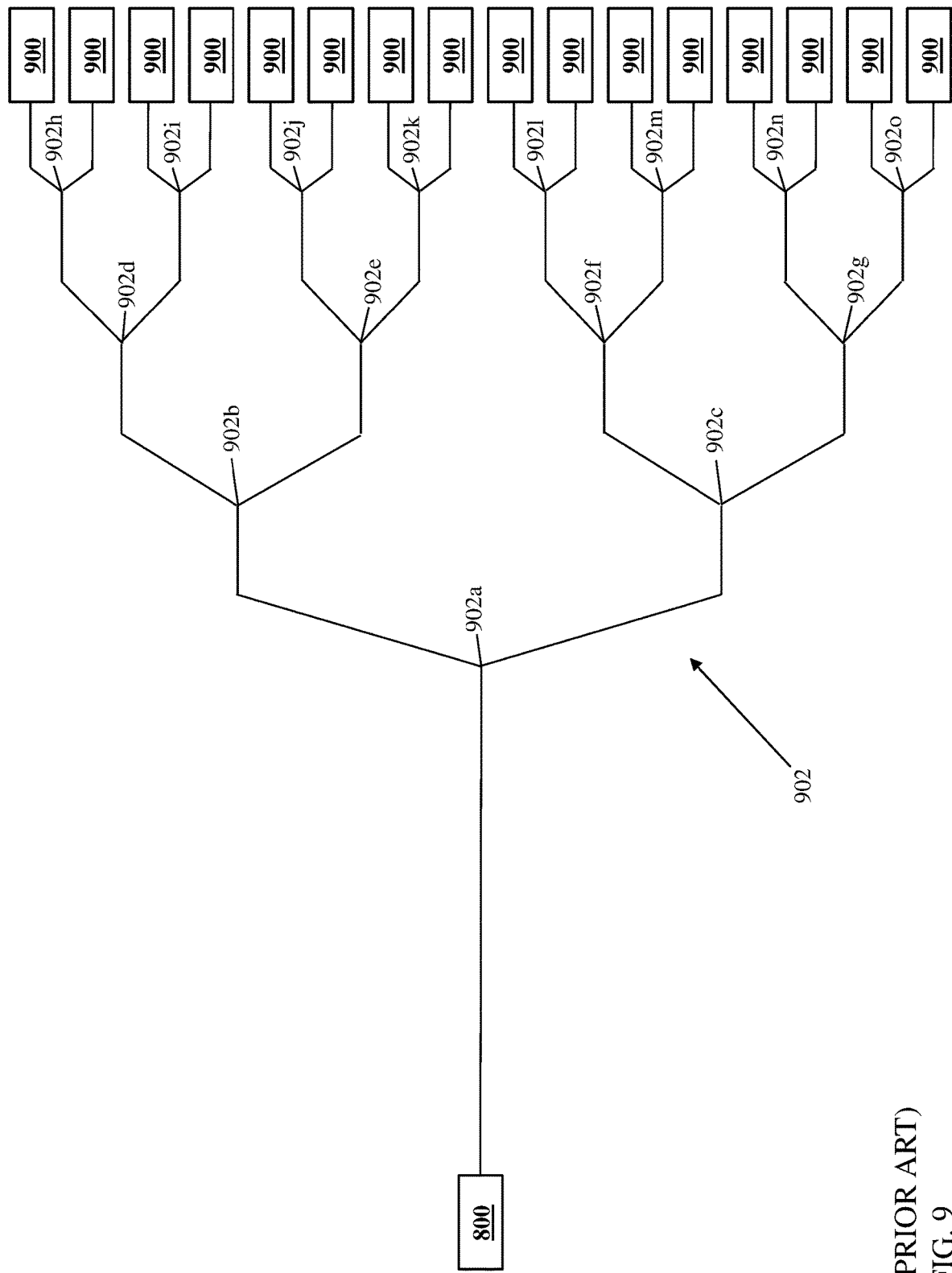
FIG. 9 is a schematic view illustrating an embodiment of the conventional IC-TROSA device of FIG. 8 coupled to subscriber devices via a network.

Referring now to FIG. 9, an embodiment of the coupling of the conventional IC-TROSA device 800 (e.g., a hub IC-TROSA device in a hub coherent optical transceiver device) to subscriber devices 900 via a point-to-multipoint optical network 902 is illustrated and described briefly for purposes of identifying issues with its operation, as well as to contrast the benefits of the teachings of the present disclosure. One of skill in the art in possession of the present disclosure will recognize that the point-to-multipoint optical network 902 may be a bi-directional optical network that may include the optical circulators or a pair of parallel point-to-multipoint optical networks similarly as discussed above. As illustrated, the optical transmit connection 804b and the optical receive connection 806b on the conventional IC-TROSA device 800 may couple to a port on a conventional hub coherent optical transceiver device (not illustrated), and the point-to-multipoint optical network 902 may be connected to that port as well as to each of the subscriber devices 900. FIG. 9 illustrates how the point-to-multipoint optical network 902 may include a plurality of 1×2 single-mode Y-junction optical waveguides 902a, 902b, 902c, 902d, 902e, 902f, 902g, 902h, 902i, 902j, 902k, 902l, 902m, 902n, and 902o (i.e., in the conventional-hub-IC-TROSA-device-to-subscriber-device direction) in order to split the connection from the conventional IC-TROSA device 800 to 16 subscriber devices 900. As will be appreciated by one of skill in the art in possession of the present disclosure, while the 1×2 single-mode Y-junction optical waveguides 902a-902o are illustrated separately, those 1×2 single-mode Y-junction optical waveguides 902a-902o may be provided by a single 1×N splitter device while remaining within the scope of the present disclosure.

Figure 10:
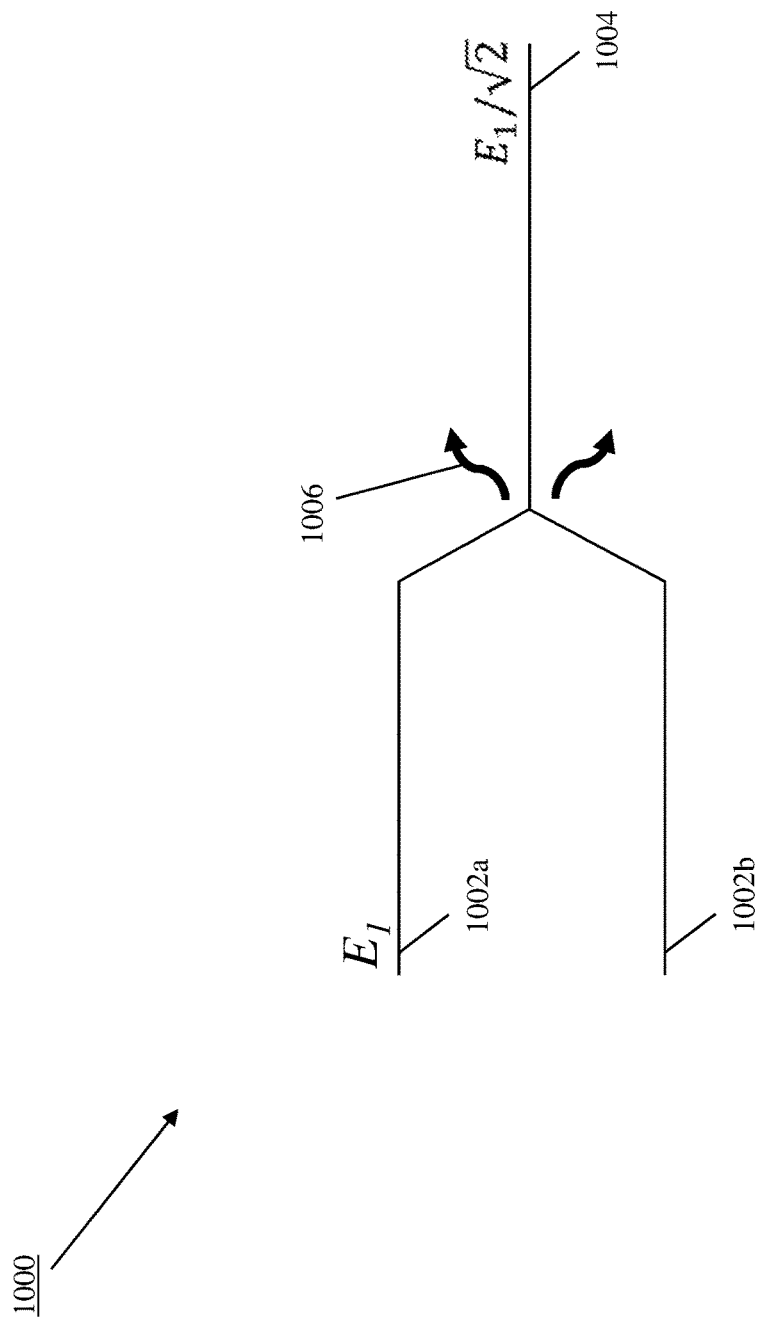
FIG. 10 is a schematic view illustrating an embodiment of the operation of a 2×1 single-mode Y-junction optical waveguide included in the conventional IC-TROSA device of FIG. 8.

With reference to FIG. 10, an embodiment of the operation of a 2×1 single-mode Y-junction optical waveguide 1000 with optical inputs 1002a and 1002b and optical output 1004 is illustrated to briefly discuss issues with those devices. The 2×1 single-mode Y-junction optical waveguide 1000 may be fabricated on a planar optical substrate (e.g., a Planar Lightwave Circuit (PLC) or Photonic Integrated Circuit (PIC)), and may be aggregated with other single-mode Y-junctions to form a 1×N single-mode optical splitter and may be fabricated with materials that would be apparent to one of skill in the art in possession of the present disclosure. As will be appreciated by one of skill in the art in possession of the present disclosure, the calculations below based on the optical component diagrams and/or discussions below (with reference to FIG. 10 as well as any of the other calculations provided herein) assume that the corresponding optical components are loss-less (except for the "waste light" discussed below), but actual physical devices will include some optical loss that, when included in the calculations discussed below, would change results slightly (without changing the fundamental teachings of the present disclosure).

In the illustrated embodiment, the 2×1 single-mode Y-junction optical waveguide 1000 includes the first input 1002a that is configured to receive signals provided by a highly-coherent, narrow-linewidth laser light wave that are described by a complex electrical field $E_1$ (referred to below as "$E_1$ lightwave"), the second input 1002a that does not receive signals, and the output 1004. As illustrated, when the $E_1$ lightwave traverses the 2×1 single-mode Y-junction optical waveguide 1000 from the first input 1002a, the portion of the $E_1$ lightwave that is directed via the output 1004 of the 2×1 single-mode Y-junction optical waveguide 1000 may be described by a complex electrical field, $E_1/\sqrt{2}$ representing a reduction in the light power of the lightwave traversing the 2×1 single-mode Y-junction optical waveguide 1000 by half, with the "missing" light power radiating from the 2×1 single-mode Y-junction optical waveguide 1000 as "waste light" 1006 (a result that one of skill in the art in possession of the present disclosure will recognize can be proven via the application of Maxwell's equations, or by invoking the second law of thermodynamics).

Figure 11:
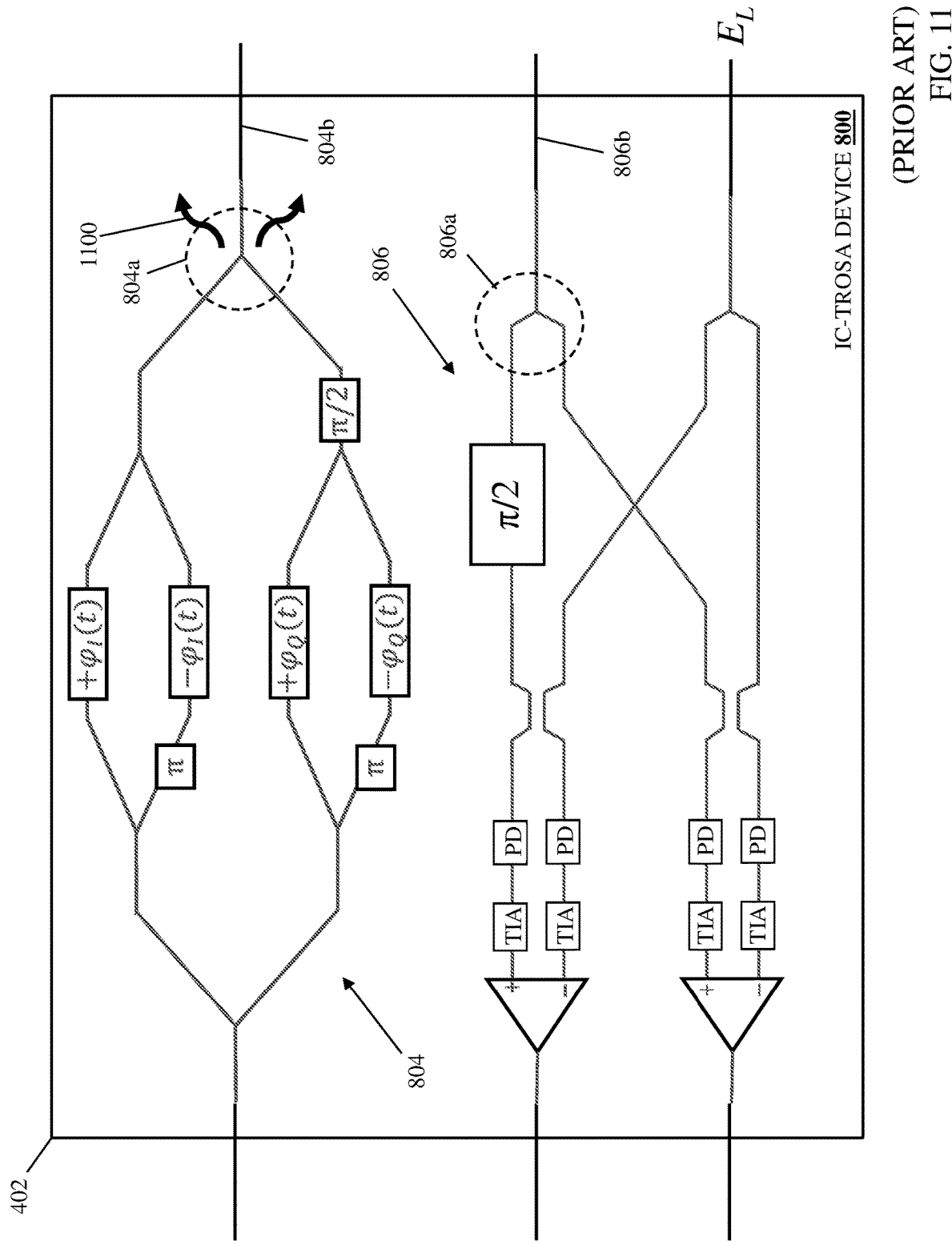
FIG. 11 is a schematic view illustrating an embodiment of the operation of the conventional IC-TROSA device of FIG. 8.

With reference to FIG. 11 and the conventional IC-TROSA device 800 discussed above with reference to FIG. 8, the transmission of signals via the IC-TROSA transmit subsystem 804 and through the 2×1 single-mode Y-junction optical waveguide 804a will thus include waste light 1100, providing the corresponding reduction in the light power of signals transmitted from the IC-TROSA transmit subsystem 804 and out of the optical transmit connection 804b by approximately half due to the losses provided by the 2×1 single-mode Y-junction optical waveguide 804a. As will be appreciated by one of skill in the art in possession of the present disclosure, the hub IC-TROSA device 400 replaces the 2×1 single-mode Y-junction optical waveguide 804a with the optical directional coupler device 404n, thus doubling the number of equivalent optical transmit connections relative to the conventional IC-TROSA device 800 while eliminating the waste light 1100, as discussed in further detail below.

Figure 12:
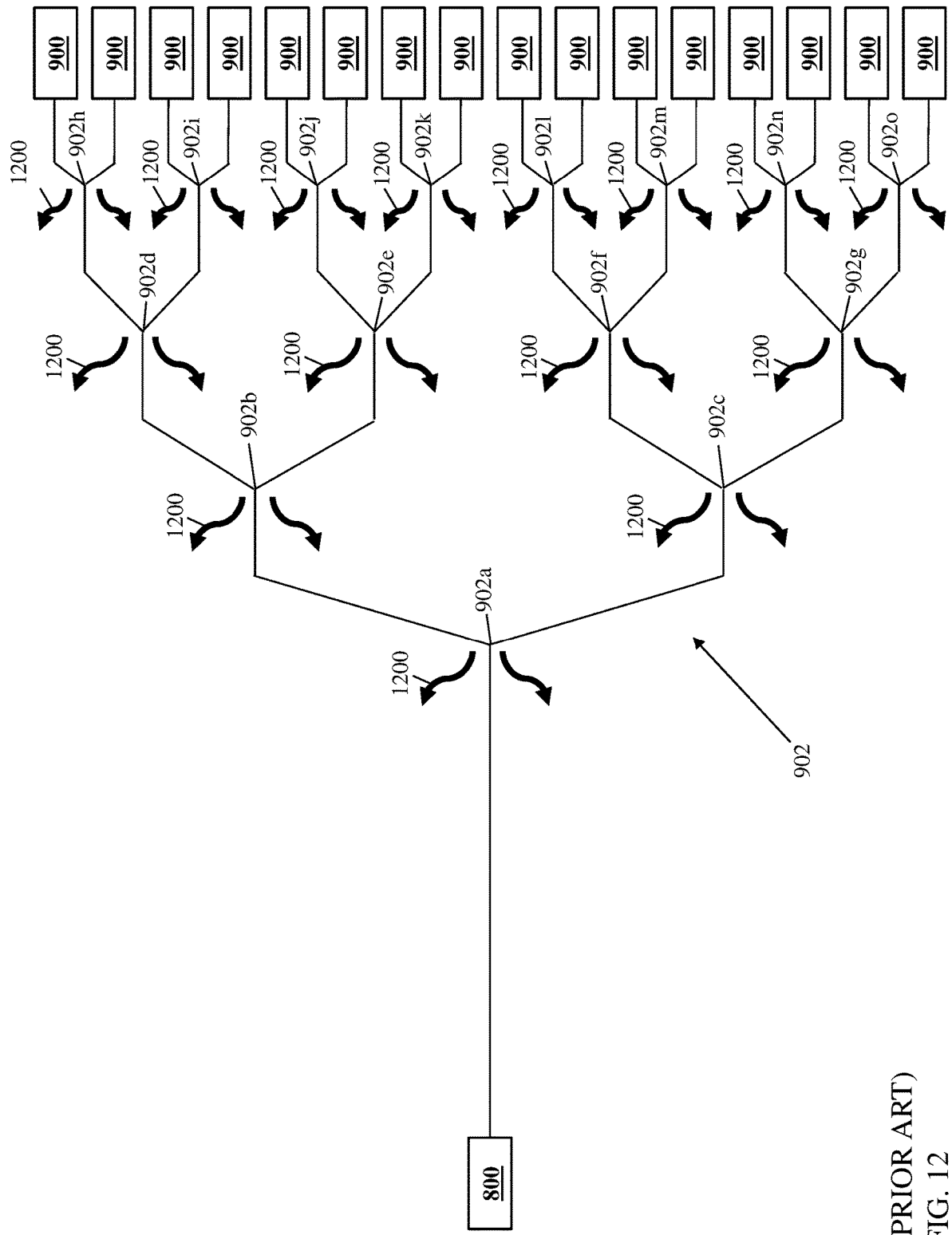
FIG. 12 is a schematic view illustrating an embodiment of the operation of the network of FIG. 9.

Similarly, with reference to FIG. 12 and the coupling of the conventional IC-TROSA device 800 to subscriber devices 900 via a point-to-multipoint optical network 902 discussed above with reference to FIG. 9, the transmission of signals from any of the subscriber devices 900 to the conventional IC-TROSA device 800 and through any subset of the 2×1 single-mode Y-junction optical waveguides 902a-902o (i.e., in the subscriber-device-to-conventional-IC-TROSA-device direction) will thus include corresponding waste light 1200 at that subset of 2×1 single-mode Y-junction optical waveguides, providing the corresponding reduction in the light power of signals transmitted from that subscriber device and through those 2×1 single-mode Y-junction optical waveguides by approximately half at each of those 2×1 single-mode Y-junction optical waveguides due to the losses provided by those 2×1 single-mode Y-junction optical waveguides. As will be appreciated by one of skill in the art in possession of the present disclosure, the hub IC-TROSA device 400 replaces the 2×1 single-mode Y-junction optical waveguide 902a with the optical directional coupler device 408a, thus doubling the number of optical receive connections relative to the conventional IC-TROSA device 800 while eliminating the waste light 1200 from the 2×1 single-mode Y-junction optical waveguide 902a (while connecting the 2×1 single-mode Y-junction optical waveguides 902b and 902c to respective ones of those optical receive connections.

Figure 13:
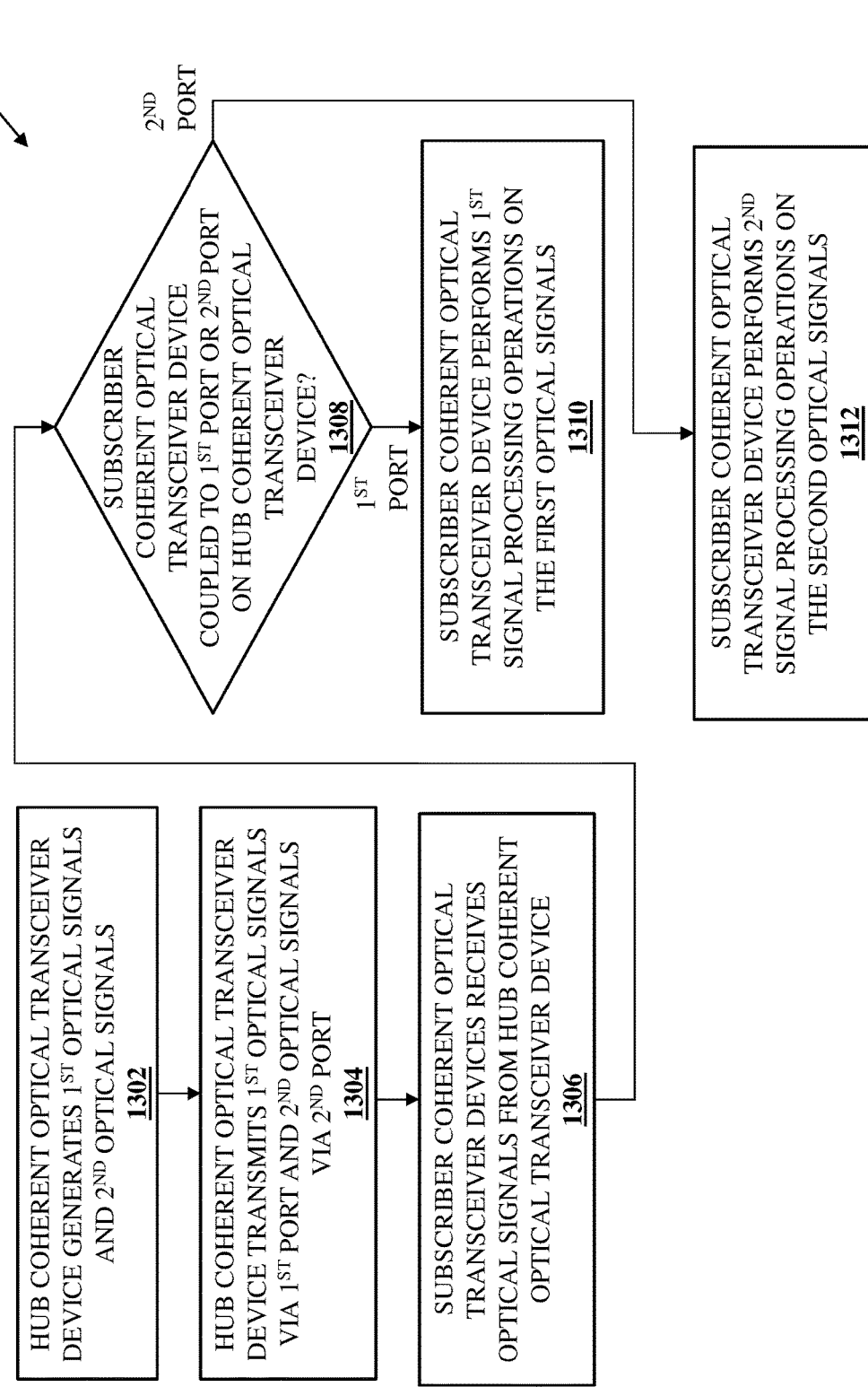
FIG. 13 is a flow chart illustrating an embodiment of a method for transmitting data via a point-to-multipoint optical network.

Referring now to FIG. 13, an embodiment of a method 1300 for transmitting data from a hub device to a subscriber device via a point-to-multipoint optical network is illustrated. As discussed below, the systems and methods of the present disclosure include a hub IC-TROSA device with an optical directional coupler device that substantially eliminates optical signal loss produced by conventional hub IC-TROSA devices while providing dual optical transmit connections that allow the hub IC-TROSA device to transmit two optical signals (via the respective transmit connections) to different point-to-multipoint optical networks. For example, the hub IC-TROSA point-to-multipoint optical network system of the present disclosure may include a point-to-multipoint optical network that is coupled to subscriber devices, and that is coupled to a hub device via a hub IC-TROSA device included in a hub coherent optical transceiver device coupled to the hub device. The hub IC-TROSA device includes a quadrature optical modulator subsystem, and an optical directional coupler device in the quadrature optical modulator subsystem provides a first transmit connection and a second transmit connection to the point-to-multipoint optical network. The optical directional coupler device receives first optical signals from the quadrature optical modulator subsystem and transmits them via the first transmit connection to a first subset of the subscriber devices via the point-to-multipoint optical network, and receives second optical signals from the quadrature optical modulator subsystem and transmits them via the second transmit connection to a second subset of the subscriber devices via the point-to-multipoint optical network. As discussed below, the hub IC-TROSA device of the present disclosure increases the distance optical signals may be transmitted, or increases the number of subscriber devices to which optical signals may be transmitted over a particular distance, via point-to-multipoint networks relative to conventional hub IC-TROSA devices.

Figure 14A:
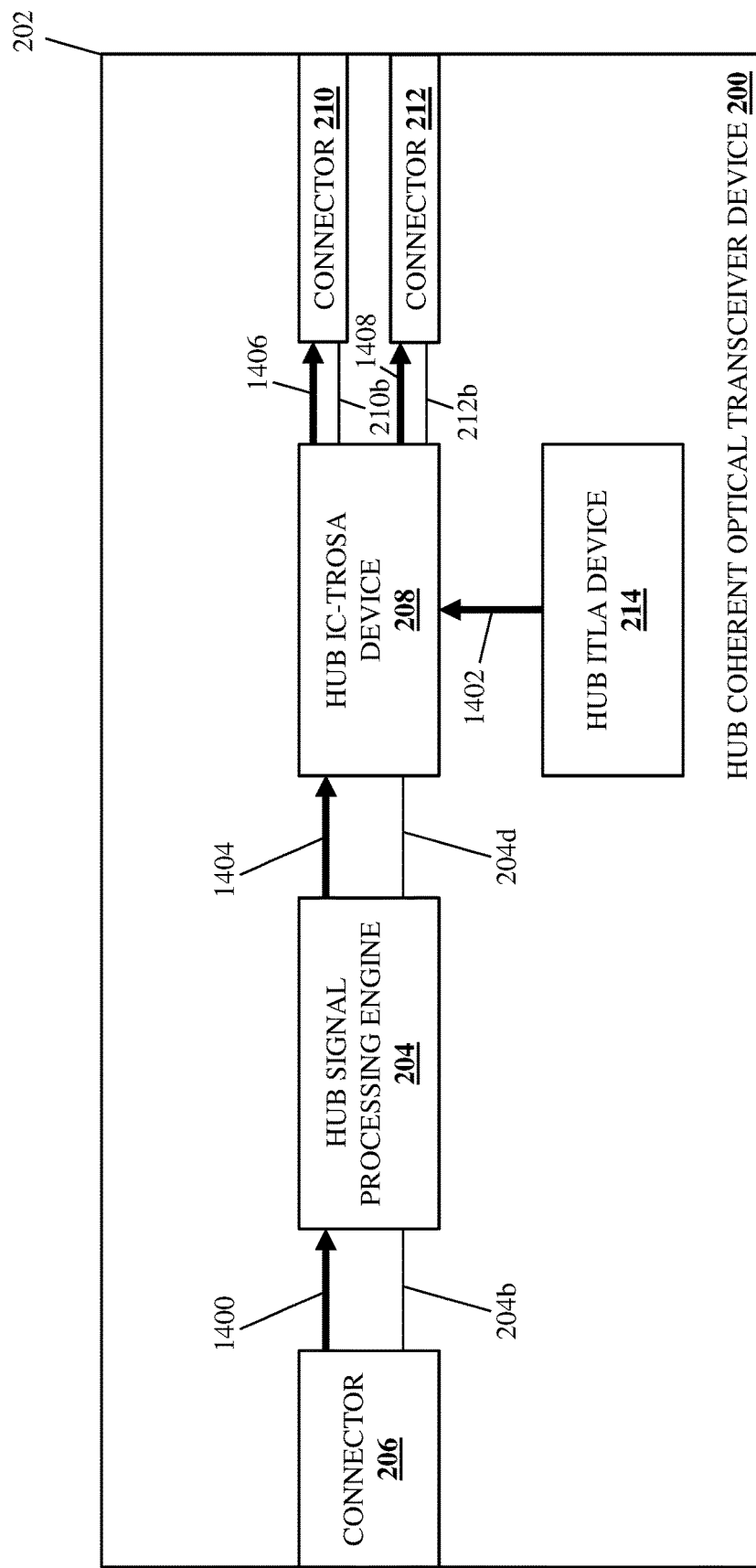
FIG. 14A is a schematic view illustrating an embodiment of the hub coherent optical transceiver device of FIG. 2 operating during the method of FIG. 13.
Figure 14B:
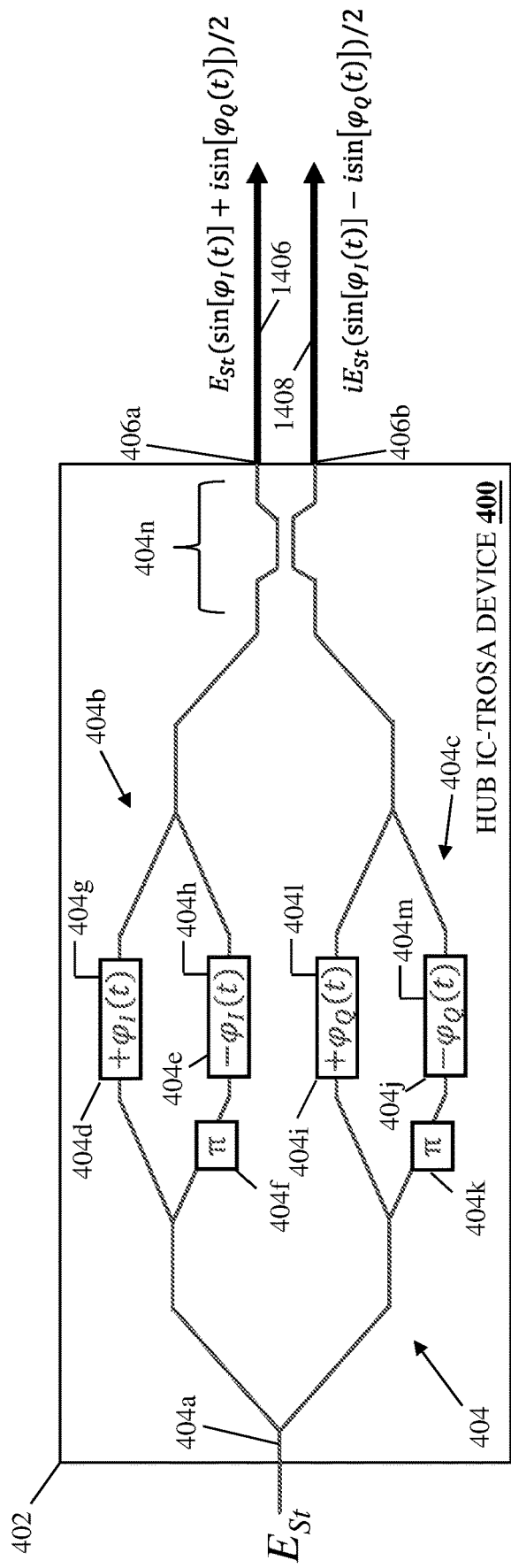
FIG. 14B is a schematic view illustrating an embodiment of a quadrature optical modulator subsystem provided according to the teachings of the present disclosure in the hub coherent optical transceiver device of FIG. 4 and operating during the method of FIG. 13.

The method 1300 begins at block 1302 where a hub coherent optical transceiver device generates first optical signals and second optical signals. With reference to FIGS. 6, 14A, and 14B, in an embodiment of block 1302, the hub device 600 may provide data (e.g., via electrical signals) to the hub coherent optical transceiver device 200 via the hub device connector 206, and the hub device connector 206 may perform data transmission operations 1400 that may include transmitting the data (e.g., via electrical signals) through the data input connection 204a and to the hub signal processing engine 204. Furthermore, the hub ITLA device 214 may perform light provisioning operations 1402 by generating and transmitting light (e.g., via a laser) to the hub IC-TROSA device 208 such that light having the transmitter laser source electrical field $E_{St}$ is received at the optical input 404a. The hub signal processing engine 204 may then utilize the data received via the data input connection 204a from the hub device connector 206 to perform signal generation operations 1404 that include transmitting signal generation commands (based on the data) via the connections 404g and 404h to the +$\varphi_I$(t) phase modulator 404d and the −$\varphi_I$(t) phase modulator 404c, respectively, in the MZ interferometer device 404b of the quadrature optical modulator subsystem 404 (e.g., to instruct the generation of optical signals), and transmitting signal generation commands (based on the data) via the connections 404l and 404m to the +$\varphi_Q$(t) phase modulator 404i and the −$\varphi_Q$(t) phase modulator 404j, respectively, in the MZ interferometer device 404b and 404c of the quadrature optical modulator subsystem 404 (e.g., to instruct the generation of optical signals).

As illustrated in FIG. 14B, the π phase shifters 404f and 404k, the +$\varphi$I (t) phase modulator 404d, the −$\varphi_I$(t) phase modulator 404e, the +$\varphi_Q$(t) phase modulator 404i, and the −$\varphi_Q$(t) phase modulator 404j operate (using the light having the transmitter laser source electrical field $E_{St}$ along with the signal generation commands transmitted by the hub signal processing engine 204) to provide respective optical signals to the optical directional coupler device 404n, and the optical directional coupler device 404n operates to mix those respective optical signals to produce first optical signals at the first optical transmit connection 406a described by the following equation:

$$E_{St}(\sin[\varphi_I(t)] + \sin[\varphi_Q(t)])/2$$

One of skill in the art in possession of the present disclosure will appreciate that the first optical signals described by the equation above include a I quadrature and a Q quadrature have a first phase relationship that differs in optical phase by +π/2 radians.

Furthermore, the π phase shifters 404f and 404k, the +$\varphi_I$(t) phase modulator 404d, the −$\varphi_I$(t) phase modulator 404e, the +$\varphi_Q$(t) phase modulator 404i, and the −$\varphi_Q$(t) phase modulator 404j operate (using the light having the transmitter laser source electrical field $E_{St}$ along with the signal generation commands transmitted by the hub signal processing engine 204) to provide respective optical signals to the optical directional coupler device 404n, and the optical directional coupler device 404n operates to mix those respective optical signals to produce second optical signals at the second optical transmit connection 406b described by the following equation:

$$iE_{St}(\sin[\varphi_I(t)] - i\sin[\varphi_Q(t)])/2$$

One of skill in the art in possession of the present disclosure will appreciate that the second optical signals described by the equation above include the I quadrature and the Q quadrature have a second phase relationship that differs in optical phase by $-\pi/2$ radians.

Figure 15:
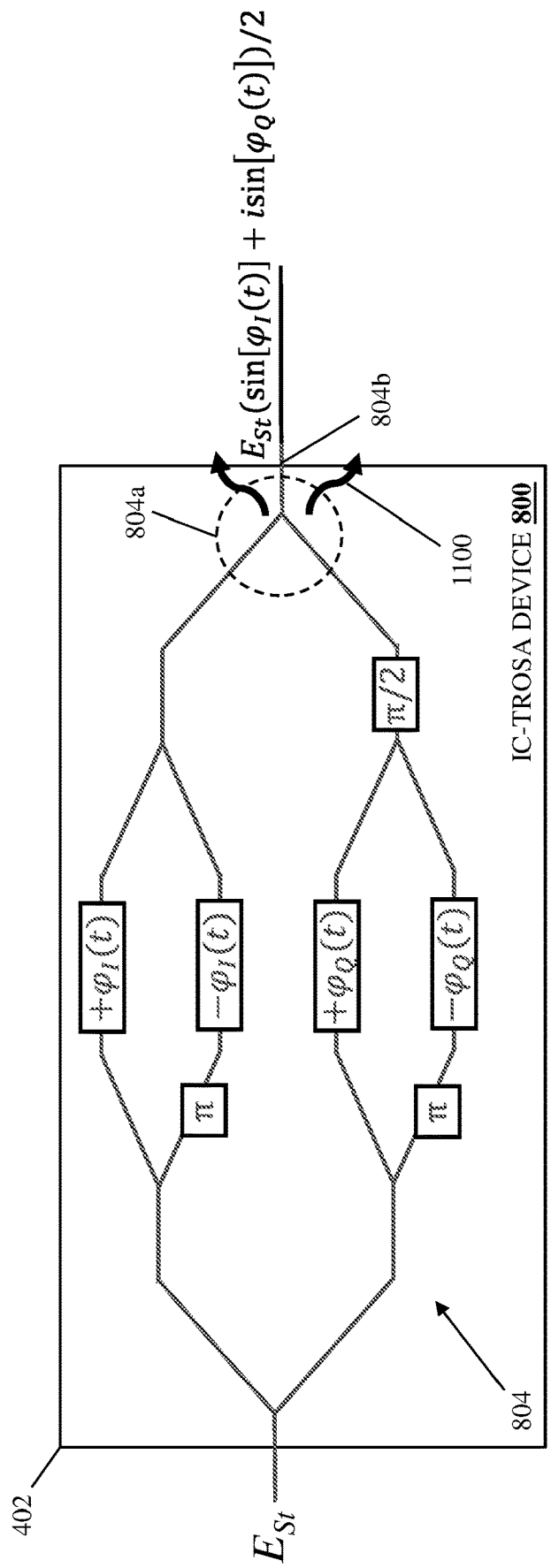
FIG. 15 is a schematic view illustrating an embodiment of the operation of the conventional quadrature optical modulator device in a conventional IC-TROSA device of FIG. 8.

As will be appreciated by one of skill in the art in possession of the present disclosure, because both lightwaves $E_1$ and $E_2$ describing the first and second optical signals have the same (angular) optical carrier frequency $\omega_0$, $|E_1(\omega_0+\omega)|^2=|E_2(\omega_0-\omega)|^2$. In other words, the optical power spectral density of the first and second lightwaves are mirror images of each other about $\omega_0$ in optical frequency space. As such, one of skill in the art in possession of the present disclosure will recognize how, in the case of a coherent PON with digital optical subcarriers, subscriber transceivers will detect information-bearing optical subcarriers at different and distinct optical frequencies depending on whether they receive the first or second optical signals With reference to FIG. 15, the generation of optical signals by the conventional hub IC-TROSA device 800 discussed above with reference to FIG. 8 is illustrated. As can be seen, when light having a transmitter laser source electrical field $E_{St}$ is provided to the IC-TROSA transmit subsystem 804 in the conventional hub IC-TROSA device 800, the output of the 2×1 single-mode Y-junction optical waveguide 804a at the optical transmit connection 804b will be an optical signal described by the following equation:

$E_{St}(\sin[\varphi_I(T)]+i\sin[\varphi_Q(t)])/2$

As such, with reference back to FIG. 14B, one of skill in the art in possession of the present disclosure will appreciate how the first optical signals produced at the first optical transmit connection 406a by the quadrature optical modulator subsystem 404 may be the same as those produced at the optical transmit connection 804b by the IC-TROSA transmit subsystem 804 in the conventional hub IC-TROSA device 800.

Figure 16:
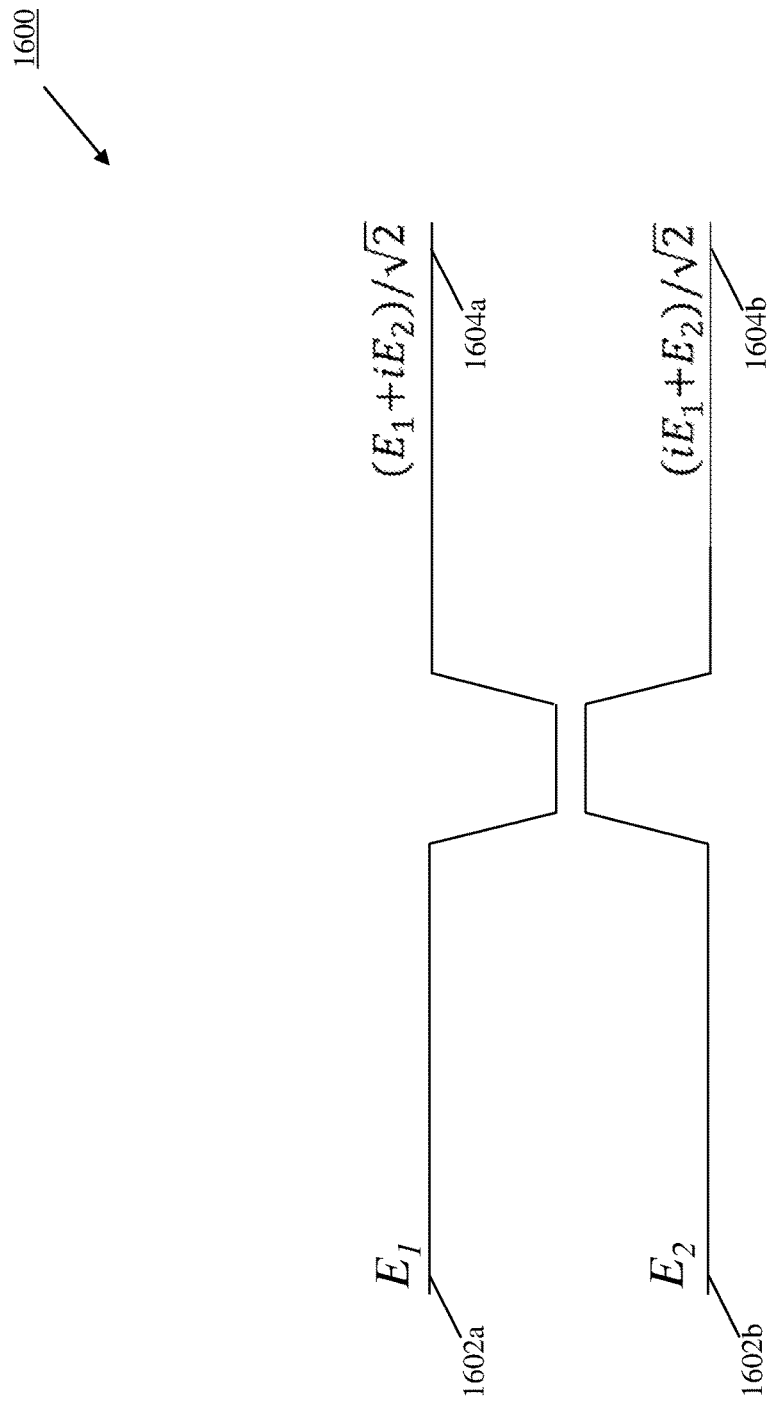
FIG. 16 is a schematic view illustrating an embodiment of the operation of an optical directional coupler device.

With reference to FIG. 16, an embodiment of an optical directional coupler device 1600 is illustrated that may provide the optical directional coupler device 404n in the quadrature optical modulator subsystem 404, and that includes a first input 1602a, a second input 1602b, a first output 1604a, and a second output 1604b. In the embodiments discussed herein, optical directional coupler devices are provided with the following transfer function:

$$\begin{bmatrix} E_1^{out} \\ E_2^{out} \end{bmatrix} = \frac{1}{\sqrt{2}} \begin{bmatrix} 1 & i \\ i & 1 \end{bmatrix} \begin{bmatrix} E_1^{in} \\ E_2^{in} \end{bmatrix}$$

One of skill in the art in possession of the present disclosure will appreciate that the transfer function above is a design choice, and a generic transfer function may be provided by:

$$\begin{bmatrix} E_1^{out} \\ E_2^{out} \end{bmatrix} = \begin{bmatrix} \cos\theta & e^{i\phi}\sin\theta \\ -e^{-i\phi}\sin\theta & \cos\theta \end{bmatrix} \begin{bmatrix} E_1^{in} \\ E_2^{in} \end{bmatrix}$$

where $\theta$ and are $\phi$ are (real) design parameters.

As will be appreciated by one of skill in the art in possession of the present disclosure, the transfer function described above may define the optical directional coupler device of the present disclosure even if that transfer function is provided by one or more optical elements that are not conventional "optical directional coupler devices", as discussed. Furthermore, one of skill in the art in possession of the present disclosure will appreciate how other transfers functions may produce equivalent overall end-to-end functionality while remaining within the scope of the present disclosure as well. Further still, each matrix above, which represent a directional coupler transfer function, is unitary, and therefore may be decomposed into an equivalent set of directional couplers, phase shifters, or 2×2 Mach Zehnder interferometers, as discussed above In some embodiments, the transfer function of the optical directional coupler device may be adjusted or controlled by applying a bias voltage or voltages to appropriate electrodes in the vicinity of the optical waveguides that make up the optical directional coupler device. As discussed above, the transfer function of the optical directional coupler device may be sensitive to the wavelength of the lightwave $E_{St}$ originating at hub ITLA 204. Thus, in some examples, one or more of the optical directional coupler devices described herein may include electrodes that allows its transfer function to be adjusted for optimal performance by application or a bias voltage or voltages. For example, as discussed above, optical taps, photodetectors, and/or other devices may be incorporated into the IC-TROSA device 500 or 600 to facilitate closed loop control of the bias applied to directional coupler 404n for optimum IC-TROSA performance. Furthermore, other embodiments of the present disclosure may utilize alternate designs, which one of skill in the art in possession of the present disclosure will appreciate will influence the calculation of the quadrature optical modulator subsystem transfer functions and optical hybrid mixer subsystem transfer functions.

As can be seen in FIG. 16, when the first input 1602a of the optical directional coupler device 1600 is provided light having an electrical field $E_1$ and the second input 1602b of the optical directional coupler device 1600 is provided light having an electrical field $E_2$, the light provided at the first output 1604a of the optical directional coupler device 1600 will have an electrical field $(E_1+iE_2)/\sqrt{2}$, and the light provided at the second output 1604b of the optical directional coupler device 1600 will have an electrical field $(iE_1+E_2)/\sqrt{2}$ if, for example, the directional optical coupler device 1600 is configured to operate with the transfer function of the equation referenced above. As such, one of skill in the art in possession of the present disclosure will appreciate how the output of the optical directional coupler device 1600 conserves optical power of the light input, as compared to the 2×1 single-mode Y-junction optical waveguide 1000 discussed above with reference to FIG. 10 that outputs light with approximately half the power of light input.

Thus, with reference back to FIG. 14B, one of skill in the art in possession of the present disclosure will appreciate how the first optical signals produced at the first optical transmit connection 406a and the second optical signals produced at the second optical transmit connection 406b by the quadrature optical modulator subsystem 404 may have identical optical power and may be encoded with identical information (i.e., in the I quadrature and Q quadrature discussed above), but with that information encoded with different phase relationships in the first optical signals and the second optical signals. Furthermore, with reference to the discussion of the conventional IC-TROSA device 800 with regard to FIG. 11, and one of skill in the art in possession of the present disclosure will recognize that the hub IC-TROSA device 400 operates to transmit the same information as the conventional IC-TROSA device 800, but without the waste light 1100 produced by 2×1 single-mode Y-junction optical waveguide 804a, thus effectively doubling the optical power of the optical signals used to transmit that information relative to the conventional IC-TROSA device 800. As will be appreciated by one of skill in the art in possession of the present disclosure, the generation of the first optical signals and the second optical signals by the hub coherent optical transceiver device 400 discussed above is applicable to all types of coherent data transmission modulation formats.

Figure 17B:
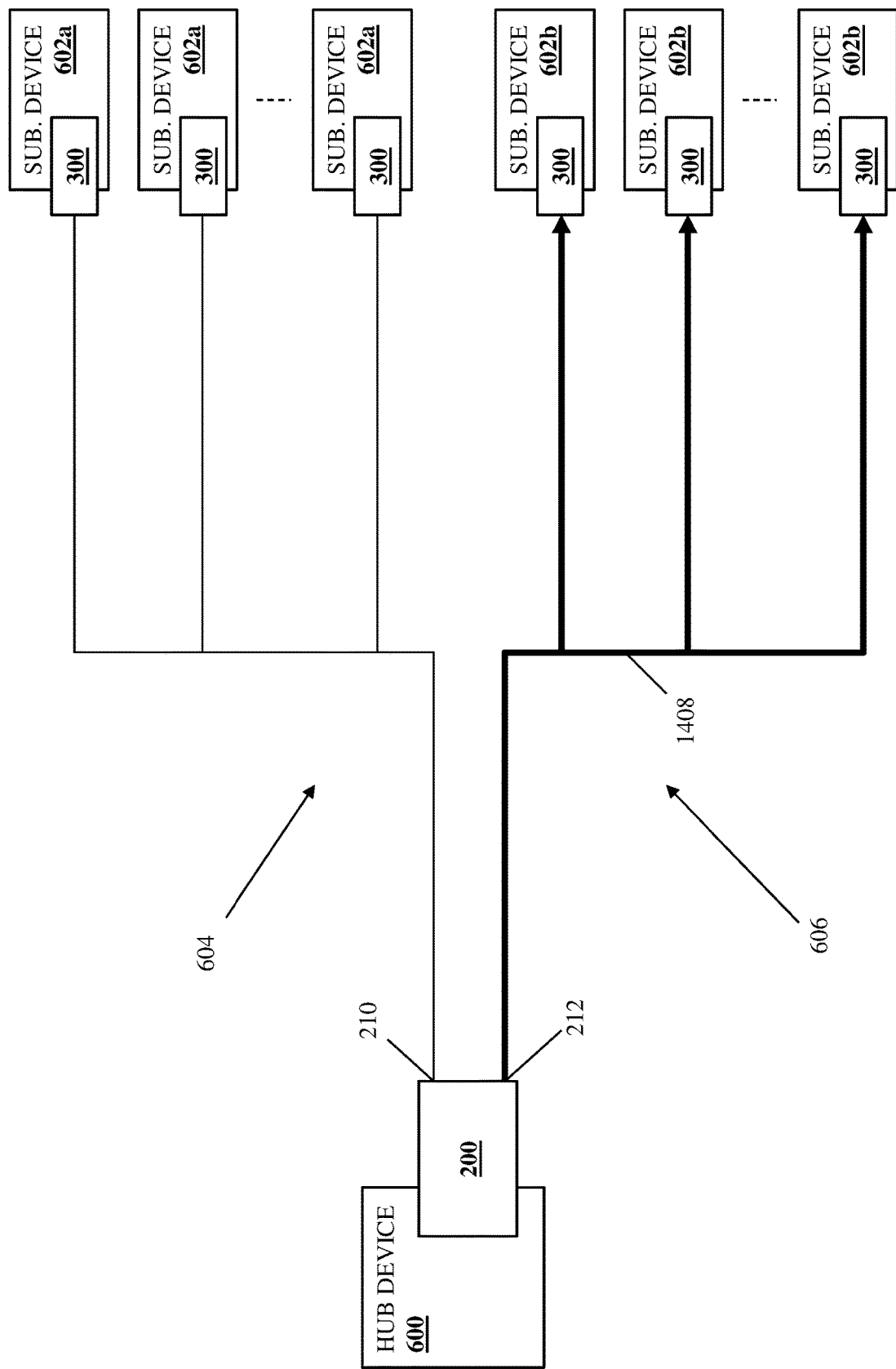
FIG. 17B is a schematic view illustrating an embodiment of the hub coherent optical transceiver device of FIG. 6 transmitting optical signals to a subscriber coherent optical transceiver device via one of the plurality of networks during the method of FIG. 13.

The method 1300 then proceeds to block 1304 where the hub coherent optical transceiver device transmits the first optical signals via a first port, and transmits the second optical signals via a second port. With reference to FIGS. 14A and 14B, in an embodiment of block 1304, the hub IC-TROSA device 208 may perform first optical signal transmission operations 1406 that include transmitting the first optical signals discussed above via the first optical transmit connection 210a to the first hub optical network connector 210, and may perform second optical signal transmission operations 1408 that include transmitting the second optical signals discussed above via the second optical transmit connection 212a to the second hub optical network connector 212. With reference to FIG. 17A, in an embodiment of block 1304, the first optical signal transmission operations 1406 may include transmitting the first optical signals discussed above via the first hub optical network connector 210 and through the PON 604 such that it is received by the subscriber coherent optical transceiver device 300 connected to each of the subscriber devices 602a. With reference to FIG. 17B, in an embodiment of block 1304, the second optical signal transmission operations 1408 may include transmitting the second optical signals discussed above via the second hub optical network connector 212 and through the PON 606 such that it is received by subscriber coherent optical transceiver device 300 connected to each of the subscriber devices 602b.

Figure 18:
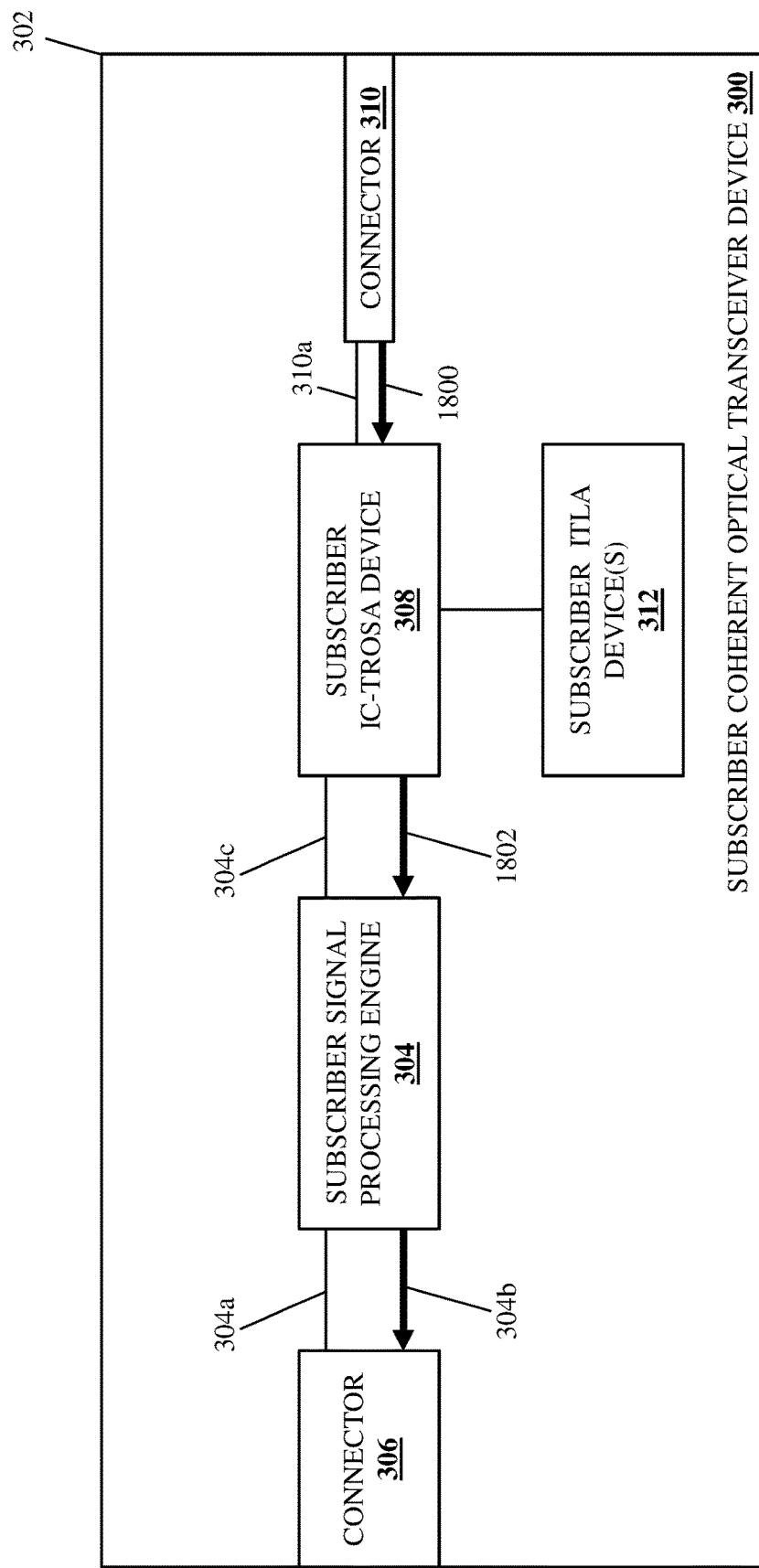
FIG. 18 is a schematic view illustrating an embodiment of the subscriber coherent optical transceiver device of FIG. 3 operating during the method of FIG. 13.

The method 1300 then proceeds to block 1306 where subscriber coherent optical transceiver devices receive optical signals from the hub coherent optical transceiver device. With reference to FIG. 18, in an embodiment of block 1306 and in response to the subscriber coherent optical transceiver device 300 connected to any of the subscriber devices 602a and 602b receiving optical signals from the hub coherent optical transceiver device 200 on the hub device 600, the subscriber optical network connector 310 on the subscriber coherent optical transceiver device 300 may perform optical signal transmission operations 1800 that include transmitting the optical signals to the subscriber IC-TROSA device 308 via the optical receive connection 310b. As discussed above, in some embodiments, the subscriber coherent optical transceiver device 300 may be a conventional subscriber coherent optical transceiver device with a conventional subscriber IC-TROSA device 308 and a subscriber signal processing engine 304 configured according to the teachings of the present disclosure, and in such embodiments, the subscriber IC-TROSA device 308 may operate to perform conventional IC-TROSA device optical-to-electrical signal conversion operations to convert the optical signals received from the hub coherent optical transceiver device 200 to analog electrical signals, and then perform electrical signal transmission operations 1802 that include transmitting the electrical signals to the subscriber signal processing engine 304 via the data input connection 304d.

However, as also discussed above, in other embodiments the subscriber coherent optical transceiver device 300 may be configured similarly to the hub coherent optical transceiver device 200 described herein (i.e., with similar IC-TROSA devices). As such, while the operation of the subscriber coherent optical transceiver device 300 according to those embodiments is not described in detail herein, one of skill in the art in possession of the present disclosure will appreciate that, in such embodiments, the subscriber IC-TROSA device 308 in the subscriber coherent optical transceiver device 300 may perform the same signal processing operations discussed below on optical signals received via a first optical receive connection (while its second optical receive connection will remain unused).

The method 1300 then proceeds to decision block 1308 where it is determined whether the subscriber coherent optical transceiver device is coupled to the first port or the second port on the hub coherent optical transceiver device. In an embodiment, at decision block 1308, the subscriber signal processing engine 304 may perform optical-signal-receiving-configuration determination operations that include determining whether the subscriber coherent optical transceiver device 300 is configured to receive optical signals via the first hub optical network connector 210 on the hub coherent optical transceiver device 200 connected to the hub device 600, or the second hub optical network connector 212 on the hub coherent optical transceiver device 200 connected to the hub device 600.

As discussed above, the first optical signals transmitted as part of the first optical signal transmission operations 1406 and the second optical signals transmitted as part of the second optical signal transmission operations 1408 by the hub IC-TROSA device 400 are encoded with identical information (i.e., in the I quadrature and Q quadrature discussed above), but with that information encoded with different phase relationships in the first optical signals and the second optical signals. As such, one of skill in the art in possession of the present disclosure will appreciate that the subscriber coherent optical transceiver device 300 receiving either of those optical signals will need to perform particular signal processing operations that are based on the I/Q optical phase relationship of the information encoded therein in order to correctly decode that information from those optical signals. As such, the knowledge of which hub optical network port on the hub coherent optical transceiver device 200 from which optical signals are received may indicate the optical phase relationship of the information in those optical signals, and thus the signal processing operations that are required to correctly decode those optical signals. As will be appreciated by one of skill in the art in possession of the present disclosure, the optical-signal-receiving-configuration determination operations of the present disclosure may be performed in a variety of manners that will fall within the scope of the present disclosure.

For example, in some embodiments the optical-signal-receiving-configuration determination operations may include the subscriber signal processing engine 304 identifying, in a database that is accessible to the subscriber signal processing engine 304 (e.g., in the subscriber coherent optical transceiver device 300 in the hub device 600, or otherwise coupled to the subscriber signal processing engine 304), whether the subscriber coherent optical transceiver device 300 is coupled to the first hub optical network connector 210 on the hub coherent optical transceiver device 200 connected to the hub device 600, or the second hub optical network connector 212 on the hub coherent optical transceiver device 200 connected to the hub device 600. In a specific example, a network administrator, network operator, or other user may track the subscriber coherent optical transceiver devices 300/subscriber devices 602a coupled to the first hub optical network connector 210 on the hub coherent optical transceiver device 200 via the PON 604, and the subscriber coherent optical transceiver devices 300/subscriber devices 602b coupled to the second hub optical network connector 212 on the hub coherent optical transceiver device 200 via the PON 606, and may provide information in the database that is accessible to the subscriber signal processing engine 304 that identifies the connection of the subscriber coherent optical transceiver devices 300 to the first hub optical network connector 210 or the second hub optical network connector 212.

As such, in some embodiments of decision block 1308, the optical-signal-receiving-configuration determination operations may include the subscriber signal processing engine 304 selecting, when the database identifies that the subscriber coherent optical transceiver device 300 is coupled to the first hub optical network connector 210 on the hub coherent optical transceiver device 200 connected to the hub device 600, first signal processing operations to perform on the electrical signals received from the subscriber IC-TROSA device 308 via the electrical signal transmission operations 1802. Similarly, the optical-signal-receiving-configuration determination operations may include the subscriber signal processing engine 304 selecting, when the database identifies that the subscriber coherent optical transceiver device 300 is coupled to the second hub optical network connector 212 on the hub coherent optical transceiver device 200 connected to the hub device 600, second signal processing operations to perform on the electrical signals received from the subscriber IC-TROSA device 308 via the electrical signal transmission operations 1802.

In another example, in some embodiments the optical-signal-receiving-configuration determination operations may include the subscriber signal processing engine 304 receiving the optical signals from the hub coherent optical transceiver device 200 connected to the hub device 600 and either: 1) performing first signal processing operations on those optical signals (discussed in further detail below) and determining that the first signal processing operations have correctly decoded those optical signals, or 2) performing second signal processing operations on those optical signals and determining that the second signal processing operations have incorrectly decoded the optical signals. In other words, if the first signal processing operations correctly decode received optical signals or the second signal processing operations incorrectly decode received optical signals, the subscriber signal processing engine 304 may determine that the subscriber coherent optical transceiver device 300 is coupled to a particular hub optical network port on the hub coherent optical transceiver device 200 connected to the hub device 600 that transmits optical signals that are correctly decoded via the first signal processing operations.

Similarly, the optical-signal-receiving-configuration determination operations may include the subscriber signal processing engine 304 receiving the optical signals from the hub coherent optical transceiver device 200 connected to the hub device 600 and either: 1) performing second signal processing operations on those optical signals (discussed in further detail below) and determining that the second signal processing operations have correctly decoded those optical signals, or 2) performing first signal processing operations on those optical signals and determining that the first signal processing operations have incorrectly decoded the optical signals. In other words, if the second signal processing operations correctly decode received optical signals or the first signal processing operations incorrectly decode received optical signals, the subscriber signal processing engine 304 may determine that the subscriber coherent optical transceiver device 300 is coupled to a particular hub optical network port on the hub coherent optical transceiver device 200 connected to the hub device 600 that transmits optical signals that are correctly decoded via the second signal processing operations.

As such, in some embodiments of decision block 1308, the optical-signal-receiving-configuration determination operations may include the subscriber signal processing engine 304 simply attempting to process the electrical signals with one of two available signal processing operations and determining whether those electrical signals have been correctly or incorrectly decoded, which operates to implicitly identify the hub optical network port on the hub coherent optical transceiver device 200 connected to the hub device 600 to which the subscriber coherent optical transceiver device 300 is connected. Thus, one of skill in the art in possession of the present disclosure will appreciate that the signal processing operations discussed below with reference to blocks 1310 and 1312 may be performed as part of decision block 1308 while remaining within the scope of the present disclosure as well.

In yet another example, in some embodiments the optical-signal-receiving-configuration determination operations may include the subscriber signal processing engine 304 receiving, during or prior to the method 1300, training communications from the hub coherent optical transceiver device 200 and/or hub device 600 and, based on the training communications, determining whether the subscriber coherent optical transceiver device 300 is coupled to the first hub optical network connector 210 or the second hub optical network connector 212 on the hub coherent optical transceiver device 200 connected to the hub device 600. As such, during or prior to the method 1300, the subscriber signal processing engine 304 may be "trained" or otherwise configured based on which of the first hub optical network connector 210 or the second hub optical network connector 212 on the hub coherent optical transceiver device 200 connected to the hub device 600 it is connected.

Thus, in some embodiments of decision block 1308, the optical-signal-receiving-configuration determination operations may include the subscriber signal processing engine 304 selecting, in response to the training identifying that the subscriber coherent optical transceiver device 300 is coupled to the first hub optical network connector 210 on the hub coherent optical transceiver device 200 connected to the hub device 600, first signal processing operations to perform on the electrical signals received from the subscriber IC-TROSA device 308 via the electrical signal transmission operations 1802. Similarly, the optical-signal-receiving-configuration determination operations may include the subscriber signal processing engine 304 selecting, in response to the training identifying that the subscriber coherent optical transceiver device 300 is coupled to the second hub optical network connector 212 on the hub coherent optical transceiver device 200 connected to the hub device 600, second signal processing operations to perform on the electrical signals received from the subscriber IC-TROSA device 308 via the electrical signal transmission operations 1802. However, while three specific techniques for performing the optical-signal-receiving-configuration determination operations have been described, one of skill in the art in possession of the present disclosure will appreciate that the subscriber signal processing engine 304 may be configured to determine whether the subscriber coherent optical transceiver device 300 is coupled to the first hub optical network connector 210 or the second hub optical network connector 212 on the hub coherent optical transceiver device 200 using other techniques that will fall within the scope of the present disclosure as well.

If, at decision block 1306, it is determined that the subscriber coherent optical transceiver device is coupled to the first port on the hub coherent optical transceiver device, the method 1300 proceeds to block 1310 where the subscriber coherent optical transceiver device performs first signal processing operations on the first optical signals. In an embodiment in which the first optical signals transmitted as part of the first optical signal transmission operations 1406 are the same as optical signals transmitted by the conventional hub IC-TROSA device 800 discussed above with reference to FIG. 15, at block 1310 the subscriber IC-TROSA device 308 may perform conventional signal processing operations in order to decode the first optical signals, discussed in further detail below. If at decision block 1306, it is determined that subscriber coherent optical transceiver device is coupled to the second port on the hub coherent optical transceiver device, the method 1300 proceeds to block 1312 where the subscriber coherent optical transceiver device performs second signal processing operations on the second optical signals, discussed in further detail below.

Figure 19:
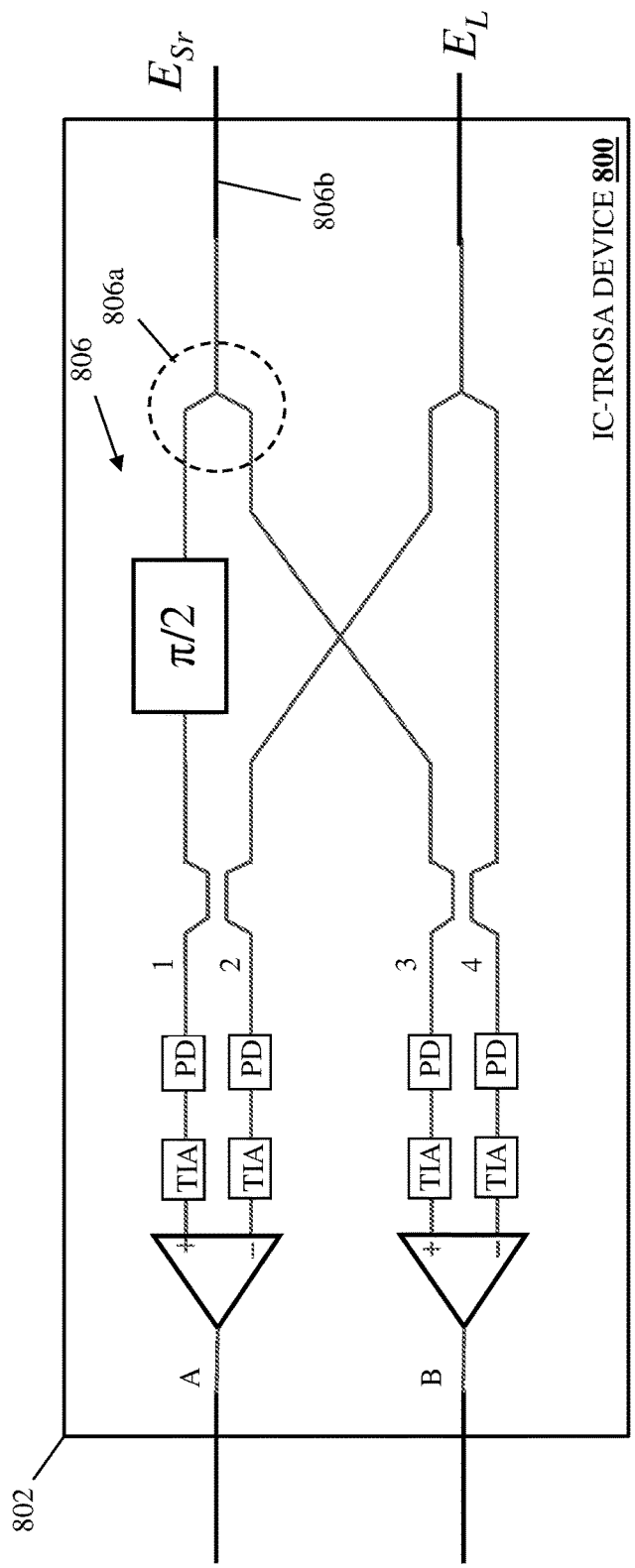
FIG. 19 is a schematic view illustrating an embodiment of the operation of the conventional coherent optical receive/ 90-degree optical hybrid mixer device in a conventional IC-TROSA device of FIG. 8.

A brief discussion of the conventional signal processing operations referenced above is provided below for purposes of highlighting the signal processing operations performed according to the teachings of the present disclosure. With reference to FIG. 19, the IC-TROSA receive subsystem 806 in the conventional hub IC-TROSA device 800 discussed above with reference to FIG. 8 is illustrated with the single optical receive connection 806b configured to receive light that includes a receiver laser source electrical field, $E_{Sr}$, and which is described by the following equation:

$$E_{Sr}=E_{Sr}^0 e^{i(\omega_{Sr} t+\varphi_{Sr})}(\sin[\varphi_I(t)]+i\,\sin[\varphi_Q(t)])$$

Where $E_{Sr}^0$ is the (positive, real) signal amplitude, $\omega_{Sr}$ is the (angular) optical frequency of the signal and $\varphi_{Sr}$ is the optical phase of the signal. In a specific example in which optical signals are broadband 16-QAM modulated optical signals, $\sin[\varphi_I(t)]$ and $\sin[\varphi_Q(t)]$ represent the 4-PAM signal levels of the I and Q quadratures. However, more general embodiments (e.g., when the signal is modulated with m discrete sub-carriers each offset from the signal optical carrier $\omega_{Sr}$ by $\omega_{Srm}$), then $\sin[\varphi_I(t)]$ and $\sin[\varphi_Q(t)]$ represent complex waveforms which are the inverse Fourier transforms of the frequency domain signal.

The IC-TROSA receive subsystem 806 in the conventional hub IC-TROSA device 800 may then mix the optical signals with a light wave having the receiver local oscillator electrical field $E_L$ described by the following equation:

$$E_L=E_L^0 e^{i(\omega_L t+\varphi_L)}$$

where $E_L^0$ is its (positive, real) amplitude, $\omega_L$ is its (angular) optical frequency, and $\varphi_L$ is its optical phase.

In the most general embodiment, $\omega_{Sr} \neq \omega_L$, and one of skill in the art in possession of the present disclosure will recognize the mixing will yield the following:

$$\frac{E_{Sr}^* E_L}{E_{Sr}^0 E_L^0} = (\sin[\varphi_I(t)]\cos[\varphi_L-\varphi_{Sr}+(\omega_L-\omega_{Sr})t] +$$

$$\sin[\varphi_Q(t)]\sin[\varphi_L-\varphi_S+(\omega_L-\omega_{Sr})t]) +$$

$$i(-\sin[\varphi_Q(t)]\cos[\varphi_L-\varphi_{Sr}+(\omega_L-\omega_{Sr})t] +$$

$$\sin[\varphi_I(t)]\sin[\varphi_L-\varphi_{Sr}+(\omega_L-\omega_{Sr})t])$$

As will be appreciated by one of skill in the art in possession of the present disclosure, the subscriber signal processing engine 304 may be configured to recover the optical phase of the signal $\varphi_{Sr}$, and align that to the optical phase of the local oscillator $\varphi_L$, effectively rendering $\varphi_L-\varphi_{Sr}=0$.

As such, with reference back to FIG. 19, an example of the conventional hub IC-TROSA device 800 mixing of optical signals provided by light that includes a receiver laser source electrical field $E_{Sr}$ with the light waves having the receiver local oscillator electrical field $E_L$ to provide electrical signals is illustrated using a table 1900. As can be seen, the table 1900 identifies optical signals 1, 2, 3, and 4 that are provided to respective photodiodes (PDs) in the conventional hub IC-TROSA device 800, as well as electrical signals A and B that are output by respective differential amplifiers. As will be appreciated by one of skill in the art in possession of the present disclosure, the $E_{PD}$ column in the table 1900 identifies the optical field at the respective PD receiving each of the optical signals 1, 2, 3, and 4, and the $i_{PD}/\eta$ column in the table 1900 identifies the photocurrent produced at the respective PD receiving each of the optical signals 1, 2, 3, and 4 in response to the optical field $E_{PD}$.

The table 1900 illustrates how the output of one of the differential amplifiers in the conventional hub IC-TROSA device 800 will be the electrical signal A with a value proportional to $\mathrm{Re}[E^*_{Sr}E_L]$, while the output of the other of the differential amplifiers in the conventional hub IC-TROSA device 800 will be the electrical signal B with a value proportional to $-\mathrm{Im}[E^*_{Sr}E_L]$, with the values $\mathrm{Re}[E^*_{Sr}E_L]$ and $\mathrm{Im}[E^*_{Sr}E_L]$, described by the equations below:

$$\mathrm{Re}[E^*_{Sr}E_L]=E_{Sr}^0 E_L^0(\sin[\varphi_I(t)]\cos[(\omega_L-\omega_{Sr})t]+\sin[\varphi_Q(t)]\sin[(\omega_L-\omega_{Sr})t])$$

$$\mathrm{Im}[E^*_{Sr}E_L]=E_{Sr}^0 E_L^0(-\sin[\varphi_Q(t)]\cos[(\omega_L-\omega_{Sr})t]+\sin[\varphi_I(t)]\sin[(\omega_L-\omega_{Sr})t])$$

As will be appreciated by one of skill in the art in possession of the present disclosure, in embodiments in which the local oscillator is tuned such that $\omega_{Sr}=\omega_L$, and the hub IC-TROSA device is transmitting broadband 16-QAM modulated signals, the voltages measured at the outputs of the differential amplifiers are proportional to the 4-PAM signal levels of the I and Q quadratures of a data-carrying 16-QAM constellation. In more general embodiments in which $\varphi_{Sr} \neq \omega_L$, signal processing techniques may be used to recover the original waveforms $\sin[\varphi_I(t)]$ and $\sin[\varphi_Q(t)]$.

With reference to FIGS. 18 and 19, when the conventional IC-TROSA receive subsystem 806 is provided in the subscriber IC-TROSA device 308 it may be configured to receive light that includes the receiver laser source electrical field $E_{Sr}$, which as discussed above may be provided as part of the optical signals received as part of the optical signal transmission operations 1800, and which may be proportional to the following equation:

$$E_{Sr}=E_{Sr}^0 e^{i(\omega_{Sr} t+\varphi_{Sr})}(\sin[\varphi_I(t)] \pm i\,\sin[\varphi_Q(t)])$$

Where $E_{Sr}^0$ is the (real) signal amplitude, $\omega_{Sr}$ is the (angular) optical frequency of the signal, $\varphi_{Sr}$ is the optical phase of the signal, and the sign $\pm$ depends on the origin of the signal (e.g., "+" for the first optical signals, and "−" for the second optical signals discussed above).

The IC-TROSA receive subsystem 806 in the subscriber IC-TROSA device 308 may then mix the optical signals with the light wave having the receiver local oscillator electrical field $E_L$ described by the following equation:

$$E_L=E_L^0 e^{i(\omega_L t+\varphi_L)}$$

One of skill in the art in possession of the present disclosure will recognize the mixing will yield the following:

$$\frac{E^*_{Sr}E_L}{E^0_{Sr}E^0_L} = (\sin[\varphi_I(t)]\cos[\varphi_L - \varphi_{Sr} + (\omega_L - \omega_{Sr})t] \pm$$

$$\sin[\varphi_Q(t)]\sin[\varphi_L - \varphi_{Sr} + (\omega_L - \omega_{Sr})t]) +$$

$$i(\mp\sin[\varphi_Q(t)]\cos[\varphi_L - \varphi_{Sr} + (\omega_L - \omega_{Sr})t] +$$

$$\sin[\varphi_I(t)]\sin[\varphi_L - \varphi_{Sr} + (\omega_L - \omega_{Sr})t])$$

As will be appreciated by one of skill in the art in possession of the present disclosure, the subscriber signal processing engine 304 may be configured to recover the optical phase of the signals $\varphi_{Sr}$, and align that to the optical phase of the local oscillator $\varphi_L$, effectively rendering $\varphi_L - \varphi_{Sr} = 0$.

As such, with reference back to the table 1900 in FIG. 19, the output of one of the differential amplifiers in the IC-TROSA receive subsystem 806 in the subscriber IC-TROSA device 308 will be the electrical signal A with a value proportional to $\text{Re}[E^*_{Sr}E_L]$, while the output of the other of the differential amplifiers in the conventional hub IC-TROSA device 800 will be the electrical signal B with a value proportional to $-\text{Im}[E^*_{Sr}E_L]$, with the values $\text{Re}[E^*_{Sr}E_L]$, and $\text{Im}[E^*_{Sr}E_L]$, described by the equations below $$\text{Re}[E^*_{Sr}E_L] = E^0_{Sr}E^0_L(\sin[\varphi_I(t)]\cos[(\omega_L - \omega_{Sr})t] \pm \sin[\varphi_Q(t)]\sin[(\omega_L - \omega_{Sr})t])$$

$$\text{Im}[E^*_{Sr}E_L] = E^0_{Sr}E^0_L(\mp\sin[\varphi_Q(t)]\cos[(\omega_L - \omega_{Sr})t] + \sin[\varphi_I(t)]\sin[(\omega_L - \omega_{Sr})t])$$

As will be appreciated by one of skill in the art in possession of the present disclosure, conventional signal processing operations (e.g., the first signal processing operations discussed above) will provide for the correct decoding of the first optical signals transmitted from the first hub optical network connector 210, as the values for $\text{Re}[E^*_{Sr}E_L]$ and $-\text{Im}[E^*_{Sr}E_L]$ are the same as utilized by the IC-TROSA receive subsystem 806 in the conventional hub IC-TROSA device 800. However, such conventional signal processing operations will incorrectly decode the second optical signals transmitted from the second hub optical network connector 212, and must be modified based on the knowledge of which hub optical network port the subscriber coherent optical transceiver device 300 is coupled to in order to perform the second signal processing operations discussed above, and one of skill in the art in possession of the present disclosure will recognize how the second signal processing operations would be configured to correctly decode such optical signals.

Thus, systems and methods have been described that include a hub IC-TROSA device with an optical directional coupler device that substantially eliminates optical signal loss produced by conventional hub IC-TROSA devices while providing dual optical transmit connections that allow the hub IC-TROSA device to transmit two optical signals (via the respective transmit connections) to different point-to-multipoint optical networks. For example, the hub IC-TROSA point-to-multipoint optical network system of the present disclosure may include a point-to-multipoint optical network that is coupled to subscriber devices, and that is coupled to a hub device via a hub IC-TROSA device included in a hub coherent optical transceiver device coupled to the hub device. The hub IC-TROSA device includes a quadrature optical modulator subsystem, and an optical directional coupler device in the quadrature optical modulator subsystem provides a first transmit connection and a second transmit connection to the point-to-multipoint optical network. The optical directional coupler device receives first optical signals from the quadrature optical modulator subsystem and transmits them via the first transmit connection to a first subset of the subscriber devices via the point-to-multipoint optical network, and receives second optical signals from the quadrature optical modulator subsystem and transmits them via the second transmit connection to a second subset of the subscriber devices via the point-to-multipoint optical network.

Referring now to FIG. 20, an embodiment of a method 2000 for transmitting data via a point-to-multipoint optical network is illustrated. As discussed below, the systems and methods of the present disclosure include a hub IC-TROSA device with an optical directional coupler device that substantially eliminates optical signal loss produced by conventional hub IC-TROSA devices while providing dual optical receive connections that allow the hub IC-TROSA device to receive two optical signals (via the respective receive connections) from different point-to-multipoint optical networks. As discussed below, the hub IC-TROSA device of the present disclosure increases the distance over which optical signals may be received, or increases the number of subscriber devices from optical signals may be received over a particular distance, via point-to-multipoint networks relative to conventional hub IC-TROSA devices.

Figure 21:
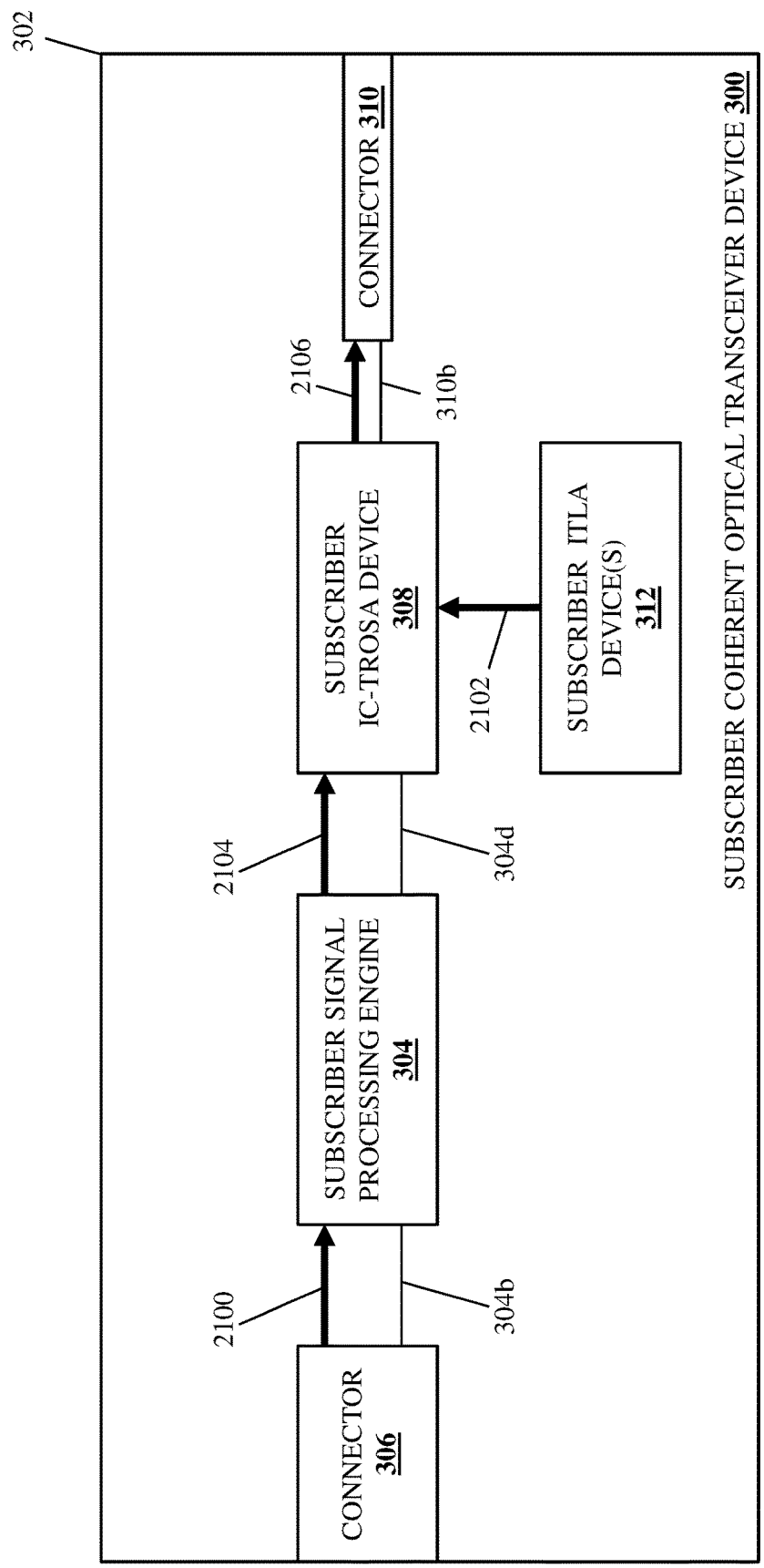
FIG. 21 is a schematic view illustrating an embodiment of the subscriber coherent optical transceiver device of FIG. 3 operating during the method of FIG. 20.

The method 2000 begins at block 2002 where each subscriber coherent optical transceiver device generates optical signals. With reference to FIGS. 6 and 21, in an embodiment of block 2002, the subscriber devices 602a and/or 602b may provide data (e.g., via electrical signals) to the subscriber coherent optical transceiver devices 300 via the subscriber device connector 306, and the subscriber device connector 306 may perform data transmission operations 2100 that may include transmitting the data (e.g., via electrical signals) through the data input connection 304a and to the subscriber signal processing engine 304. Furthermore, the subscriber ITLA device(s) 312 may perform light provisioning operations 2102 by generating and transmitting light to the subscriber IC-TROSA device 308. The subscriber signal processing engine 304 may then utilize the data received via the data input connection 304a from the subscriber device connector 306 to perform optical signal generation operations 2104 that include transmitting optical signal generation commands (based on the data) to the subscriber IC-TROSA device 308.

Figure 22:
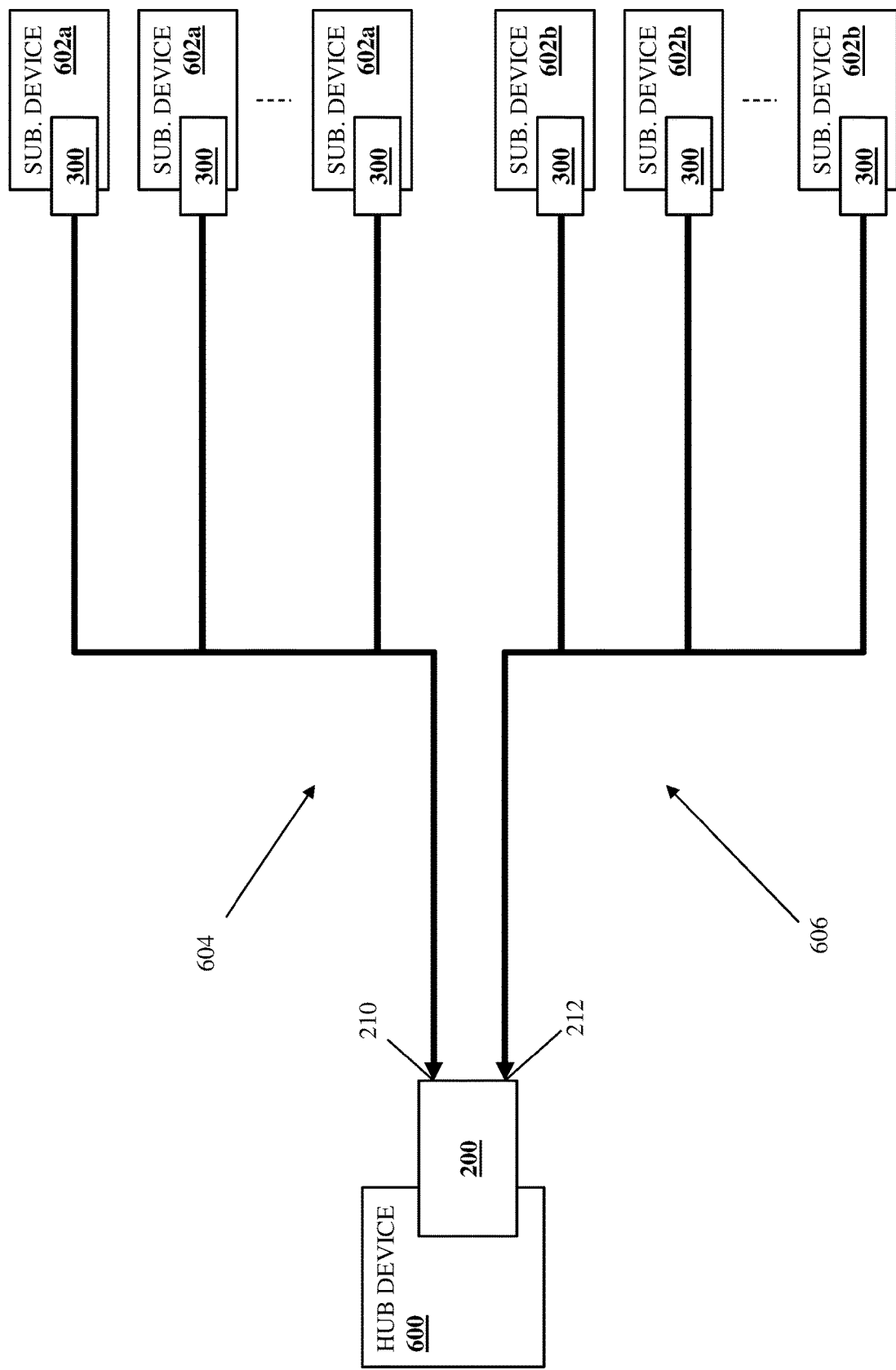
FIG. 22 is a schematic view illustrating an embodiment of the subscriber coherent optical transceiver devices of FIG. 6 transmitting optical signals to the hub coherent optical transceiver device via each of the plurality of networks during the method of FIG. 20.

FIG. 22 illustrates how each subscriber coherent optical transceiver devices 300 connected to each subscriber devices 602a and the PON 604 may transmit a first set of optical signals to the first hub optical network connector 210 on the hub coherent optical transceiver device 200 connected to the hub device 600, and the subscriber coherent optical transceiver devices 300 connected to the subscriber devices 602b and the PON 606 may transmit second set of optical signals to the second hub optical network connector 212 on the hub coherent optical transceiver device 200 connected to the hub device 600.

As will be appreciated by one of skill in the art in possession of the present disclosure, each subscriber coherent optical transceiver devices 300 may be configured to determine which signal processing operations to perform in a manner similar to that described above with regard to decision block 1308 of the method 1300. Furthermore, one of skill in the art in possession of the present disclosure will recognize that the generation of the first set of optical signals and the second set of optical signals by the subscriber coherent optical transceiver devices 300 discussed above is applicable when the hub optical transceiver can differentiate optical signals from the various subscriber coherent optical transceiver devices 300 by sub-carrier multiple access (SCMA), time-division multiple access (TDMA), or hybrid multiplexing techniques that would be apparent to one of skill in the art in possession of the present disclosure.

The method 2000 then proceeds to block 2004 where each subscriber coherent optical transceiver device transmits optical signals to a hub coherent optical transceiver device. With reference to FIG. 21, in an embodiment of block 2004, each subscriber IC-TROSA device 308 may perform optical signal transmission operations 2106 that include transmitting the optical signals generated at block 2002 via the optical transmit connection 310a and to the subscriber optical network connector 310.

Figure 23:
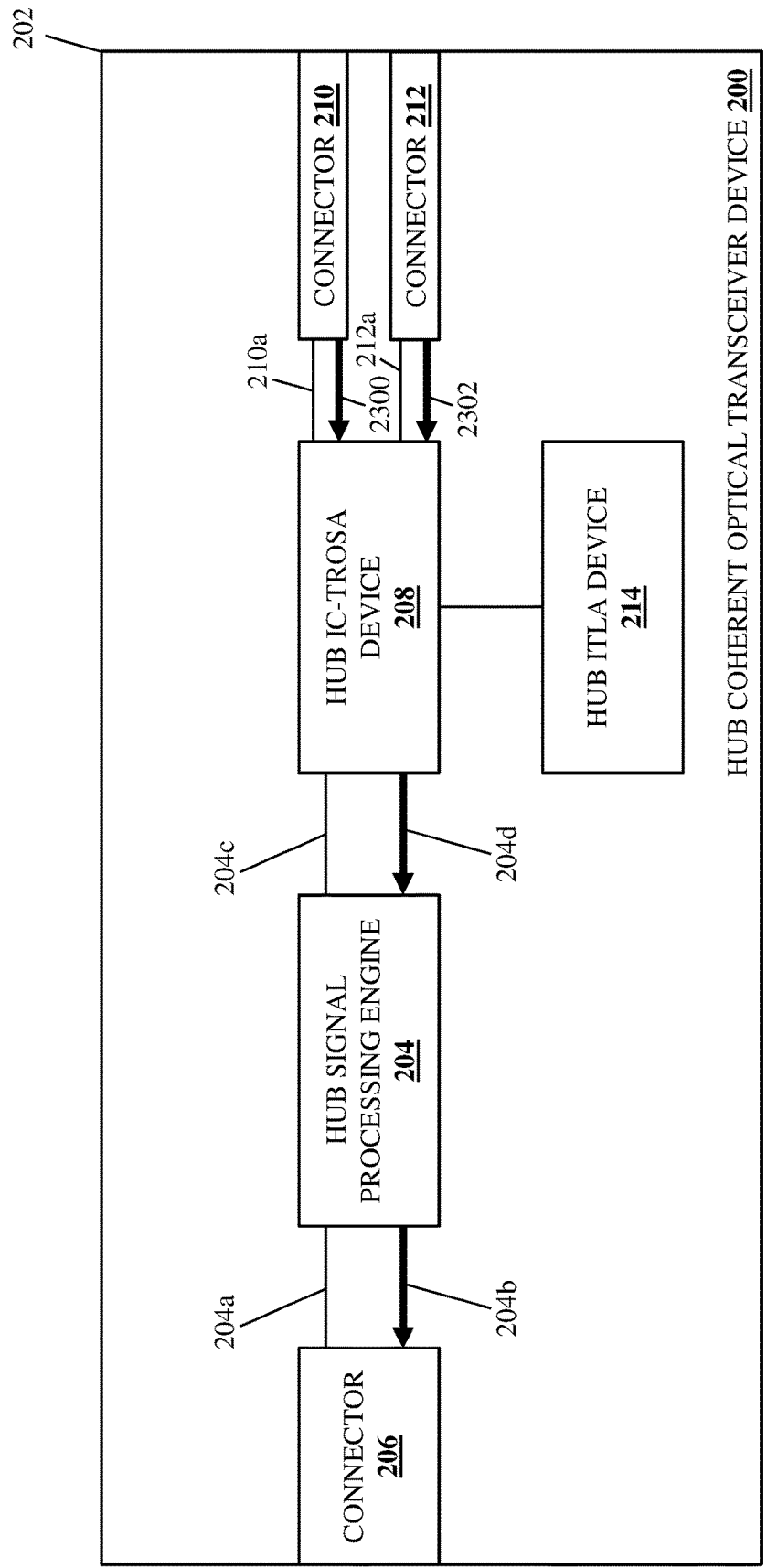
FIG. 23 is a schematic view illustrating an embodiment of the hub coherent optical transceiver device of FIG. 2 operating during the method of FIG. 20.

The method 2000 then proceeds to decision block 2006 where the method 2000 proceeds depending on whether the hub coherent optical transceiver device receives the first set of optical signals or the second set of optical signals from the subscriber coherent optical transceiver devices. With reference to FIG. 23, in an embodiment of block 2006, the first hub optical network connector 210 may perform optical signal transmission operations 2300 that include transmitting the first set of optical signals to the hub IC-TROSA device 208 via the first optical receive connection 210b, while the second hub optical network connector 212 may perform optical signal transmission operations 2302 that include transmitting the second set of optical signals to the hub IC-TROSA device 208 via the second optical receive connection 212b.

Figure 24:
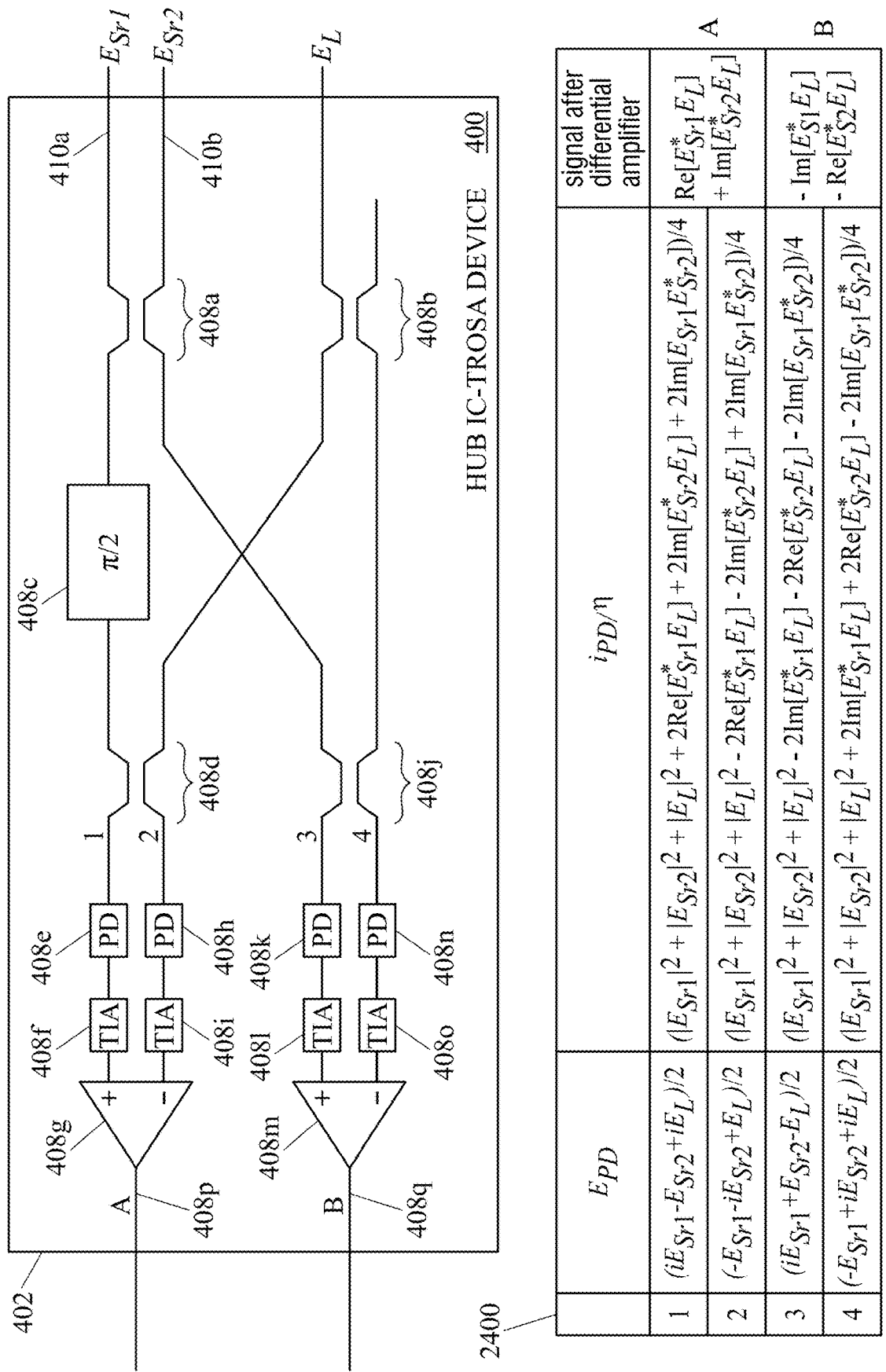
FIG. 24 is a schematic view illustrating an embodiment of the hub coherent optical transceiver device of FIG. 4 operating during the method of FIG. 20.

With reference to FIG. 24, in an embodiment, the first set of optical signals may include light with receiver laser source electrical field $E_{Sr1i}$, and the second set of optical signals may include light with receiver laser source electrical field $E_{Sr2j}$, each described by the following equations:

$$E_{Sr1i} = E_{Sr1i}^0 e^{i(\omega_{S1j}t + \varphi_{S1j})}(\sin[\varphi_{I1i}(t)] + i\sin[\varphi_{Q1i}(t)])$$

$$E_{Sr2j} = E_{Sr2j}^0 e^{i(\omega_{S2j}t + \varphi_{S2j})}(\sin[\varphi_{I2j}(t)] + i\sin[\varphi_{Q2j}(t)])$$

where i refers to the signal originating at the $i^{th}$ subscriber terminal on the first network, and j refers to the signal originating at the $j^{th}$ subscriber terminal on the second network. In addition, one of skill in the art in possession of the present disclosure will appreciate that the "1" subscript indicates that the associated light was received at the first optical receive connection 210b, while the "2" subscript indicates that the associated light was received at the second optical receive connection 212b.

As will be appreciated by one of skill in the art in possession of the present disclosure, in the case of a TDMA coherent PON, only a single upstream optical signal packet from a single distinct subscriber is received (and decoded) by the hub coherent transceiver at any one time. However, in the case of a SCMA coherent PON, a multitude of optical subcarriers are received and decoded simultaneously As will be appreciated by one of skill in the art in possession of the present disclosure, each $E_{Sr1i}$ and $E_{Sr2j}$ originate from different subscriber coherent optical transceiver devices so generally optical phases and frequencies are different ($\varphi_{Sr1i} \neq \varphi_{Sr1k} \neq \varphi_{Sr2j} \neq \varphi_{Sr2n}$ and $\omega_{Sr1i} \neq \omega_{Sr1k} \neq \omega_{Sr2j} \neq \omega_{Sr2n}$) and the digital signal processing operations performed by the hub signal processing engine 204 may be configured to distinguish such signals from different subscriber coherent optical transceiver devices depending on whether the coherent PON upon which they are received uses TDMA, SCMA, combinations thereof, or other transmission technologies known in the art.

For example, considering a coherent single-carrier PON using TDMA transmission technology, the optical frequency and phase of a received signal may vary depending on timeslot and subscriber source, and the digital signal processing operations performed by the hub signal processing engine 204 may be configured to effectively manage such received signals. To provide a specific example, the signal may be received by the hub coherent optical transceiver device 200 and may enter the hub IC-TROSA device 400 through either the first optical receive connection 410a or the second optical receive connection 410b. The digital signal processing operations performed by the hub signal processing engine 204 (and a hub coherent optical transceiver Media-Access Control [MAC]) will be aware of which subscriber coherent optical transceiver device is assigned to the timeslot that is currently being decoded, and may also know if the subscriber coherent optical transceiver device is in a first subscriber domain optically connected to first optical receive connection 410a, or in a second subscriber domain optically connected to second optical receive connection 410b.

In another example, considering a coherent multi-carrier SCMA coherent PON transmission technology, the optical frequency and phase of a received optical subcarriers may vary depending on the subcarrier frequency and the subscriber source, and the digital signal processing operations performed by the hub signal processing engine 204 may be configured to effectively manage such received signals. To provide a specific example, the signal may be received by the hub coherent optical transceiver device 200 and may enter the hub IC-TROSA device 400 through either the first optical receive connection 410a or the second optical receive connection 410b. The digital signal processing operations performed by the hub signal processing engine 204 will be aware of which of the optical subcarriers is assigned to which subscriber coherent optical transceiver device, and may also know if the subscriber coherent optical transceiver device is in a first subscriber domain optically connected to first optical receive connection 410a, or in a second subscriber domain optically connected to second optical receive connection 410b.

The method 2000 then may proceed to block 2008 where the hub coherent optical transceiver device performs first signals processing operations on the first set of optical signals, or to block 2010 where the hub coherent optical transceiver device performs second signals processing operations on the second set of optical signals. One of skill in the art in possession of the present disclosure will appreciate how operations associated with blocks 2010 and 2010 may be performed sequentially in the case of a TDMA coherent PON, or simultaneously in the case of a SCMA coherent PON, for example. With reference to FIG. 24, in an embodiment of blocks 2008 and 2010 and as discussed above, the optical directional coupler device 408b in the hub coherent optical transceiver device 400 may be configured to receive light having the receiver local oscillator electrical field $E_L$ provided by the hub ITLA device 214 at one of its inputs, which may be described by the equation:

$$E_L = E_L^0 e^{i(\omega_L t + \varphi_L)}$$

As will be appreciated by one of skill in the art in possession of the present disclosure, the mixing provided by the hub coherent optical transceiver device 400 may yield the following nonvanishing terms at the electrical output of the IC-TROSA:

$$\frac{E^*_{Sr1i}E_L}{E^0_{Sr1i}E^0_L} = |(\sin[\varphi_{I1i}(t)]\cos[\varphi_L - \varphi_{Sr1i} + (\omega_L - \omega_{Sr1i})t] +$$

$$\sin[\varphi_{Q1i}(t)]\sin[\varphi_L - \varphi_{Sr1i} + (\omega_L - \omega_{Sr1i})t]) +$$

$$i(-\sin[\varphi_{Q1i}(t)]\cos[\varphi_L - \varphi_{Sr1i} + (\omega_L - \omega_{Sr1i})t] +$$

$$\sin[\varphi_{I1i}(t)]\sin[\varphi_L - \varphi_{Sr1i} + (\omega_L - \omega_{Sr1i})t])$$

and $$\frac{E^*_{Sr2j}E_L}{E^0_{Sr2j}E^0_L} = (\sin[\varphi_{Q2j}(t)]\cos[\varphi_L - \varphi_{Sr2j} + (\omega_L - \omega_{Sr2j})t] +$$

$$\sin[\varphi_{I2j}(t)]\sin[\varphi_L - \varphi_{Sr2j} + (\omega_L - \omega_{Sr2j})t]) +$$

$$i(-\sin[\varphi_{Q2j}(t)]\cos[\varphi_L - \varphi_{Sr2j} + (\omega_L - \omega_{Sr2j})t] +$$

$$\sin[\varphi_{I2j}(t)]\sin[\varphi_L - \varphi_{Sr2j} + (\omega_L - \omega_{Sr2j})t])$$

As will be appreciated by one of skill in the art in possession of the present disclosure, in the case of the TDMA coherent PON, the hub signal processing engine 204 may be configured to recover the optical phase of each upstream signal packet carrying the signals $\varphi_{Sr1i}$ and $\varphi_{Sr2j}$, align it to the optical phase of the local oscillator $\varphi_L$, effectively rendering $\varphi_L - \varphi_{Sr1i} = \varphi_L - \varphi_{Sr2j} = 0$.

As such, with reference back to FIG. 24, an example of the hub IC-TROSA device 400 mixing optical signals having light that includes a receiver signal electrical fields $E_{Sr1i}$ and $E_{Sr2j}$ with the light waves having the receiver local oscillator electrical field $E_L$ to provide electrical signals is illustrated using a table 2400. As can be seen, the table 2400 identifies optical signals 1, 2, 3, and 4 that are provided to respective PDs 408e, 408h, 408k, and 408n in the hub IC-TROSA device 400, as well as electrical signals A and B that are output by respective differential amplifiers 408g and 408m. As discussed above, the $E_{PD}$ column in the table 2400 identifies the optical field at the respective PD receiving each of the optical signals 1, 2, 3, and 4, and the $i_{PD}/\eta$ column in the table 2400 identifies the photo-current produced at the respective PD receiving each of the optical signals 1, 2, 3, and 4 in response to the optical field $E_{PD}$.

With reference to both FIG. 24 and FIG. 6, one of skill in the art in possession of the present disclosure will recognize how, for signals received from subscriber coherent optical transceiver devices 300 connected to the PON 604, the output of one of the differential amplifiers in the hub IC-TROSA device 400 will be the electrical signal A that is proportional to $+\text{Re}[E^*_{Srib}E_L]$, while the output of the other of the differential amplifiers in the hub IC-TROSA device 400 will be the electrical signal B that is proportional to $-\text{Im}[E^*_{Sr1i}E_L]$. As will be appreciated by one of skill in the art in possession of the present disclosure, such signals may be decoded using the conventional signal processing operations described above with reference to FIG. 19.

However, again with reference to FIG. 24 and FIG. 6, one of skill in the art in possession of the present disclosure will also recognize how, for signals received from subscriber coherent optical transceiver devices 300 connected to the PON 606, the output of one of the differential amplifiers in the hub IC-TROSA device 400 will be the electrical signal A that is proportional to $+\text{Re}[E^*_{Sr2j}E_L]$ while the output of the other of the differential amplifiers in the hub IC-TROSA device 400 will be the electrical signal B that is proportional to $-\text{Re}[E^*_{Sr2j}E_L]$.

With reference to FIG. 24, as will be appreciated by one of skill in the art in possession of the present disclosure, for signals received from subscriber coherent optical transceiver devices 300 connected to the PON 606, the hub signal processing engine 204 may perform conventional operations while interpreting the inverse of the voltage from differential amplifier 408g as being from differential amplifier 408m, and interpreting the inverse of the voltage from differential amplifier 408m as being from differential amplifier 408g. Furthermore, other elements of the digital signal processing operations performed by the hub signal processing engine 204 including chromatic dispersion compensation, IQ skew compensation, carrier recovery, polarization mode dispersion compensation, polarization tracking and demultiplexing, frequency offset estimation, as well as others, may be modified for signals received via the second optical transceiver connection 410b on the hub IC-TROSA device 400.

While the discussion above is specific to a coherent single-carrier PON using TDMA transmission technology, other PONs using other transmission technologies will fall within the scope of the present disclosure as well. For example, consider a coherent multi-carrier PON using SCMA transmission technology in which the hub coherent optical transceiver device will receive signals simultaneously from different subscriber coherent optical transceiver devices operating on different optical subcarriers, which one of skill in the art in possession of the present disclosure will recognize presents challenges because the optical signal from any particular subscriber coherent optical transceiver devices may have a distinct optical carrier frequency and phase, as well as distinct, distance dependent, optical impairments. However, one of skill in the art in possession of the present disclosure will also appreciate how simultaneous optical carrier and phase recovery techniques for each signal and/or subcarrier may be employed to address such challenges (e.g., via the use of frequency locking each subscriber coherent optical transceiver device controlled by the hub coherent optical transceiver device). [D. Welch, et al., "Point-to-Multipoint Optical Networks Using Coherent Digital Subcarriers," *Journal of Lightwave Technology*, vol. 39, no. 16, pp. 5232-5247, 2021 AND H. Sun, et al., "800G DSP ASIC Design Using Probabilistic Shaping and Digital Sub-Carrier Multiplexing." *Journal of Lightwave Technology*, vol. 38, no. 17 pp. 4744-4756 (2020).] As with the coherent single-carrier PONs using TDMA discussed above, elements of the digital signal processing operations performed by the hub signal processing engine 204 used with coherent multi-carrier PONs using SCMA transmission technology may include chromatic dispersion compensation, IQ skew compensation, carrier recovery, polarization mode dispersion compensation, polarization tracking and demultiplexing, frequency offset estimation, as well as others, may be modified for signals received via the second optical transceiver connection 410b on the hub IC-TROSA device 400.

As would be appreciated by one of skill in the art in possession of the present disclosure, the systems and methods of the present disclosure may require (e.g., in the case of a n SCMA coherent PON) that the optical subcarrier frequencies assigned to subscriber devices on a first network connected to the hub device not be mirror frequencies (e.g., two frequencies $\omega_1$ and $\omega_2$ where $[(\omega_1 - \omega_0 = \omega_0 - \omega_2]$ or $[\omega_2 - \omega_0 = \omega_0 - \omega_1]$ where $\omega_0$ is the (angular) optical frequency of the hub local oscillator) of the optical subcarrier frequencies assigned to subscriber devices on a second network connected to the hub device. While conventional SCMA point-to-multipoint optical networks do not constrain the assignment of optical subcarrier frequencies to subscriber devices, the techniques described herein may experience interference between subscriber devices that are assigned with mirror frequencies in the different networks. As such, the hub device may perform optical subcarrier frequency assignments to ensure that optical subcarrier frequencies assigned to subscriber devices on the first network connected to the hub device are not mirror frequencies of the optical subcarrier frequencies assigned to subscriber devices on a second network connected to the hub device.

Figure 25:
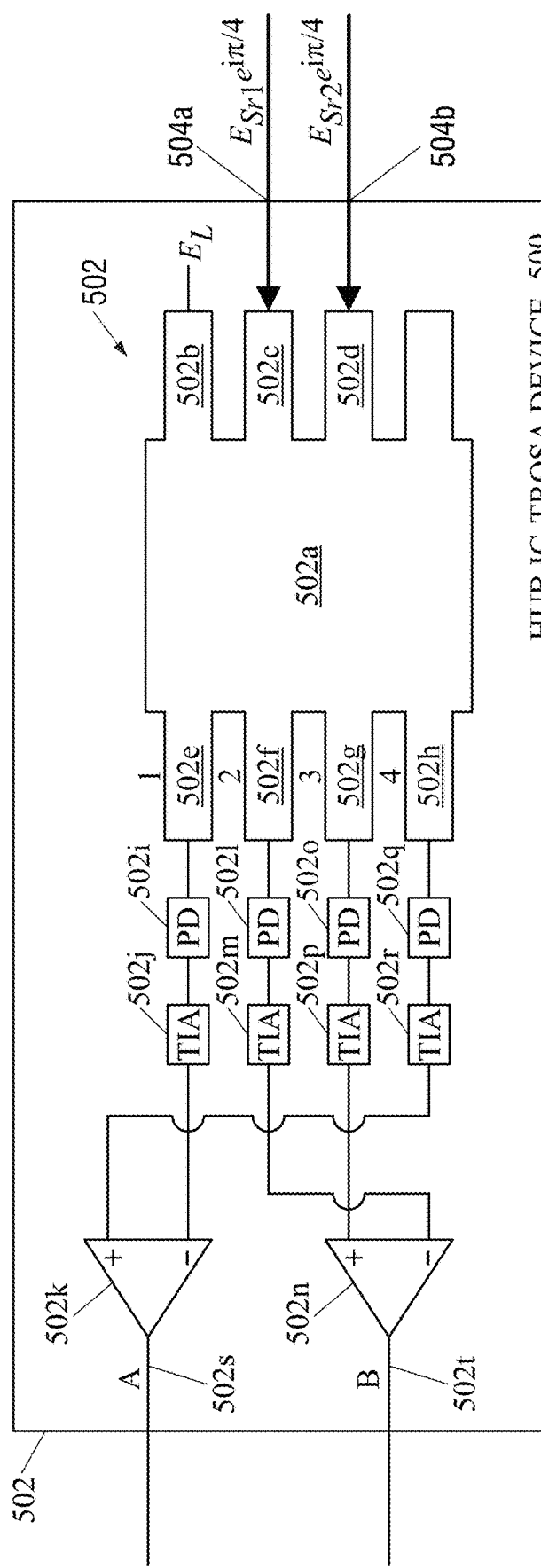
FIG. 25 is a schematic view illustrating an embodiment of the hub coherent optical transceiver device of FIG. 5 operating during the method of FIG. 20.

With reference to FIG. 25, blocks 2008 and 2010 may alternatively be performed using the hub IC-TROSA receive subsystem provided by the optical hybrid mixer subsystem 502 in the hub IC-TROSA device 500 discussed above with reference to FIG. 5. As such, the optical hybrid mixer subsystem 502 may receive the first set of optical signals that include light with received electrical field $E_{Sr1j}$, and the second set of optical signals that include light with received electrical field $E_{Sr2j}$, with an arbitrary $\pi/4$ radian phase shift provided to each of the corresponding signals (in order to simplify the math involved) such that the first set of optical signals and second set of optical signals are described by $E_{Sr1j}e^{i\pi/4}$ and $E_{Sr2j}e^{i\pi/4}$, respectively.

As will be appreciated by one of skill in the art in possession of the present disclosure, using the known phase shifts provided by MMI devices and techniques similar to those used to calculate the electrical signals output by the optical hybrid mixer subsystem 408 with reference to FIG. 24, the output of the differential amplifiers 502k and 502t identified in the table 2500 in FIG. 25 may be determined. Furthermore, one of skill in the art in possession of the present disclosure will appreciate how corresponding modifications to the subscriber signal processing engine 204 and the hub signal processing engine 204 may be derived based on the results illustrated in FIG. 25 in order to ensure corresponding optical signals are encoded/transmitted and received/decoded correctly.

Figure 26:
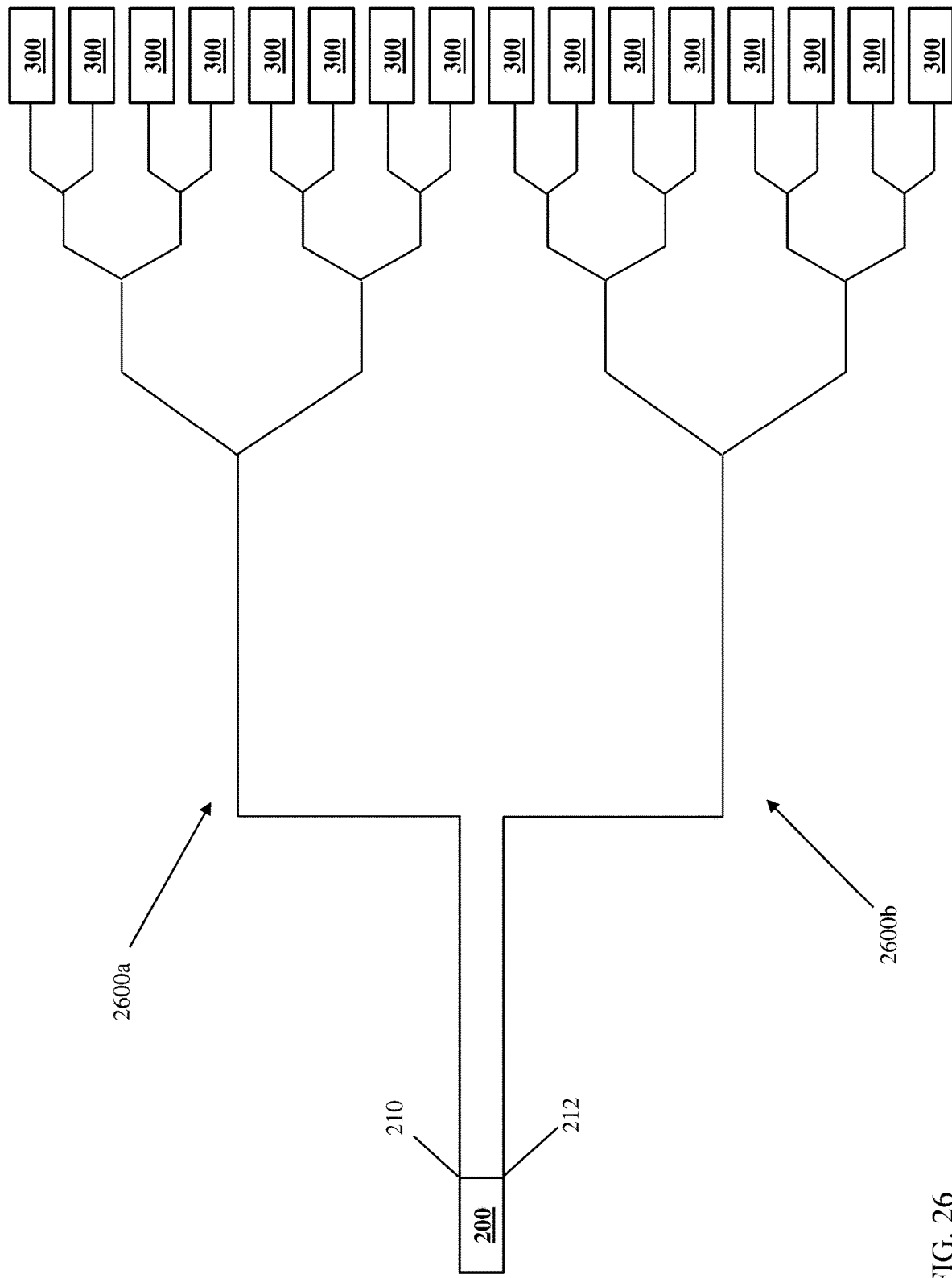
FIG. 26 is a schematic view illustrating an embodiment of the hub coherent optical transceiver device of FIG. 2 coupled to a plurality of the subscriber coherent optical transceiver devices of FIG. 3 via a plurality of networks.

With reference to the IC-TROSA transmit subsystem 804 in the conventional IC-TROSA device 800 discussed above with reference to FIG. 8 and its coupling to the subscriber devices 900 via the PON 902 discussed above with reference to FIG. 9, some benefits of the systems and methods of the present disclosure may be appreciated. For example, with reference to the quadrature optical modulator subsystem 404 in the hub IC-TROSA device 400 discussed above with reference to FIG. 4, consider the coupling of the hub coherent optical transceiver device 200 to the subscriber coherent optical transceiver devices 300 illustrated in FIG. 26, with eight subscriber coherent optical transceiver devices 300 coupled to the first hub optical network connector 210 on the hub coherent optical transceiver device 200 via a first PON 2600a, and eight subscriber coherent optical transceiver devices 300 coupled to the second hub optical network connector 212 on the hub coherent optical transceiver device 200 via a second PON 2600b.

As will be appreciated by one of skill in the art in possession of the present disclosure, the optical directional coupler device 404n in the quadrature optical modulator subsystem 404 allows for the removal of the 1×2 single-mode Y-junction optical waveguides 902a required to allow the conventional hub coherent optical transceiver device 800 to transmit optical signals to the sixteen subscriber devices 900. Similarly, the optical directional coupler device 408a in the optical hybrid mixer subsystem 408 allows for the removal of the 1×2 single-mode Y-junction optical waveguides 902a required to allow the conventional hub coherent optical transceiver device 800 to receive optical signals from the sixteen subscriber devices 900. As will be appreciated by one of skill in the art in possession of the present disclosure, the removal of the 1×2 single-mode Y-junction optical waveguides 902a reduces light power loss experienced in the system illustrated in FIG. 9 by 3 decibels (dB), which at an approximate optical fiber loss ratio of 0.2 dB/km at 1550 nm optical wavelengths, operates to increase the distance the hub coherent optical transceiver device 400 can transmit optical signals at a particular power to its sixteen subscriber coherent optical transceiver devices 300/subscriber devices by approximately 15 km relative to the hub coherent optical transceiver device 800 and its subscriber devices 900. Alternatively, rather than increase the optical signal transmission distance, an additional 1×2 single-mode Y-junction optical waveguide may be added to the PONs 2600a and 2600b to double the number of subscriber coherent optical transceiver devices 300/subscriber device supported.

Figure 27:
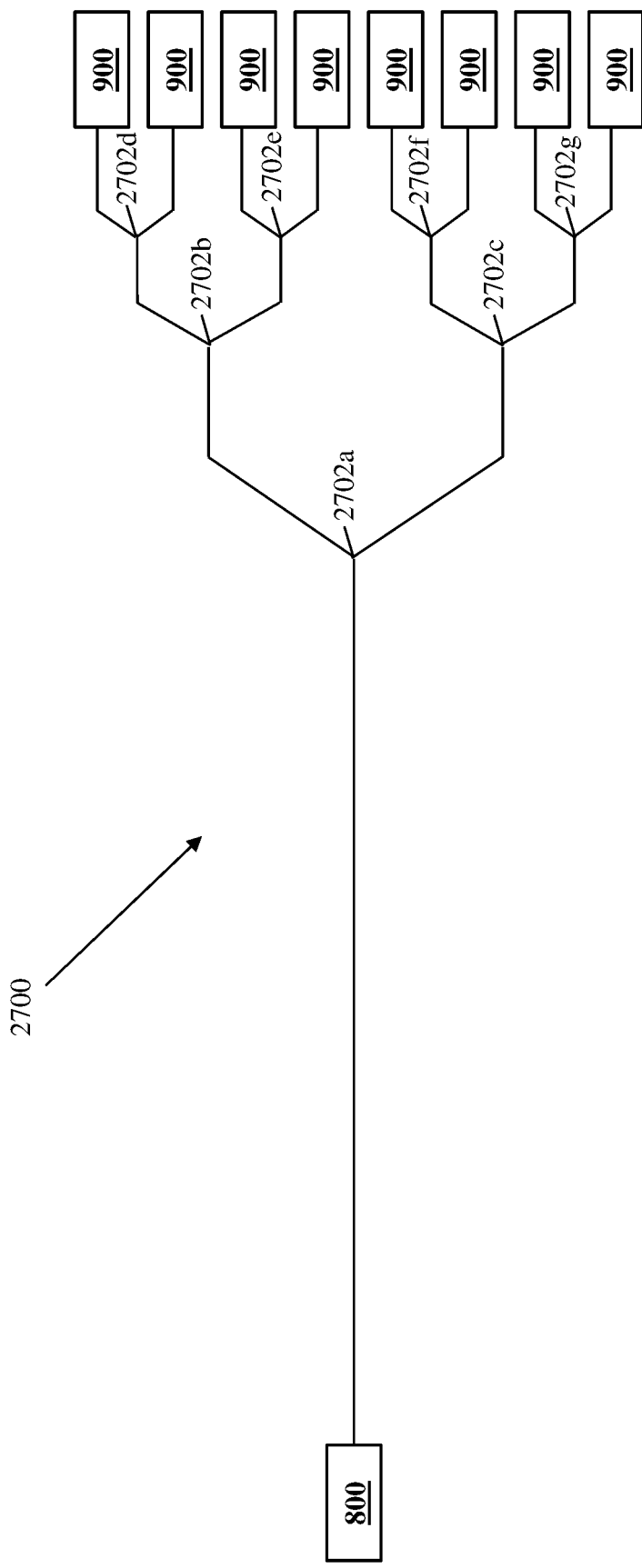
FIG. 27 is a schematic view illustrating an embodiment of the conventional IC-TROSA device of FIG. 8 coupled to a plurality of the subscriber devices via a network.
Figure 28:
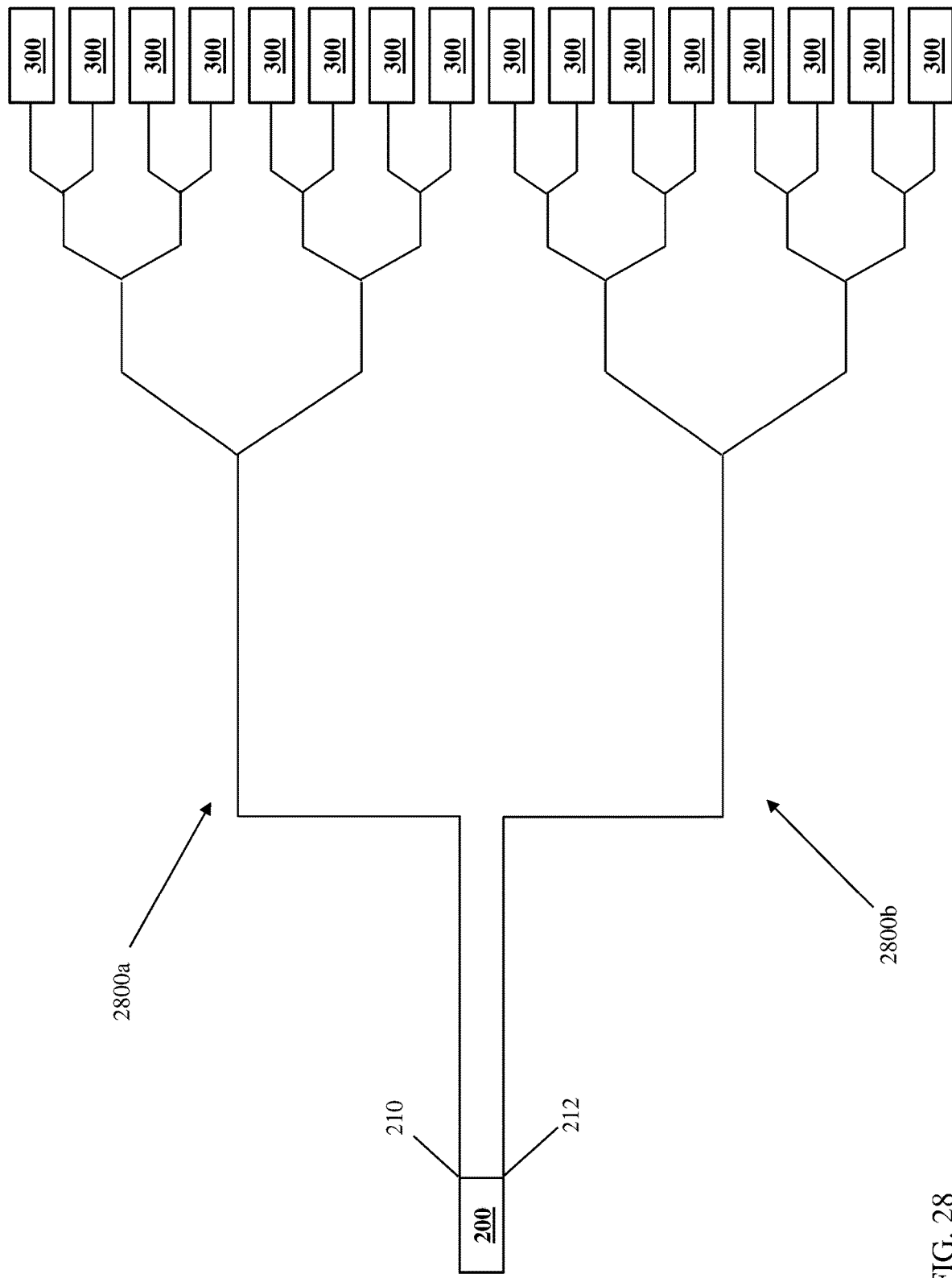
FIG. 28 is a schematic view illustrating an embodiment of the hub coherent optical transceiver device of FIG. 2 coupled to a plurality of the subscriber coherent optical transceiver devices of FIG. 3 via a plurality of networks.

Referring now to FIG. 27, the conventional IC-TROSA device 800 discussed above with reference to FIG. 8 is illustrated coupled to the subscriber devices 900 via a PON 2700 that includes a plurality of 1×2 single-mode Y-junction optical waveguides 2702a, 2702b, 2702c, 2702d. 2702e, 2702f, and 2702g that allow the conventional IC-TROSA device 800 to transmit optical signals having a threshold optical power level a particular distance to the subscriber devices 900. With reference to the quadrature optical modulator subsystem 404 in the hub IC-TROSA device 400 discussed above with reference to FIG. 4, consider the coupling of the hub coherent optical transceiver device 200 to the subscriber coherent optical transceiver devices 300 illustrated in FIG. 28, with eight subscriber coherent optical transceiver devices 300 coupled to the first hub optical network connector 210 on the hub coherent optical transceiver device 200 via a first PON 2800a, and eight subscriber coherent optical transceiver devices 300 coupled to the second hub optical network connector 212 on the hub coherent optical transceiver device 200 via a second PON 2800b.

As discussed above, the optical directional coupler device 404n in the quadrature optical modulator subsystem 404 allows the hub coherent optical transceiver device 200 to transmit first optical signals having the threshold optical power level discussed above the particular distance discussed above to the eight subscriber coherent optical transceiver devices 300 coupled to the first hub optical network connector 210 on the hub coherent optical transceiver device 200 via a first PON 2800a, and transmit second optical signals having the threshold optical power level discussed above the particular distance discussed above to the eight subscriber coherent optical transceiver devices 300 coupled to the second hub optical network connector 212 on the hub coherent optical transceiver device 200 via a second PON 2800b. As will be appreciated by one of skill in the art in possession of the present disclosure, the use of the optical directional coupler device 404n in the quadrature optical modulator subsystem 404 increases (i.e., doubles) the "overall optical link budget" by 3 decibels (dB), thus allowing the hub coherent optical transceiver device 200 to transmit optical signals with the same optical power the same distance as those transmitted by the conventional hub coherent optical transceiver device 800, but to twice as many subscriber coherent optical transceiver devices. Alternatively, the hub coherent optical transceiver device 200 may transmit optical signals with higher optical power the same distance to eight subscriber coherent optical transceiver devices, thus providing those optical signals with lower system bit error ratios in order to provide a more robust network that can operate despite network degradation (e.g., due to aging effects on active and passive elements in the network).

While specific benefits of the systems and methods of the present disclosure have been described above, one of skill in the art in possession of the present disclosure will appreciate how the hub coherent optical transceiver device 200 described herein provides a variety of other benefits as well. For example, in order to increase the distance that optical signals may be transmitted by a 3 dB equivalent, or increase the number of subscriber devices to which optical signals may be transmitted by a 3 dB equivalent, two of the conventional hub coherent optical transceiver devices 800 in a parallel configuration would be required, thus doubling over power consumption, overall heat dissipation, overall cost, and the number of switch/router Ethernet ports consumed (raising the possibility of stranded switch/router bandwidth). As such, the hub coherent optical transceiver device 200 operates to reduce power consumption, heat dissipation, cost, and switch/router Ethernet ports consumed when transmitting optical signals, and one of skill in the art in possession of the present disclosure will appreciate how the configuration of the hub coherent optical transceiver device 200 will be associated with relatively minimal increases in power consumption, heat dissipation, and cost compared to the conventional hub coherent optical transceiver device 800. Similarly, the subscriber coherent optical transceiver device 300 may require only a subscriber signal processing software upgrade, and thus will be associated with relatively minimal increases in power consumption, heat dissipation, and cost compared to conventional subscriber coherent optical transceiver devices as well.

Furthermore, one of skill in the art in possession of the present disclosure will appreciate how an additional transmit/receive port at the hub can improve the carrier's bandwidth utilization, as described in [D. Nesset, D. Pichler, K. Farrow and N. Parkin, "GPON SFP transceiver with PIC based mode-coupled receiver," 38$^{th}$ *European Conference and Exhibition on Optical Communications* (*ECOC*), 2012, London, U K, 2012, paper Tu.3.B.4.].

Figure 29:
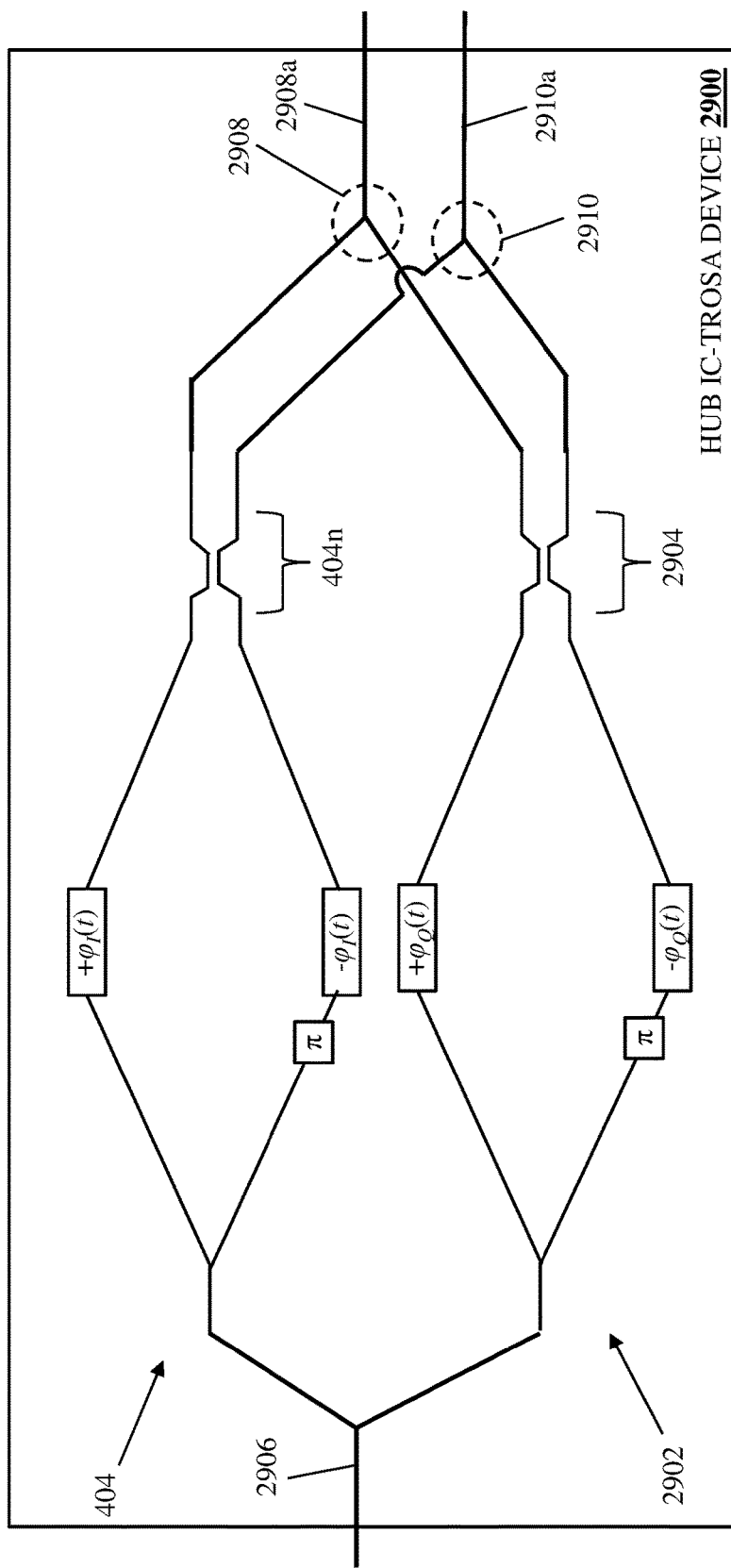
FIG. 29 is a schematic view illustrating an embodiment of a quadrature optical modulator subsystem provided according to the teachings of the present disclosure in the hub IC-TROSA device provided according to the teachings of the present disclosure.

As discussed above, the hub IC-TROSA device 200 may include a pair of quadrature optical modulator subsystems, and one of skill in the art in possession of the present disclosure will appreciate how those quadrature optical modulator subsystems may be configured in a variety of manners. FIG. 29 illustrates one embodiment of such a hub IC-TROSA device 2900, which includes the quadrature optical modulator subsystem 404 having the optical directional coupler device 404*n*, as well as a quadrature optical modulator subsystem 2902 having an optical directional coupler device 2904, with the quadrature optical modulator subsystem 2902 and the optical directional coupler device 2904 operating substantially similarly as described above for the quadrature optical modulator subsystem 404 and the optical directional coupler device 404*n*. In the illustrated embodiment, each of the quadrature optical modulator subsystem 404 and the quadrature optical modulator subsystem 2902 are configured to receive light via the same input 2906, while a 2×1 Y-junction optical waveguide 2908 couples first outputs on each of the optical directional coupler device 404*n* and the optical directional coupler device 2904 to a first optical transmit connection 2908*a*, and a 2×1 Y-junction optical waveguide 2910 couples second outputs on each of the optical directional coupler device 404*n* and the optical directional coupler device 2904 to a second optical transmit connection 2910*a*.

One of skill in the art in possession of the present disclosure will recognize how the configuration of the hub IC-TROSA device 2900 replaces two 2×1 Y-junction optical waveguides that would otherwise be included in a conventional hub IC-TROSA device (e.g., with the optical directional coupler devices 2908 and 2910), but with the first optical transmit connection 2908*a* and the second optical transmit connection 2910*a* each provided by two 2×1 Y-junction optical waveguides. As such, the hub IC-TROSA device 2900 will reduce waste light relative to the conventional hub IC-TROSA devices by 3 dB, while also including dual optical transmit ports (coupled to the first and second optical transmit connections 2908*a* and 2910*a*) that each carry identical information having quadratures that are at different optical phase relationships in each of the optical signals. Furthermore, one of skill in the art in possession of the present disclosure will recognize how the teachings of the present disclosure may be applied to modify optical signal encoding, decoding, and/or other signal processing operations in order to provide for the transmission of optical signals via the first and second optical transmit connections 2908*a* and 2910*a* as discussed above, as well as decode those optical signals once received as discussed above as well.

Figure 30:
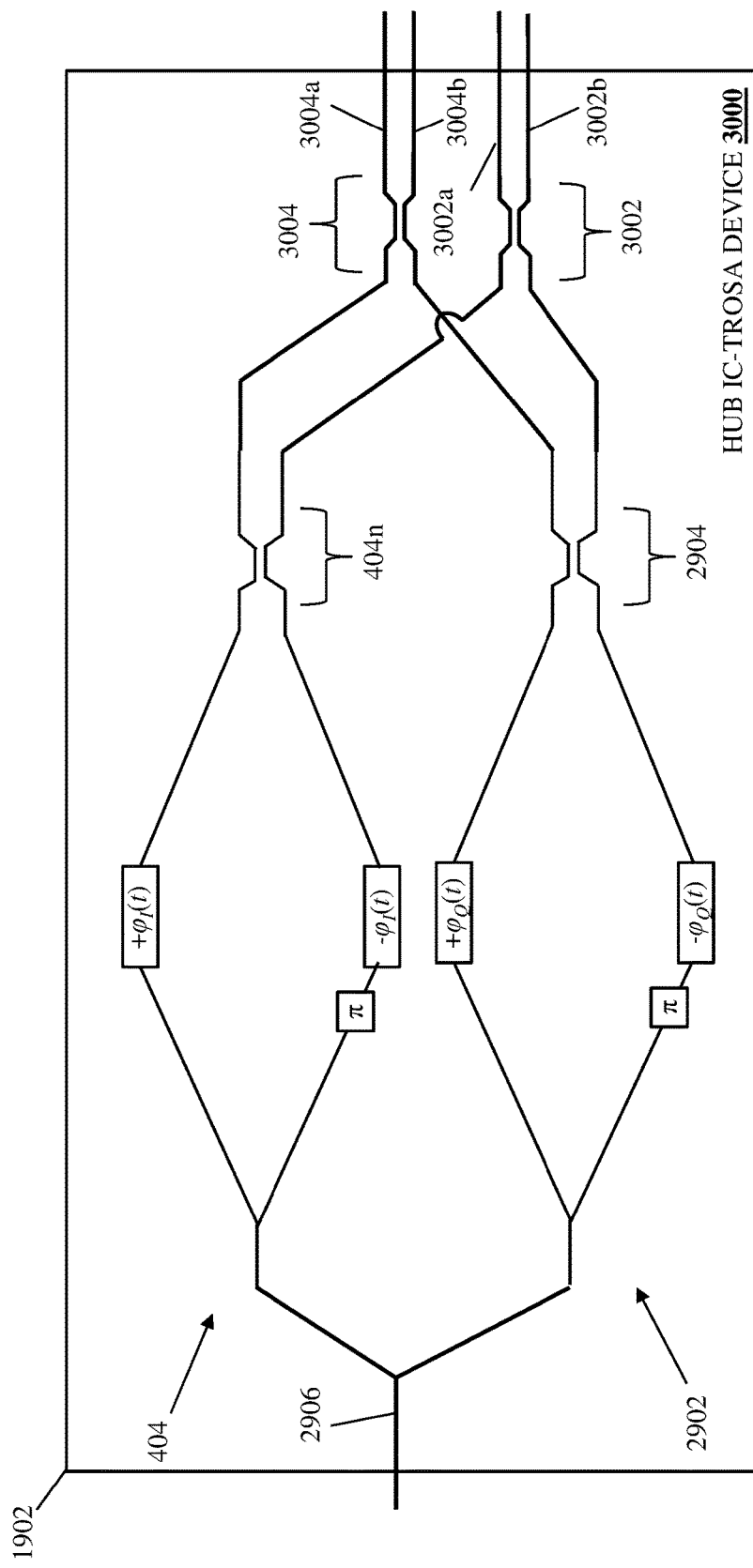
FIG. 30 is a schematic view illustrating an embodiment of a quadrature optical modulator subsystem provided according to the teachings of the present disclosure in the hub IC-TROSA device provided according to the teachings of the present disclosure.

With reference to FIG. 30, an embodiment of a hub IC-TROSA device 3000 is illustrated that is similar to the hub IC-TROSA device 2900, and thus includes similar element numbers for similar components. However, the 2×1 Y-junction optical waveguides 2908 and 2910 have been replaced by an optical directional coupler device 3002 that couples first outputs on each of the optical directional coupler device 404*n* and the optical directional coupler device 2904 to a first optical transmit connection 3002*a* and a second optical transmit connection 3002*b*, and an optical directional coupler device 3004 that couples second outputs on each of the optical directional coupler device 404*n* and the optical directional coupler device 2904 to a third optical transmit connection 3004*a* and a fourth optical transmit connection 3004*b*. One of skill in the art in possession of the present disclosure will recognize how the configuration of the hub IC-TROSA device 3000 replaces the two 2×1 Y-junction optical waveguides in the hub IC-TROSA device 2900 (e.g., with the optical directional coupler devices 3002 and 3004). As such, the hub IC-TROSA device 3000 will reduce waste light relative to the conventional hub IC-TROSA devices by 6 dB, while also including four optical transmit ports (coupled to the first, second, third, and fourth optical transmit connections 3002*a*, 3002*b*, 3004*a*, and 3004*b*) that each carry identical information having quadratures that are at different optical phase relationships in each of the optical signals. Furthermore, one of skill in the art in possession of the present disclosure will recognize how the teachings of the present disclosure may be applied to modify optical signal encoding, decoding, and/or other signal processing operations in order to provide for the transmission of optical signals via the first, second, third, and fourth optical transmit connections 3002*a*, 3002*b*, 3004*a*, and 3004*b* as discussed above, as well as decode those optical signals once received as discussed above as well.

Thus, systems and methods have been described that include a hub IC-TROSA device with an optical directional coupler device that substantially eliminates optical signal loss produced by conventional hub IC-TROSA devices while providing dual optical receive connections that allow the hub IC-TROSA device to receive two optical signals (via the respective receive connections) from different point-to-multipoint optical networks. For example, the hub IC-TROSA point-to-multipoint optical network system of the present disclosure may include a point-to-multipoint optical network that is coupled to subscriber devices, and that is coupled to a hub device via a hub IC-TROSA device included in a hub coherent optical transceiver device coupled to the hub device. The hub IC-TROSA device includes an optical hybrid mixer subsystem, a second optical directional coupler device that is included in the optical hybrid mixer subsystem. A first receive connection is provided by the second optical direction coupler device, and the second optical directional coupler device is configured to receive a first set of optical signals at the first receive connection via the point-to-multipoint optical network. A second receive connection is provided by the second optical direction coupler device, and the second optical directional coupler device is configured to receive a second set of optical signals at the second receive connection via the point-to-multipoint optical network. The optical hybrid mixer subsystem is configured to convert the first set of optical signals and the second set of optical signals to second electrical signals and third electrical signals, and provide the second electrical signals and third electrical signals to the hub signal processing subsystem. As discussed above, the hub IC-TROSA device of the present disclosure increases the distance optical signals may be received, or increases the number of subscriber devices to which optical signals may be received over a particular distance, via point-to-multipoint networks relative to conventional hub IC-TROSA devices.

As will be appreciated by one of skill in the art in possession of the present disclosure, techniques that are efficient and practical may exist for transmitting data without the use of the quadrature optical modulator subsystem having the optical directional coupler device in the hub IC-TROSA device discussed above (e.g., the quadrature optical modulator subsystem 404 having the optical directional coupler device 404n in the hub IC-TROSA device 400 of FIG. 4), while separate and distinct benefits may be realized by receiving data via different receive connections provided in the hub IC-TROSA device discussed above (e.g., the receive connections 410a and 410b included on the hub IC-TROSA device 400 of FIG. 4). As such, embodiments of hub coherent optical transceiver devices are described below that combine the teachings of the present disclosure it order to combine efficient/practical data transmission techniques with the data receiving techniques detailed above in order to realize a variety of benefits that would be apparent to one of skill in the art in possession of the present disclosure.

Figure 31:
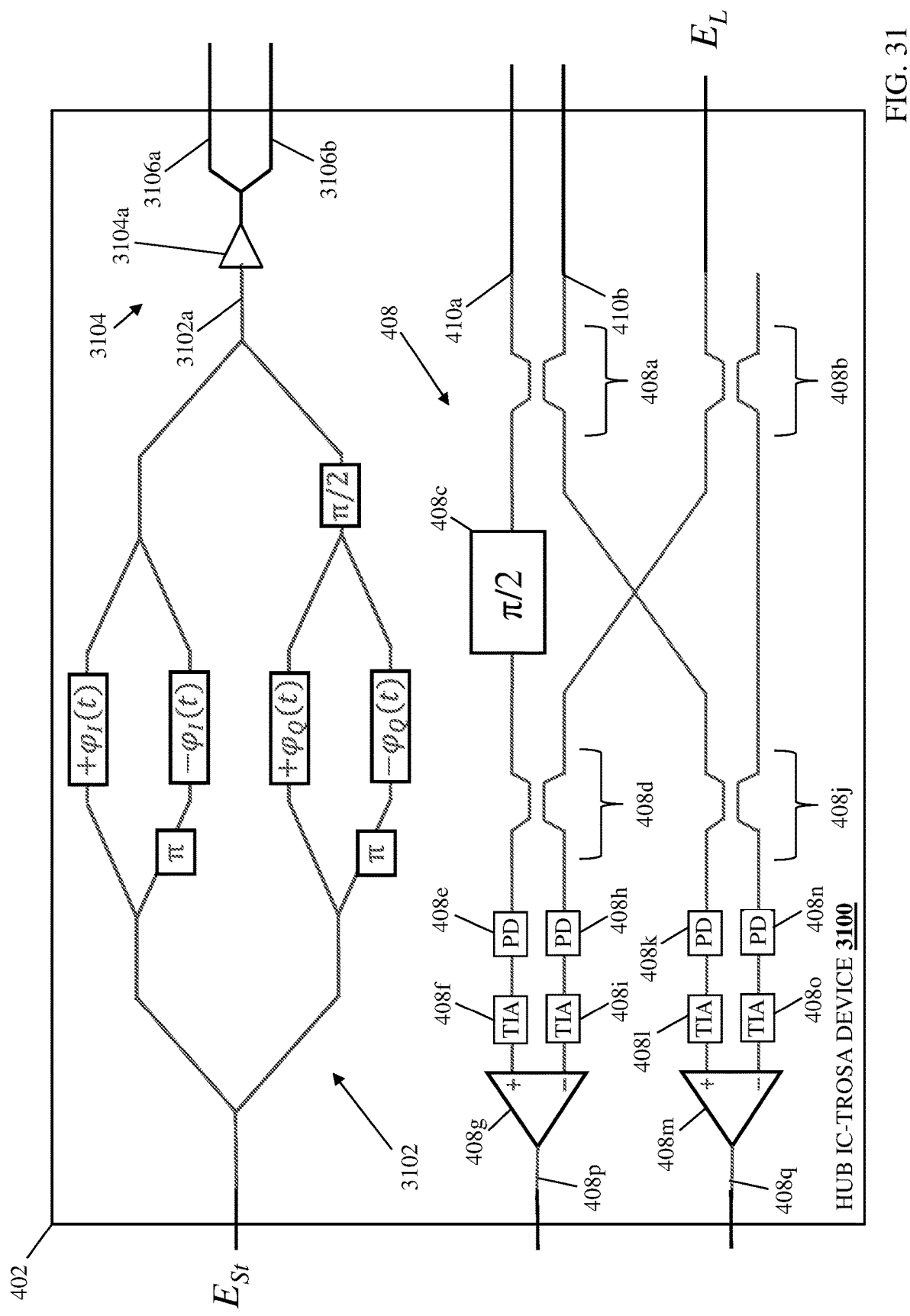
FIG. 31 is a schematic view illustrating an embodiment of the hub coherent optical transceiver device of FIG. 2.

With reference to FIG. 31, an embodiment of a hub IC-TROSA device 3100 is illustrated that is similar to the hub IC-TROSA device 400 described above with reference to FIG. 4, with similar components provided with the same reference numbers. As will be appreciated by one of skill in the art in possession of the present disclosure, the hub IC-TROSA device 3100 includes the optical hybrid mixer subsystem 408 in the hub IC-TROSA device 400 having the first optical receive connection 410a and the second optical receive connection 410b, but replaces the quadrature optical modulator subsystem 404 in the hub IC-TROSA device 400 having the first optical transmit connection 406a and the second optical transmit connection 406b with a quadrature optical modulator subsystem 3102 and an optical amplifier/optical splitter subsystem 3104 including an amplifier 3104a coupled to an output 3102a of the quadrature optical modulator subsystem 3102, and a 1×2 single-mode Y-junction having an optical receive connection coupled to the amplifier 3104a, a first optical transmit connection 3106a, and a second optical transmit connection 3106b. As such, the hub IC-TROSA device 3100 utilizes the teachings of the present disclosure above to provide first and second receive connections on the hub IC-TROSA device 3100, while including a conventional quadrature optical modulator subsystem 3102 and an optical amplifier/optical splitter subsystem 3104 to provide first and second transmit connections. As will be appreciated by one of skill in the art in possession of the present disclosure, optical signals transmitted via the first and second optical transmit connections 3106a and 3106b may carry the same information, and subscriber devices may be configured to decode such signals using the techniques described above regardless of which PON that subscriber is included in.

Figure 32A:
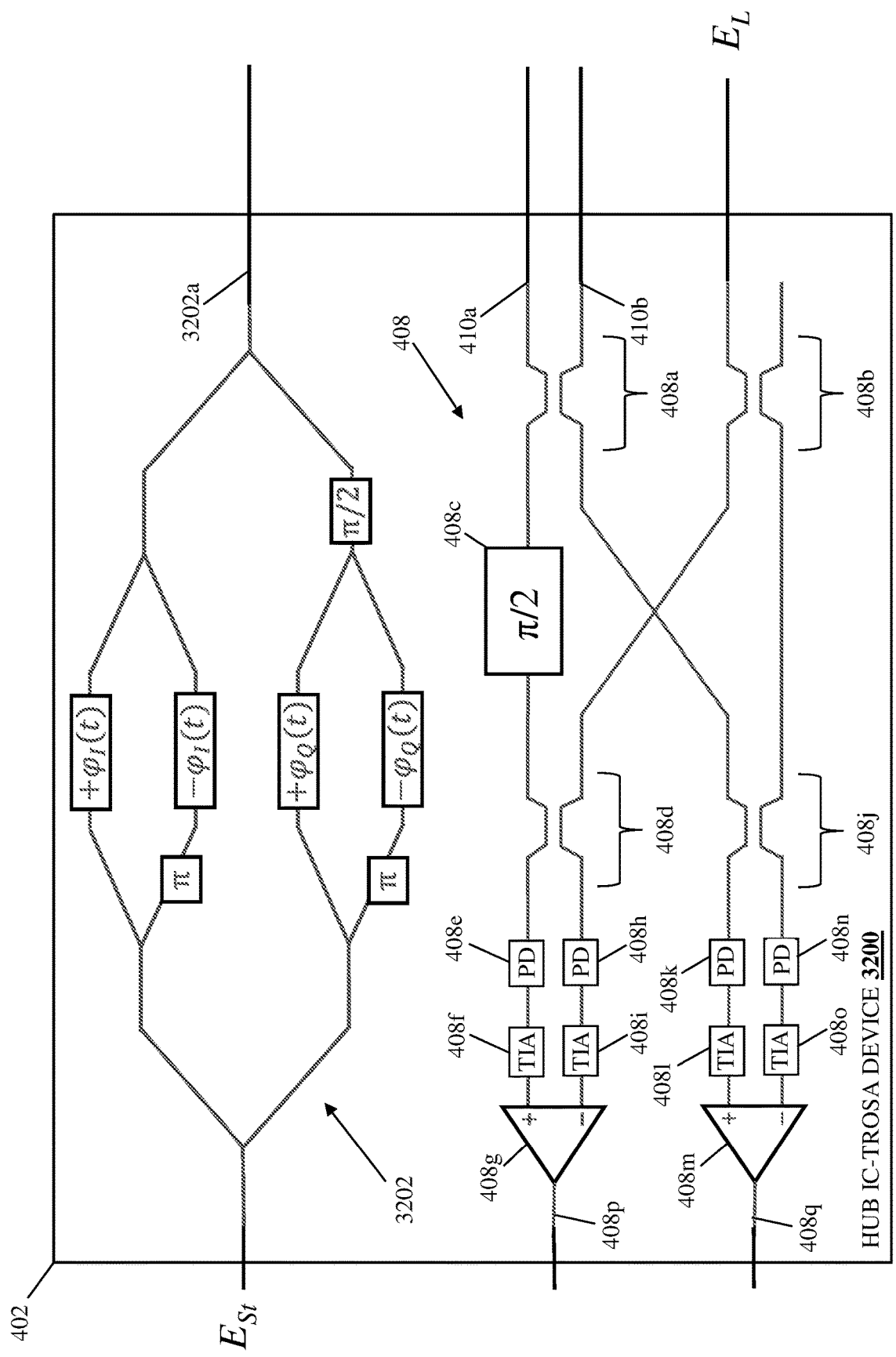
FIG. 32A is a schematic view illustrating an embodiment of a HUB IC-TROSA device that may be provided according to the teachings of the present disclosure.

With reference to FIG. 32A, an embodiment of a hub IC-TROSA device 3200 is illustrated that is similar to the hub IC-TROSA device 400 described above with reference to FIG. 4, with similar components provided with the same reference numbers. As will be appreciated by one of skill in the art in possession of the present disclosure, the hub IC-TROSA device 3200 includes the optical hybrid mixer subsystem 408 in the hub IC-TROSA device 400 having the first optical receive connection 410a and the second optical receive connection 410b, but replaces the quadrature optical modulator subsystem 404 in the hub IC-TROSA device 400 having the first optical transmit connection 406a and the second optical transmit connection 406b with a quadrature optical modulator subsystem 3202 having an optical transmit connection 3202a. As such, the hub IC-TROSA device 3200 utilizes the teachings of the present disclosure above to provide first and second receive connections on the hub IC-TROSA device 3100, while including a conventional quadrature optical modulator subsystem 3202 having a single transmit connection 3202a.

Figure 32B:
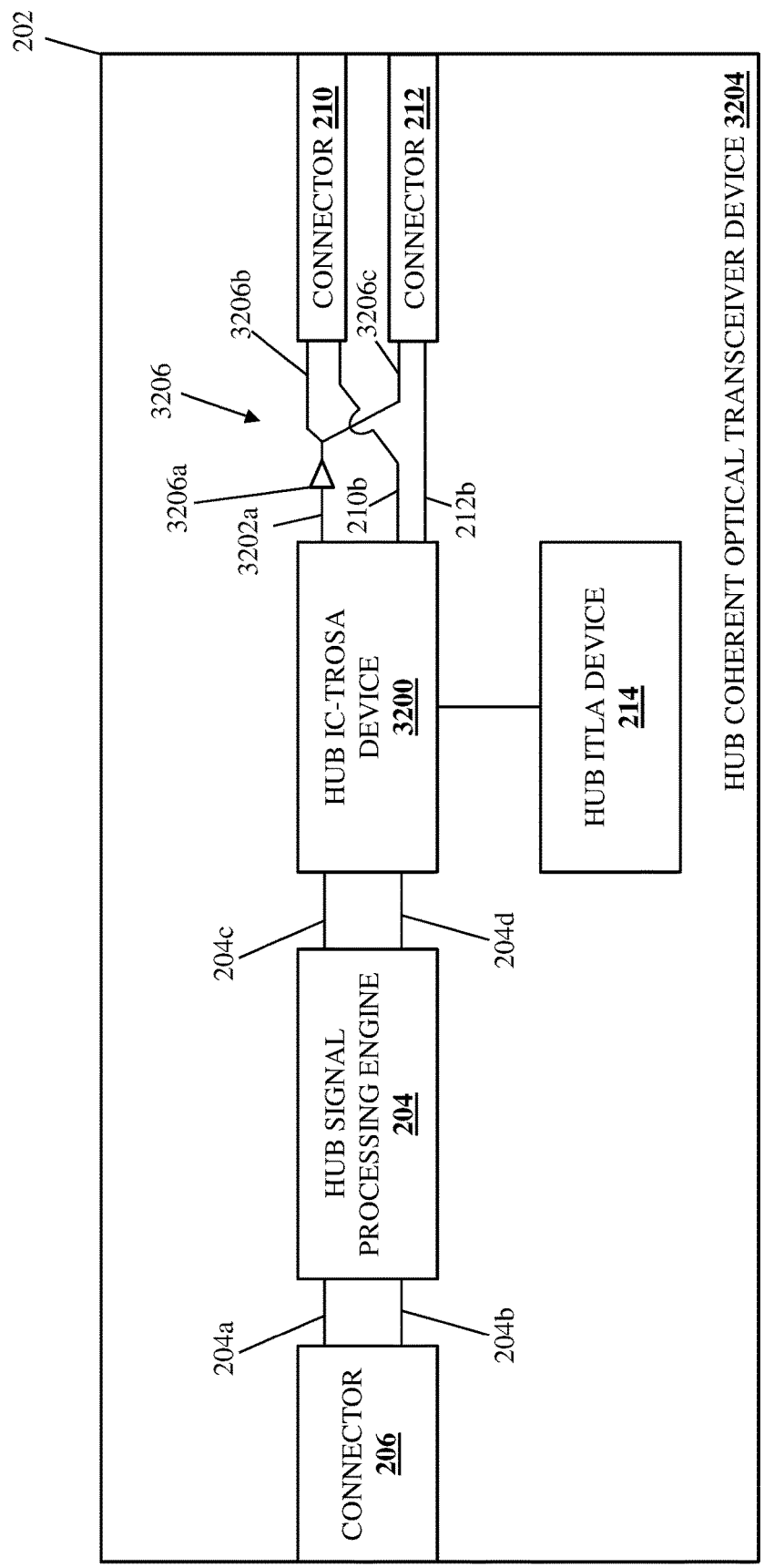
FIG. 32B is a schematic view illustrating an embodiment of a hub coherent optical transceiver device that may include the HUB IC-TROSA device of FIG. 32A.

With reference to FIG. 32B, an embodiment of a hub coherent optical transceiver device 3204 is illustrated that is similar to the hub coherent optical transceiver device 200 described above with reference to FIG. 2, with similar components provided with the same reference numbers. As will be appreciated by one of skill in the art in possession of the present disclosure, the hub coherent optical transceiver device 3204 replaces the hub IC-TROSA device 208, the first optical transmit connection 210a, and the second optical transmit connection 212a included in the hub coherent optical transceiver device 200 of FIG. 2 with the hub IC-TROSA device 3200 of FIG. 32A and an optical amplifier/optical splitter subsystem 3206 that includes an amplifier 3206a coupled to the transmit connection 3202a on the hub IC-TROSA device 3200, as well as a 1×2 single-mode Y-junction with an optical receive connection coupled to the amplifier 3206a, a first optical transmit connection 3206b coupled to the connector 210, and a second optical transmit connection 3206c coupled to the connector 212. As such, the hub coherent optical transceiver device 3204 and the hub IC-TROSA device 3200 may utilize the teachings of the present disclosure to provide first and second receive connections on the hub coherent optical transceiver device 3204, while including an optical amplifier/optical splitter subsystem 3206 coupled between the connector 210 on the hub coherent optical transceiver device 3204 and the single transmit connection 3202a on the conventional quadrature optical modulator subsystem 3202 in the hub IC-TROSA device 3200 to provide first and second transmit connections.

Figure 32C:
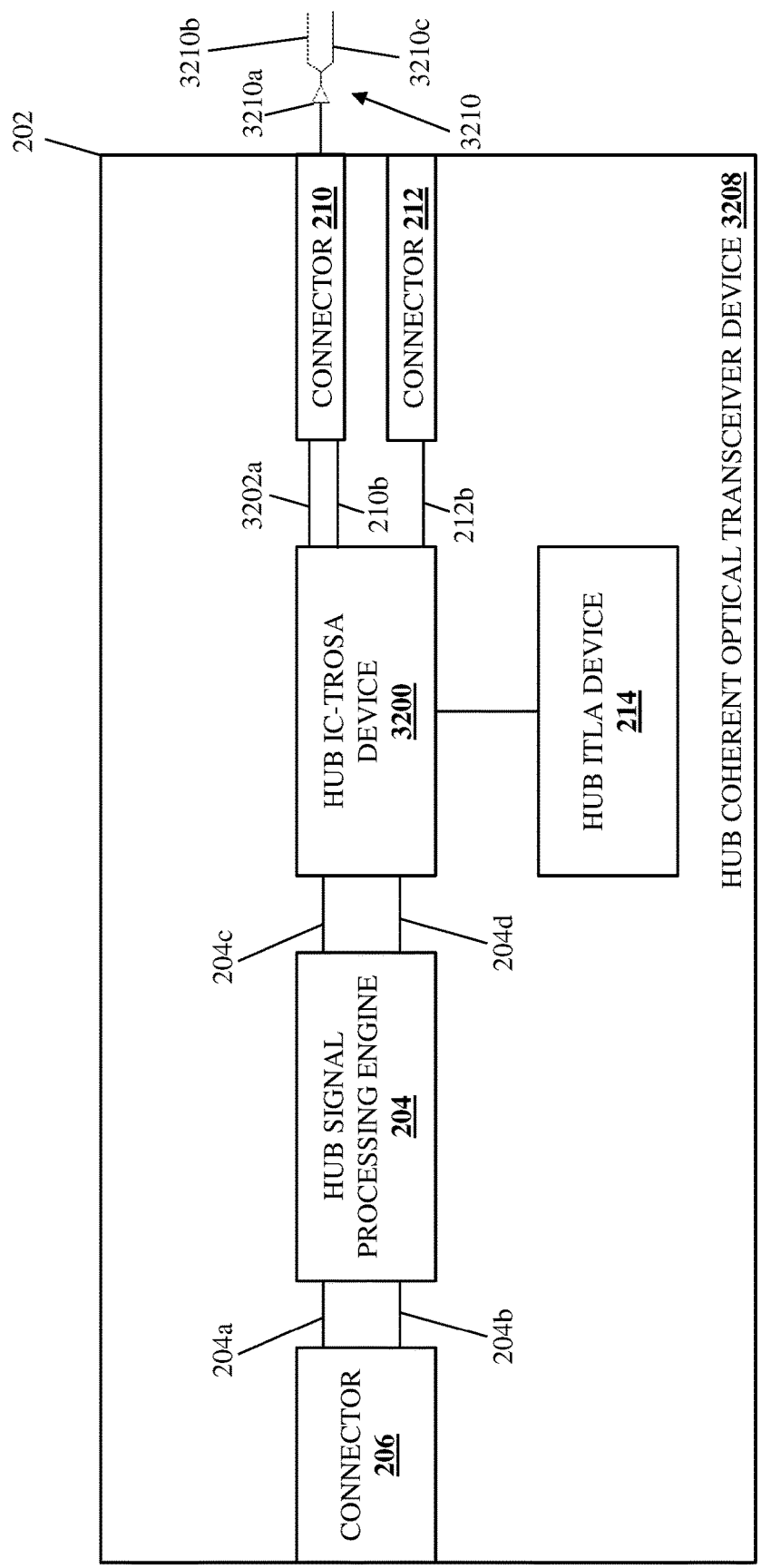
FIG. 32C is a schematic view illustrating an embodiment of a hub coherent optical transceiver device that may include the HUB IC-TROSA device of FIG. 32A.

With reference to FIG. 32C, an embodiment of a hub coherent optical transceiver device 3208 is illustrated that is similar to the hub coherent optical transceiver device 200 described above with reference to FIG. 2, with similar components provided with the same reference numbers. As will be appreciated by one of skill in the art in possession of the present disclosure, the hub coherent optical transceiver device 3208 replaces the hub IC-TROSA device 208 and the first optical transmit connection 210a included in the hub coherent optical transceiver device 200 of FIG. 2 with the hub IC-TROSA device 3200 of FIG. 32A having the transmit connection 3202a coupled to the connector 210. Furthermore, as illustrated in FIG. 32C, an optical amplifier/optical splitter subsystem 3210 may be provided that includes an amplifier 3210a coupled to the connector 210, as well as a 1×2 single-mode Y-junction having an optical receive connection coupled to the amplifier 3210a, a first optical transmit connection 3210b coupled to an optical network as discussed above, and a second optical transmit connection 3210c coupled to an optical network as discussed above. As such, the hub coherent optical transceiver device 3208 and the hub IC-TROSA device 3200 may utilize the teachings of the present disclosure to provide first and second receive connections on the hub coherent optical transceiver device 3208, while providing an optical amplifier/optical splitter subsystem 3210 in an optical network between subscriber device(s) and a connector 210 on the hub coherent optical transceiver device 3208 that is coupled to a transmit connection 3202a of a conventional quadrature optical modulator subsystem 3202 in a hub IC-TROSA device 3200 included in the hub coherent optical transceiver device 3208, with the optical amplifier/optical splitter subsystem 3210 including first and second transmit connections coupled to those subscriber device(s).

Similarly as discussed above, each of the hub IC-TROSA devices 3100 and 3200 include the hub IC-TROSA receive subsystem having the optical hybrid mixer subsystem 408 and the optical directional coupler device 408a with the first optical receive connection 410a (which may provide the first optical receive connection 210b discussed above with reference to FIG. 2), and the second optical receive connection 410b (which may provide the second optical receive connection 212b discussed above with reference to FIG. 2). The optical hybrid mixer subsystem 408 also includes the optical directional coupler device 408b that is configured to receive light having the receiver local oscillator electrical field $E_L$ (e.g., provided by the hub ITLA device 214) at one of its inputs, with the other input of the optical directional coupler device 408b unused. The optical directional coupler device 408a is configured to mix the optical signals received via the first optical receive connection 410a and the second optical receive connection 410b to generate the "first mixed signal" and the "second mixed signal", and provide the first mixed signal through the π/2 phase shifter 408c in the optical hybrid mixer subsystem 408. As will be appreciated by one of skill in the art in possession of the present disclosure, the optical hybrid mixer subsystem 408 may be replaced by the optical hybrid mixer subsystem 502 (e.g., a 4×4 MMI device) in the examples provided above.

Furthermore, the optical directional coupler device 408d is coupled to the π/2 phase shifter 408c and the optical directional coupler device 408b in the optical hybrid mixer subsystem 408, and is configured to mix the first mixed signal received via the π/2 phase shifter 408c and the light with the receiver local oscillator electrical field $E_L$ to generate the "third mixed signal" and the "fourth mixed signal", and provide the third mixed signal through the photo diode (PD) 408c, the transimpedance amplifier (TIA) 408f, and to the first input on a differential amplifier 408g, while providing the fourth mixed signal through the PD 408h, the TIA 408i, and to the second input on the differential amplifier 408g.

Further still, the optical directional coupler device 408j is coupled to the optical directional coupler devices 408a and 408b in the optical hybrid mixer subsystem 408, and is configured to mix the second mixed signal and light having the receiver local oscillator electrical field $E_L$ to generate the "fifth mixed signal" and the "sixth mixed signal", and provide the fifth mixed signal through the PD 408k, the TIA 408l, and to the first input on the differential amplifier 408m, while providing the sixth mixed signal through the PD 408n, the TIA 408o, and to the second input on the differential amplifier 408m. As such, the hub IC-TROSA receive subsystems illustrated in FIGS. 31 and 32A are configured to convert the optical signals received at the first optical receive connection 410a and the second optical receive connection 410b to electrical signals (i.e., voltages) at outputs 408p and 408q of the differential amplifiers 408g and 408m, respectively.

As also discussed above, each of the hub IC-TROSA devices 3100 and 3200 also include the hub IC-TROSA transmit subsystem provided by the quadrature optical modulator subsystems 3102 and 3202, respectively, that each includes an optical input (e.g., coupled to the hub ITLA device 214), and that may be configured to receive light that includes the transmitter laser source electrical field $E_{St}$ (e.g., provided by the hub ITLA device 214). The quadrature optical modulator subsystems 3102 and 3202 each also includes a pair of Mach Zehnder (MZ) interferometer devices. A first MZ interferometer device is coupled to the optical input of that quadrature optical modulator subsystem and includes a +φ$_I$(t) phase modulator directly coupled to that optical input, and a −φ$_I$(t) phase modulator coupled to that optical input by a π phase shifter, and with each of the +φ$_I$(t) phase modulator and the −φ$_I$(t) phase modulator on the first MZ interferometer device coupled to the output 3102a or transmit connection 3202a of the quadrature optical modulator subsystem 3102 or 3202, respectively. A second MZ interferometer device is coupled to the optical input of that quadrature optical modulator subsystem and includes a +φ$_Q$(t) phase modulator directly coupled to that optical input, and a −φ$_Q$(t) phase modulator coupled to that optical input by a π phase shifter, and with each of the +φ$_I$(t) phase modulator and the −φ$_I$(t) phase modulator on the second MZ interferometer device coupled to the output 3102a or transmit connection 3202a of the quadrature optical modulator subsystem 3102 or 3202, respectively, by a w/2 phase shifter.

With reference to the hub IC-TROSA device 3100 illustrated in FIG. 31, the hub IC-TROSA device 3100 may replace the hub IC-TROSA device 208 in the hub coherent optical transceiver device 200 of FIG. 2, with the coupling of the output 3102a of the quadrature optical modulator subsystem 3102 to the optical amplifier/optical splitter subsystem 3104 providing the first optical transmit connection 3106a (which may provide the first optical transmit connection 210a discussed above with reference to FIG. 2), and the second optical transmit connection 3106b (which may provide the second optical transmit connection 212a). As such, one of skill in the art in possession of the present disclosure will appreciate how the hub IC-TROSA device 3100 may transmit data using the quadrature optical modulator subsystem 3102 and optical amplifier/optical splitter subsystem 3106, and receive data using the optical hybrid mixer subsystem 408 with the first optical receive connection 410a and the second optical receive connection 410b, substantially as described above.

With reference to the hub IC-TROSA device 3200 illustrated in FIG. 32A and the hub coherent optical transceiver device 3204 illustrated in FIG. 32B, the hub IC-TROSA device 3200 may be provided in the hub coherent optical transceiver device 3204, with the coupling of the transmit connection 3202a of the quadrature optical modulator subsystem 3202 to the optical amplifier/optical splitter subsystem 3206 providing the first optical transmit connection 3206b that may be coupled to an optical network via the connector 210, and the second optical transmit connection 3206b that may be coupled to an optical network via the connector 212. As such, one of skill in the art in possession of the present disclosure will appreciate how the hub IC-TROSA device 3200 may transmit data using the quadrature optical modulator subsystem 3202 and optical amplifier/optical splitter subsystem 3206, and receive data using the optical hybrid mixer subsystem 408 with the first optical receive connection 410a and the second optical receive connection 410b, substantially as described above.

With reference to the hub IC-TROSA device 3200 illustrated in FIG. 32A and the hub coherent optical transceiver device 3208 illustrated in FIG. 32C, the hub IC-TROSA device 3200 may be provided in the hub coherent optical transceiver device 3208, with the connector 210 coupling the transmit connection 3202a of the quadrature optical modulator subsystem 3202 to the optical amplifier/optical splitter subsystem 3210 to provide the first optical transmit connection 3210b that may be coupled to an optical network, and the second optical transmit connection 3210c that may be coupled to an optical network. As such, one of skill in the art in possession of the present disclosure will appreciate how the hub IC-TROSA device 3200 may transmit data using the quadrature optical modulator subsystem 3202 and optical amplifier/optical splitter subsystem 3210, and receive data using the optical hybrid mixer subsystem 408 with the first optical receive connection 410a and the second optical receive connection 410b, substantially as described above.

Figure 33:
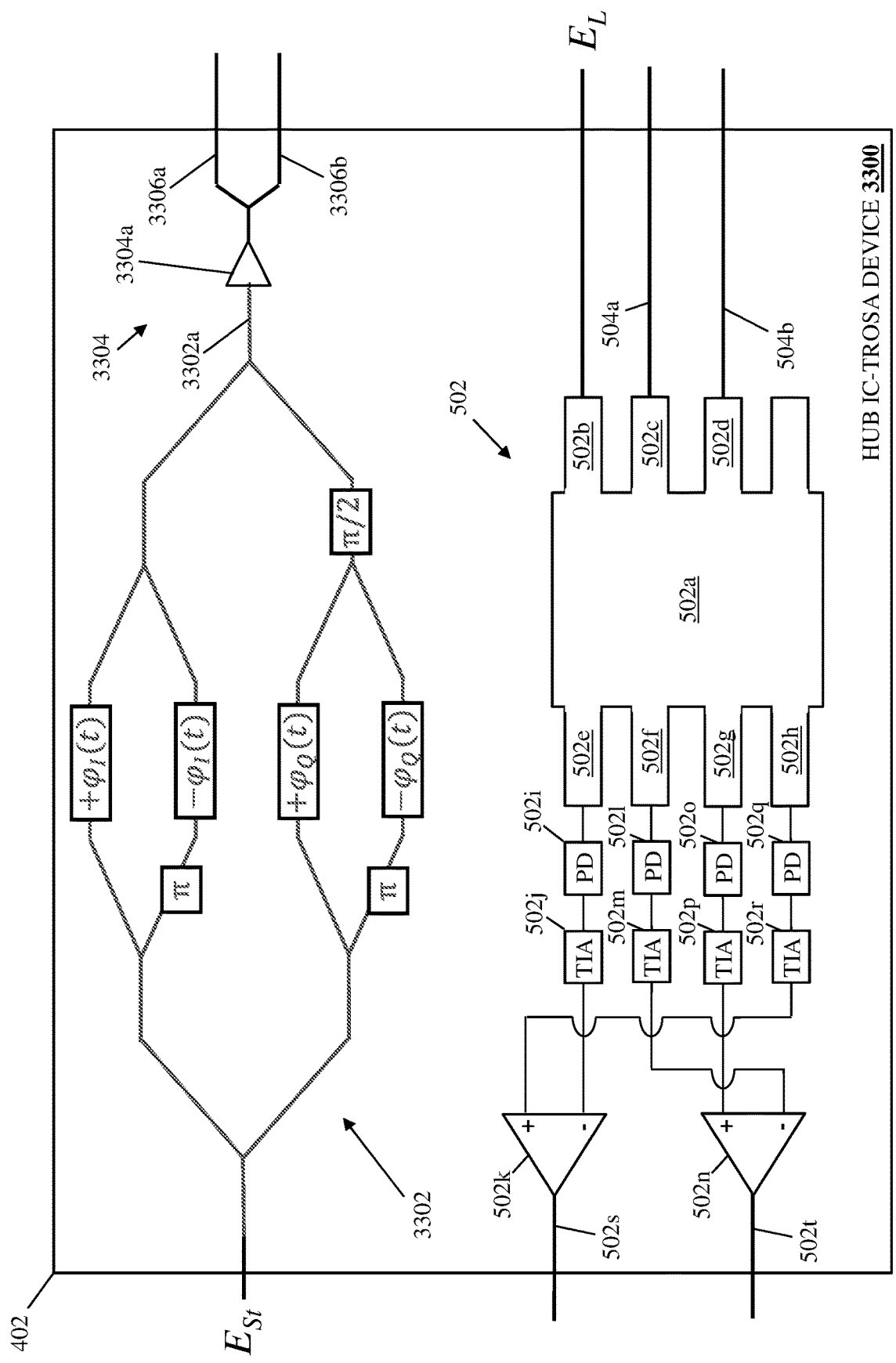
FIG. 33 is a schematic view illustrating an embodiment of the hub coherent optical transceiver device of FIG. 2.

With reference to FIG. 33, an embodiment of a hub IC-TROSA device 3300 is illustrated that is similar to the hub IC-TROSA device 500 described above with reference to FIG. 5, with similar components provided with the same reference numbers. As will be appreciated by one of skill in the art in possession of the present disclosure, the hub IC-TROSA device 3300 includes the optical hybrid mixer subsystem 502 in the hub IC-TROSA device 500 having the first optical receive connection 504a and the second optical receive connection 504b, but replaces the quadrature optical modulator subsystem 404 in the hub IC-TROSA device 400 having the first optical transmit connection 406a and the second optical transmit connection 406b with a quadrature optical modulator subsystem 3302 and an optical amplifier/optical splitter subsystem 3304 including an amplifier 3304a coupled to an output 3302a of the quadrature optical modulator subsystem 3302, and a 1×2 single-mode Y-junction having an optical receive connection coupled to the amplifier 3304a, a first optical transmit connection 3306a, and a second optical transmit connection 3306b. As such, the hub IC-TROSA device 3300 utilizes the teachings of the present disclosure above to provide first and second receive connections on the hub IC-TROSA device 3300, while including a conventional quadrature optical modulator subsystem 3302 and an optical amplifier/optical splitter subsystem 3304 to provide first and second transmit connections.

Figure 34A:
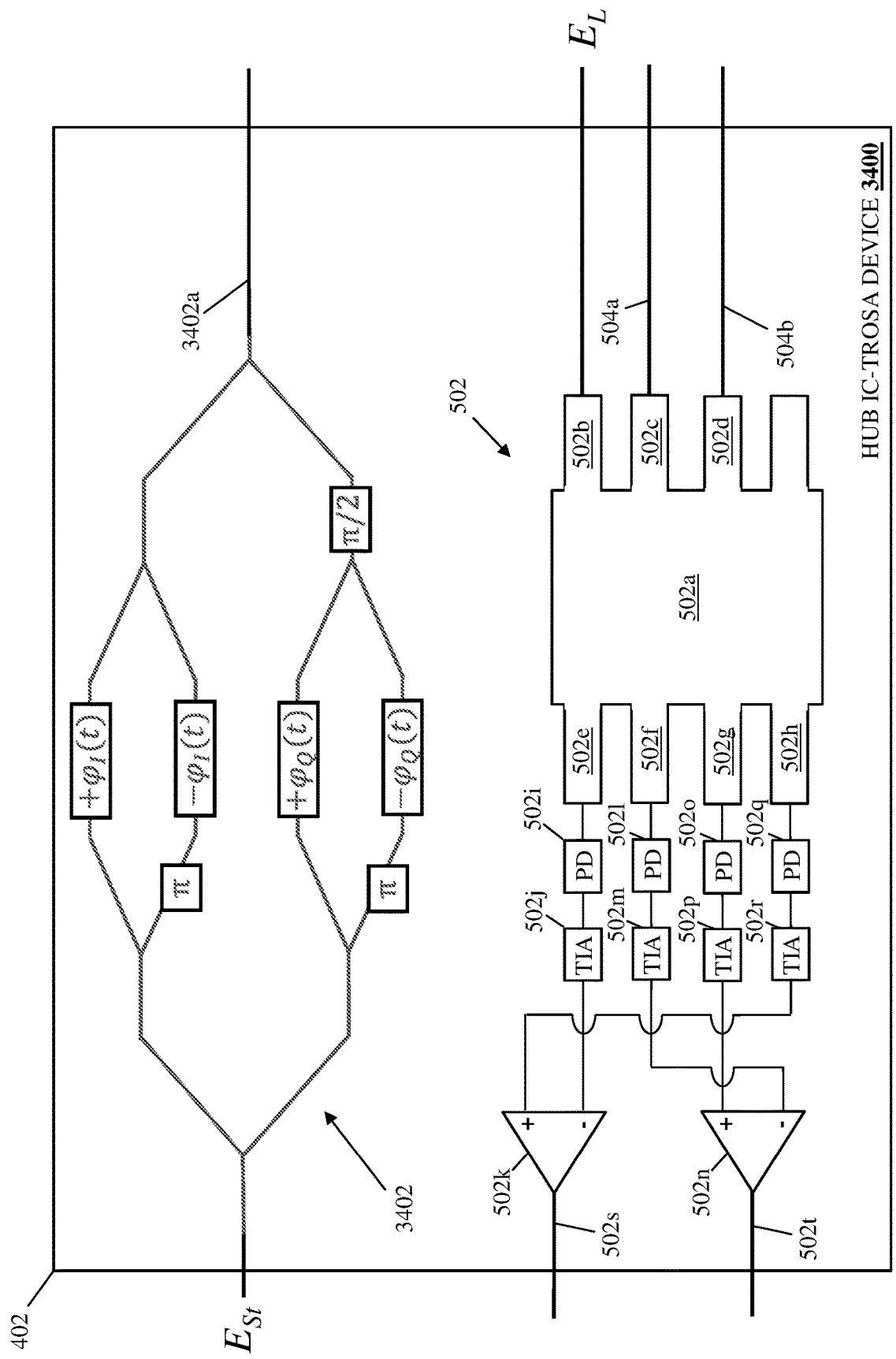
FIG. 34A is a schematic view illustrating an embodiment of a HUB IC-TROSA device that may be provided according to the teachings of the present disclosure.

With reference to FIG. 34A, an embodiment of a hub IC-TROSA device 3400 is illustrated that is similar to the hub IC-TROSA device 500 described above with reference to FIG. 5, with similar components provided with the same reference numbers. As will be appreciated by one of skill in the art in possession of the present disclosure, the hub IC-TROSA device 3400 includes the optical hybrid mixer subsystem 502 in the hub IC-TROSA device 500 having the first optical receive connection 504a and the second optical receive connection 504b, but replaces the quadrature optical modulator subsystem 404 in the hub IC-TROSA device 400 having the first optical transmit connection 406a and the second optical transmit connection 406b with a quadrature optical modulator subsystem 3402 having an optical transmit connection 3402a. As such, the hub IC-TROSA device 3400 utilizes the teachings of the present disclosure above to provide first and second receive connections on the hub IC-TROSA device 3400, while including a conventional quadrature optical modulator subsystem 3402 having a single transmit connection 3402a.

Figure 34B:
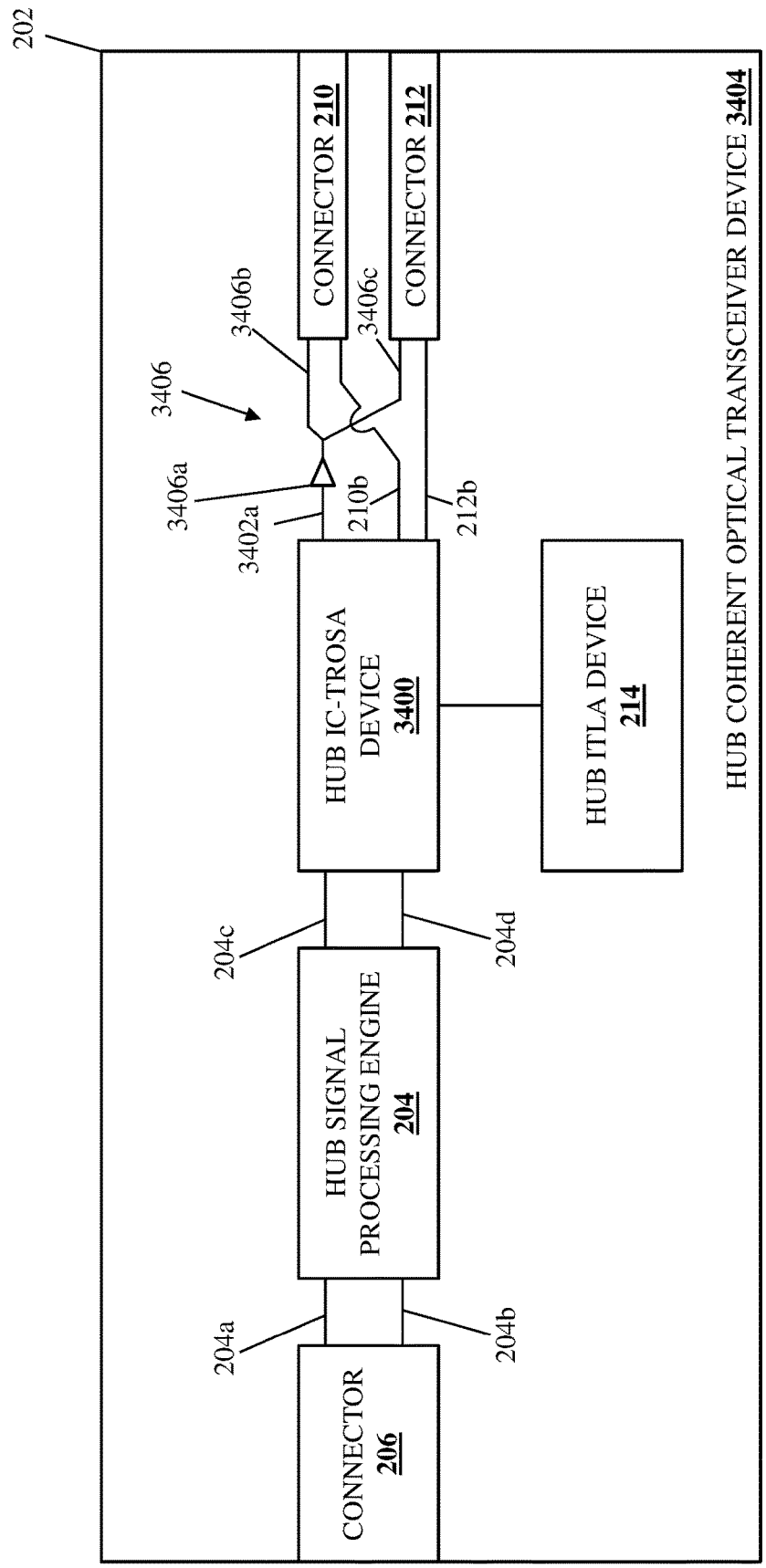
FIG. 34B is a schematic view illustrating an embodiment of a hub coherent optical transceiver device that may include the HUB IC-TROSA device of FIG. 34A.

With reference to FIG. 34B, an embodiment of a hub coherent optical transceiver device 3404 is illustrated that is similar to the hub coherent optical transceiver device 200 described above with reference to FIG. 2, with similar components provided with the same reference numbers. As will be appreciated by one of skill in the art in possession of the present disclosure, the hub coherent optical transceiver device 3404 replaces the hub IC-TROSA device 208, the first optical transmit connection 210a, and the second optical transmit connection 212a included in the hub coherent optical transceiver device 200 of FIG. 2 with the hub IC-TROSA device 3400 of FIG. 34A and an optical amplifier/optical splitter subsystem 3406 that includes an amplifier 3406a coupled to the transmit connection 3402a on the hub IC-TROSA device 3400, as well as a 1×2 single-mode Y-junction with an optical receive connection coupled to the amplifier 3406a, a first optical transmit connection 3406b coupled to the connector 210, and a second optical transmit connection 3406c coupled to the connector 212. As such, the hub coherent optical transceiver device 3404 and the hub IC-TROSA device 3400 may utilize the teachings of the present disclosure to provide first and second receive connections on the hub coherent optical transceiver device 3404, while including an optical amplifier/optical splitter subsystem 3406 coupled between the connector 210 on the hub coherent optical transceiver device 3404 and the transmit connection 3402a of the conventional quadrature optical modulator subsystem 3402 in the hub IC-TROSA device 3400 to provide first and second transmit connections.

Figure 34C:
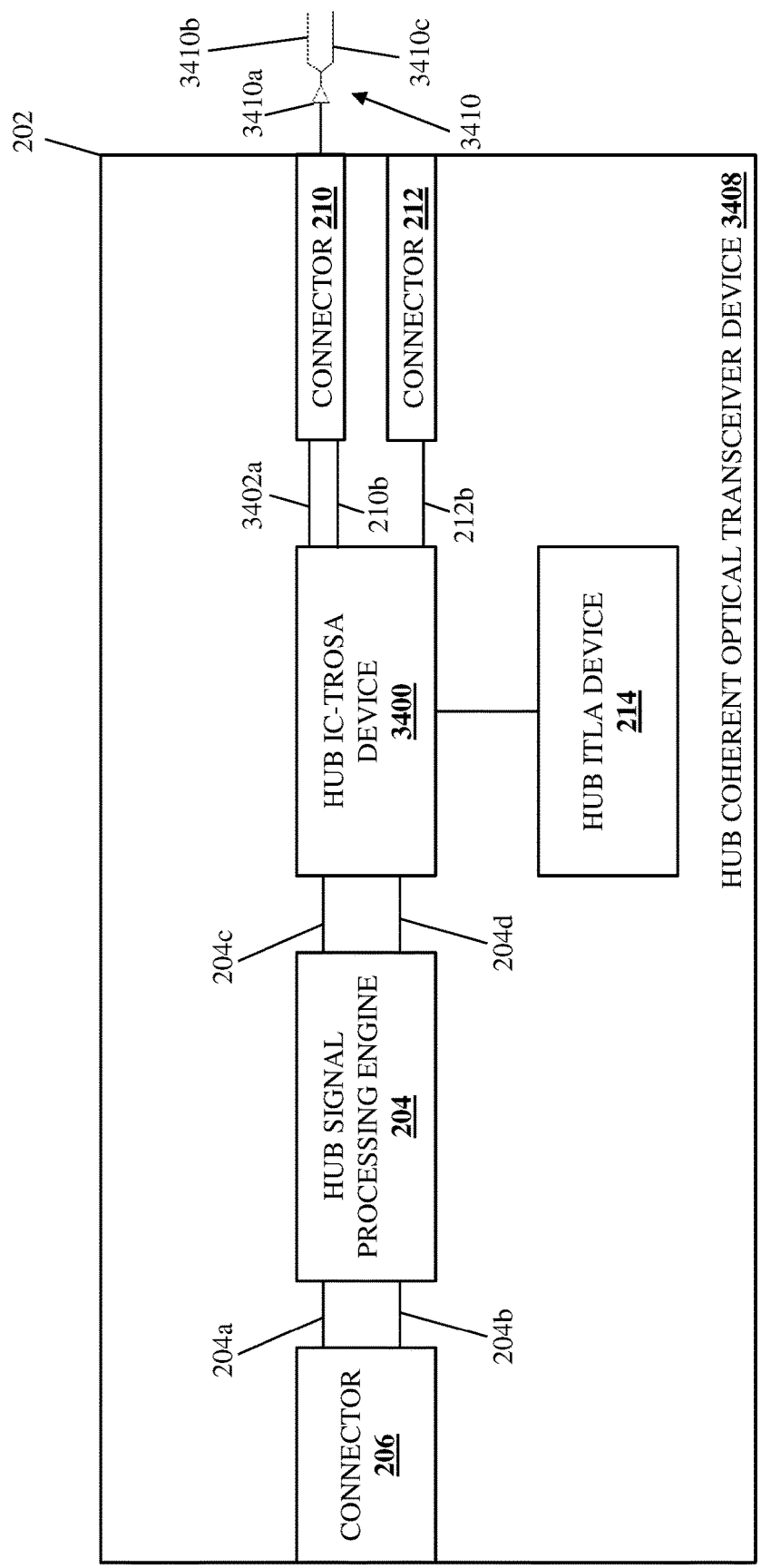
FIG. 34C is a schematic view illustrating an embodiment of a hub coherent optical transceiver device that may include the HUB IC-TROSA device of FIG. 34A.

With reference to FIG. 34C, an embodiment of a hub coherent optical transceiver device 3408 is illustrated that is similar to the hub coherent optical transceiver device 200 described above with reference to FIG. 2, with similar components provided with the same reference numbers. As will be appreciated by one of skill in the art in possession of the present disclosure, the hub coherent optical transceiver device 3408 replaces the hub IC-TROSA device 208 and the first optical transmit connection 210a included in the hub coherent optical transceiver device 200 of FIG. 2 with the hub IC-TROSA device 3400 of FIG. 34A having the transmit connection 3402a coupled to the connector 210. Furthermore, as illustrated in FIG. 34C, an optical amplifier/optical splitter subsystem 3410 may be provided that includes an amplifier 3410a coupled to the connector 210, as well as a 1×2 single-mode Y-junction having an optical receive connection coupled to the amplifier 3410a, a first optical transmit connection 3410b coupled to an optical network as discussed above, and a second optical transmit connection 3410c coupled to an optical network as discussed above. As such, the hub coherent optical transceiver device 3408 and the hub IC-TROSA device 3400 may utilize the teachings of the present disclosure to provide first and second receive connections on the hub coherent optical transceiver device 3408, while providing an optical amplifier/optical splitter subsystem 3410 in an optical network between subscriber device(s) and a connector 210 on the hub coherent optical transceiver device 3408 that is coupled to a transmit connection 3402a of a conventional quadrature optical modulator subsystem 302 in a hub IC-TROSA device 3400 included in the hub coherent optical transceiver device 3408, with the optical amplifier/optical splitter subsystem 3410 including first and second transmit connections coupled to those subscriber device(s).

Similarly as discussed above, each of the hub IC-TROSA devices 3300 and 3400 include the hub IC-TROSA receive subsystem having the optical hybrid mixer subsystem 502 with the single-mode waveguide 502b that is configured to receive light having the receiver local oscillator electrical field $E_L$ (e.g., from the hub ITLA device 214), the single-mode waveguide 502c on the optical hybrid mixer subsystem 502 is coupled to the first optical receive connection 504a (which may provide by the first optical receive connection 210b discussed above with reference to FIG. 2), and the single-mode waveguide 502d is coupled to the second optical receive connection 502d (which may provide by the second optical receive connection 212b). Furthermore, the single-mode waveguide 502e on the optical hybrid mixer subsystem 502 is coupled to the PD 502i, the TIA 502j, and to the first input on the differential amplifier 502k; the single-mode waveguide 502f on the optical hybrid mixer subsystem 502 is coupled to the PD 502l, the TIA 502m, and to the first input on the differential amplifier 502n; the single-mode waveguide 502g on the optical hybrid mixer subsystem 502 is coupled to the PD 502o, the TIA 502p, and to the second input on the differential amplifier 502n; and the single-mode waveguide 502h on the optical hybrid mixer subsystem 502 is coupled to the PD 502q, the TIA 502r, and to the second input on the differential amplifier 502k. As will be appreciated by one of skill in the art in possession of the present disclosure, the hub IC-TROSA receive subsystems illustrated in FIGS. 33 and 34 are configured to convert the optical signals received at the first optical receive connection 504a and the second optical receive connection 504b to electrical signals (i.e., voltages) at outputs 502s and 502t of the differential amplifiers 502k and 502n, respectively.

As also discussed above, each of the hub IC-TROSA devices 3300 and 3400 also include the hub IC-TROSA transmit subsystem provided by the quadrature optical modulator subsystems 3302 and 3402, respectively, that each includes an optical input (e.g., coupled to the hub ITLA device 214), and that may be configured to receive light that includes the transmitter laser source electrical field $E_{S_t}$ (e.g., provided by the hub ITLA device 214). The quadrature optical modulator subsystems 3302 and 3402 each also includes a pair of Mach Zehnder (MZ) interferometer devices. A first MZ interferometer device is coupled to the optical input of that quadrature optical modulator subsystem and includes a $+\varphi_I(t)$ phase modulator directly coupled to that optical input, and a $-\varphi_I(t)$ phase modulator coupled to that optical input by a π phase shifter, and with each of the $+\varphi_I(t)$ phase modulator and the $-\varphi_I(t)$ phase modulator on the first MZ interferometer device coupled to the output 3302a or transmit connection 3402a of the quadrature optical modulator subsystem 3302 or 3402, respectively. A second MZ interferometer device is coupled to the optical input of that quadrature optical modulator subsystem and includes a $+\varphi_Q(t)$ phase modulator directly coupled to that optical input, and a $-\varphi_Q(t)$ phase modulator coupled to that optical input by a π phase shifter, and with each of the $+\varphi_I(t)$ phase modulator and the $-\varphi_I(t)$ phase modulator on the second MZ interferometer device coupled to the output 3302a or transmit connection 3402a of the quadrature optical modulator subsystem 3302 or 3402, respectively, by a π/2 phase shifter.

With reference to the hub IC-TROSA device 3300 illustrated in FIG. 33, the hub IC-TROSA device 3300 may replace the hub IC-TROSA device 208 in the hub coherent optical transceiver device 200 of FIG. 2, with the coupling of the output 3302a of the quadrature optical modulator subsystem 3302 to the optical amplifier/optical splitter subsystem 3304 providing the first optical transmit connection 3306a (which may provide the first optical transmit connection 210a discussed above with reference to FIG. 2), and the second optical transmit connection 3306b (which may provide the second optical transmit connection 212a). As such, one of skill in the art in possession of the present disclosure will appreciate how the hub IC-TROSA device 3300 may transmit data using the quadrature optical modulator subsystem 3302 and optical amplifier/optical splitter subsystem 3306, and receive data using the optical hybrid mixer subsystem 502 with the first optical receive connection 504a and the second optical receive connection 504b, substantially as described above.

With reference to the hub IC-TROSA device 3400 illustrated in FIG. 34A and the hub coherent optical transceiver device 3404 illustrated in FIG. 34B, the hub IC-TROSA device 3400 may be provided in the hub coherent optical transceiver device 3404, with the coupling of the transmit connection 3402a of the quadrature optical modulator subsystem 3402 to the optical amplifier/optical splitter subsystem 3406 providing the first optical transmit connection 3406b that may be coupled to an optical network via the connector 210, and the second optical transmit connection 3406b that may be coupled to an optical network via the connector 212. As such, one of skill in the art in possession of the present disclosure will appreciate how the hub IC-TROSA device 3400 may transmit data using the quadrature optical modulator subsystem 3402 and optical amplifier/optical splitter subsystem 3406, and receive data using the optical hybrid mixer subsystem 502 with the first optical receive connection 504a and the second optical receive connection 504b, substantially as described above.

With reference to the hub IC-TROSA device 3400 illustrated in FIG. 34A and the hub coherent optical transceiver device 3408 illustrated in FIG. 34C, the hub IC-TROSA device 3400 may be provided in the hub coherent optical transceiver device 3408, with the coupling of the transmit connection 3402a of the quadrature optical modulator subsystem 3402 to the optical amplifier/optical splitter subsystem 3410 via the connector 210 providing the first optical transmit connection 3410b that may be coupled to an optical network, and the second optical transmit connection 3410c that may be coupled to an optical network. As such, one of skill in the art in possession of the present disclosure will appreciate how the hub IC-TROSA device 3400 may transmit data using the quadrature optical modulator subsystem 302 and optical amplifier/optical splitter subsystem 3210, and receive data using the optical hybrid mixer subsystem

502 with the first optical receive connection 504a and the second optical receive connection 504b, substantially as described above.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An Integrated Coherent Transmit-Receive Optical Sub-Assembly (IC-TROSA) optical network system, comprising:
   at least one optical network;
   at least one subscriber device that is coupled to the at least one optical network;
   a hub device;
   a hub coherent optical transceiver device included on the hub device; and
   a hub Integrated Coherent Transmit-Receive Optical Sub-Assembly (IC-TROSA) device that is included in the hub coherent optical transceiver device and coupled to the optical network to couple the hub device to the at least one subscriber device, wherein the hub IC-TROSA device includes:
      an optical hybrid mixer subsystem;
      a first receive connection that is coupled to the optical hybrid mixer subsystem and that is configured to receive first optical signals from the at least one subscriber device via the at least one optical network;
      a second receive connection that is coupled to the optical hybrid mixer subsystem and that is configured to receive second optical signals from the at least one subscriber device via the at least one optical network,
      wherein the optical hybrid mixer subsystem is configured to perform mixing operations on the first optical signals and second optical signals and provide mixing results for conversion to first electrical signals and second electrical signals that are then transmitted to a hub signal processing subsystem.

2. The system of claim 1, wherein the hub IC-TROSA device includes:
   an optical directional coupler device that is coupled to the optical hybrid mixer subsystem and that provides the first receive connection and the second receive connection.

3. The system of claim 1, wherein the hub IC-TROSA device includes:
   a MultiMode Interference (MMI) device that is coupled to the optical hybrid mixer subsystem and that provides the first receive connection and the second receive connection.

4. The system of claim 1, wherein the hub IC-TROSA device includes:
   a quadrature optical modulator subsystem; and
   a transmit connection that is configured to receive third optical signals from the quadrature optical modulator subsystem and transmit the optical signals to the at least one subscriber device via the at least one optical network.

5. The system of claim 4, further comprising:
   an optical amplifier/optical splitter subsystem coupled between the transmit connection and the at least one subscriber device.

6. The system of claim 5, wherein the optical amplifier/optical splitter subsystem is included in the hub coherent optical transceiver device.

7. A hub coherent optical transceiver device, comprising:
   an optical hybrid mixer subsystem;
   a first receive connection that is coupled to the optical hybrid mixer subsystem and that is configured to receive first optical signals from at least one subscriber device via at least one optical network; and
   a second receive connection that is coupled to the optical hybrid mixer subsystem and that is configured to receive second optical signals from the at least one subscriber device via the at least one optical network,
   wherein the optical hybrid mixer subsystem is configured to perform mixing operations on the first optical signals and second optical signals and provide mixing results for conversion to first electrical signals and second electrical signals that are then transmitted to a hub signal processing subsystem.

8. The hub coherent optical transceiver device of claim 7, further comprising:
   an optical directional coupler device that is coupled to the optical hybrid mixer subsystem and that provides the first receive connection and the second receive connection.

9. The hub coherent optical transceiver device of claim 7, further comprising:
   a MultiMode Interference (MMI) device that is coupled to the optical hybrid mixer subsystem and that provides the first receive connection and the second receive connection.

10. The hub coherent optical transceiver device of claim 7, further comprising:
    a quadrature optical modulator subsystem; and
    a transmit connection that is configured to receive third optical signals from the quadrature optical modulator subsystem and transmit the optical signals to the at least one subscriber device via the at least one optical network.

11. The hub coherent optical transceiver device of claim 10, further comprising:
    an optical amplifier/optical splitter subsystem coupled between the transmit connection and the at least one subscriber device.

12. The hub coherent optical transceiver device of claim 11, wherein the optical amplifier/optical splitter subsystem is included in the hub coherent optical transceiver device.

13. The hub coherent optical transceiver device of claim 11, wherein the optical amplifier/optical splitter subsystem is located in the at least one optical network.

14. A method for transmitting data via an optical network, comprising:
    receiving, by a hub coherent optical transceiver device via a first receive connection coupled to an optical hybrid mixer subsystem in the hub coherent optical transceiver device, first optical signals from at least one subscriber device via at least one optical network;
    receiving, by the hub coherent optical transceiver device via a second receive connection coupled to the optical hybrid mixer subsystem in the hub coherent optical transceiver device, second optical signals from the at least one subscriber device via the at least one optical network; and mixing, by the hub coherent optical transceiver device using the optical hybrid mixer subsystem, the first optical signals and second optical signals and providing mixing results for conversion to first electrical signals and second electrical signals that are then transmitted to a hub signal processing subsystem in the hub coherent optical transceiver device.

15. The method of claim 14, wherein an optical directional coupler device is included in the hub coherent optical transceiver device, coupled to the optical hybrid mixer subsystem, and provides the first receive connection and the second receive connection.

16. The method of claim 14, wherein a MultiMode Interference (MMI) device is included in the hub coherent optical transceiver device, coupled to the optical hybrid mixer subsystem, and provides the first receive connection and the second receive connection.

17. The method of claim 14, further comprising:
receiving, by the hub coherent optical transceiver device via a transmit connection coupled to a quadrature optical modulator subsystem in the hub coherent optical transceiver device, third optical signals from the quadrature optical modulator subsystem; and
transmitting, by the hub coherent optical transceiver device via the transmit connection, the third optical signals to the at least one subscriber device via the at least one optical network.

18. The method of claim 17, wherein an optical amplifier/optical splitter subsystem is coupled between the transmit connection and the at least one subscriber device.

19. The method of claim 18, wherein the optical amplifier/optical splitter subsystem is included in the hub coherent optical transceiver device.

20. The method of claim 18, wherein the optical amplifier/optical splitter subsystem is located in the at least one optical network.

* * * * *

UNITED STATES PATENT AND TRADEMARK OFFICE
CERTIFICATE OF CORRECTION

PATENT NO. : 12,176,956 B2
APPLICATION NO. : 17/968875
DATED : December 24, 2024
INVENTOR(S) : David Piehler It is certified that error appears in the above-identified patent and that said Letters Patent is hereby corrected as shown below:

In the Specification

Column 12, Line 6, "Y. Bacyens" should read --Y. Baeyens--
Column 14, Line 18, "408c" should read --408e--
Column 20, Line 22, "404c" should read --404e--
Column 27, Line 31, the equation should appear as follows:

$$E_{Sr} = E_{Sr}^0 e^{i(\omega_{Sr} t + \varphi_{Sr})} \left( \sin[\varphi_I(t)] + i\sin[\varphi_Q(t)] \right)$$

Column 27, Line 48, the equation should appear as follows:

$$E_L = E_L^0 e^{i(\omega_L t + \varphi_L)}$$

Column 28, Line 87, the equation should appear as follows:

$$E_L = E_L^0 e^{i(\omega_L t + \varphi_L)}$$

Column 32, Line 65, the equation should appear as follows:

$$E_L = E_L^0 e^{i(\omega_L t + \varphi_L)}$$

Column 36, Line 26, "2702a, 2702b, 2702c, 2702d, 2702c" should read --2702a, 2702b, 2702c, 2702d, 2702e--
Column 37, Line 40, "D. Pichler" should read --D. Piehler--
Column 42, Line 4, "408c" should read --408e--
Column 42, Line 54, should read as follows: --a π/2 phase shifter.--

Signed and Sealed this
Twenty-fifth Day of February, 2025

Coke Morgan Stewart
*Acting Director of the United States Patent and Trademark Office*